United States Patent
Kachi et al.

[11] Patent Number: 5,825,150
[45] Date of Patent: Oct. 20, 1998

[54] METHOD OF DETECTING, DIAGNOSING AND AUTOMATICALLY CORRECTING ABNORMALITIES IN SERVO CONTROL SYSTEM

[75] Inventors: Mitsuyasu Kachi; Kazuhiko Tsutsui, both of Tokyo, Japan

[73] Assignee: Mitsubishi Denki Kabushiki Kaisha, Tokyo, Japan

[21] Appl. No.: 588,396

[22] Filed: Jan. 18, 1996

[30] Foreign Application Priority Data

Jun. 30, 1995 [JP] Japan ................................. 7-188005

[51] Int. Cl.$^6$ ........................................................ H02P 1/54
[52] U.S. Cl. ................................. 318/610; 318/271
[58] Field of Search ............................. 318/599–610, 318/61, 64, 268, 271

[56] References Cited

U.S. PATENT DOCUMENTS

| | | | |
|---|---|---|---|
| 4,302,711 | 11/1981 | Morser et al. | 318/257 |
| 4,665,350 | 5/1987 | Angi et al. | 318/254 |
| 4,958,117 | 9/1990 | Kerkman et al. | 318/805 |
| 5,188,465 | 2/1993 | Johnson et al. | 400/124.03 |
| 5,265,590 | 11/1993 | Takagi | 601/52 |
| 5,612,599 | 3/1997 | Itami et al. | 318/254 |

FOREIGN PATENT DOCUMENTS

| | | |
|---|---|---|
| OS 23-32-911 | 1/1974 | Germany. |
| 262-515-A1 | 11/1988 | Germany. |
| 58-127590 | 7/1983 | Japan. |
| WO-95/17780 | 6/1995 | WIPO. |

OTHER PUBLICATIONS

Pletz: "SPS und PC zum Antriebsregler" in Industrie–Elektrik + Elektronick, 1990, vol. 10, pp. 81 to 82.
Schierling: "Simovert digital?" in Siemens Drive and control, 1991, vol. 2, p. 18, 19.
Achenbach: "Hat sich gemausert" in Elektrotechnik, 1991, vol. 1/2, pp. 28 to 33.
Der Elektromeister, 1962, vol. 22, p. 1479.
Patent Abstracts of Japan, No. 3–45185, Feb. 26, 1991.

*Primary Examiner*—Brian Sircus

[57] ABSTRACT

According to the present invention, in a first acceleration after power is turned ON, currents flowing through U-phase and V-phase of a servo motor output terminal are detected, and misconnection of the motor output terminal is detected by monitoring a pattern of the current wave form.

2 Claims, 45 Drawing Sheets

FIG. 3A

⟨REQUEST FOR MOTOR ROTATION IN REGULAR DIRECTION⟩

| CURRENT POLARITY | PATTERN | DETERMINATION |
|---|---|---|
| POSITIVE / NEGATIVE | U V W   U V W  · · · <br> U V W   U V W  · · · | NORMAL <br> (U V W) |
| POSITIVE / NEGATIVE | U W V   U W V  · · · <br> U W V   U W V  · · · | MISCONNECTION <br> (V W U) <br> (W U V) |
| POSITIVE / NEGATIVE | MISMATCH BETWEEN + AND − SIDES | MISCONNECTION |

FIG. 3B

⟨REQUEST FOR MOTOR ROTATION IN REVERSE DIRECTION⟩

| CURRENT POLARITY | PATTERN | DETERMINATION |
|---|---|---|
| POSITIVE / NEGATIVE | U W V   U W V  · · · <br> U W V   U W V  · · · | NORMAL <br> (U V W) |
| POSITIVE / NEGATIVE | U V W   U V W  · · · <br> U V W   U V W  · · · | MISCONNECTION <br> (V W U) <br> (W U V) |
| POSITIVE / NEGATIVE | MISMATCH BETWEEN + AND − SIDES | MISCONNECTION |

F I G. 4
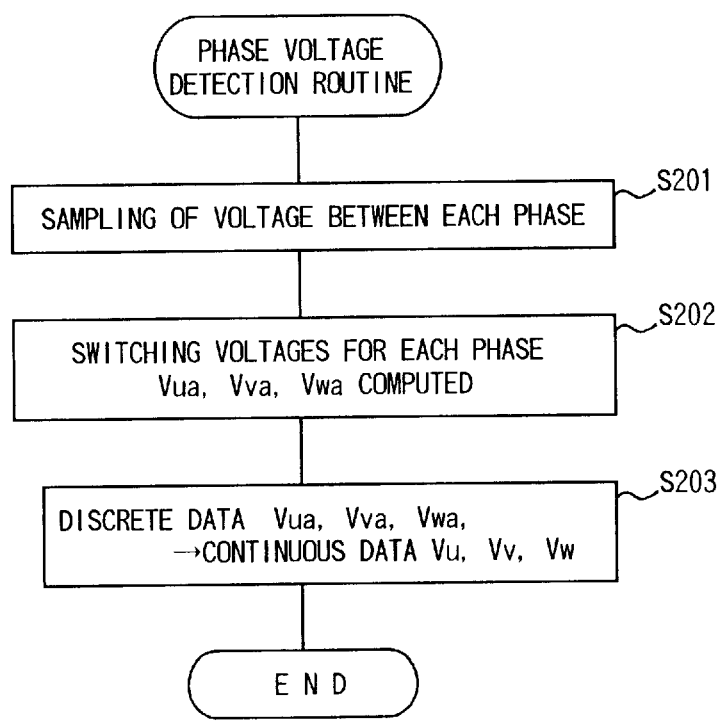

F I G. 2 9
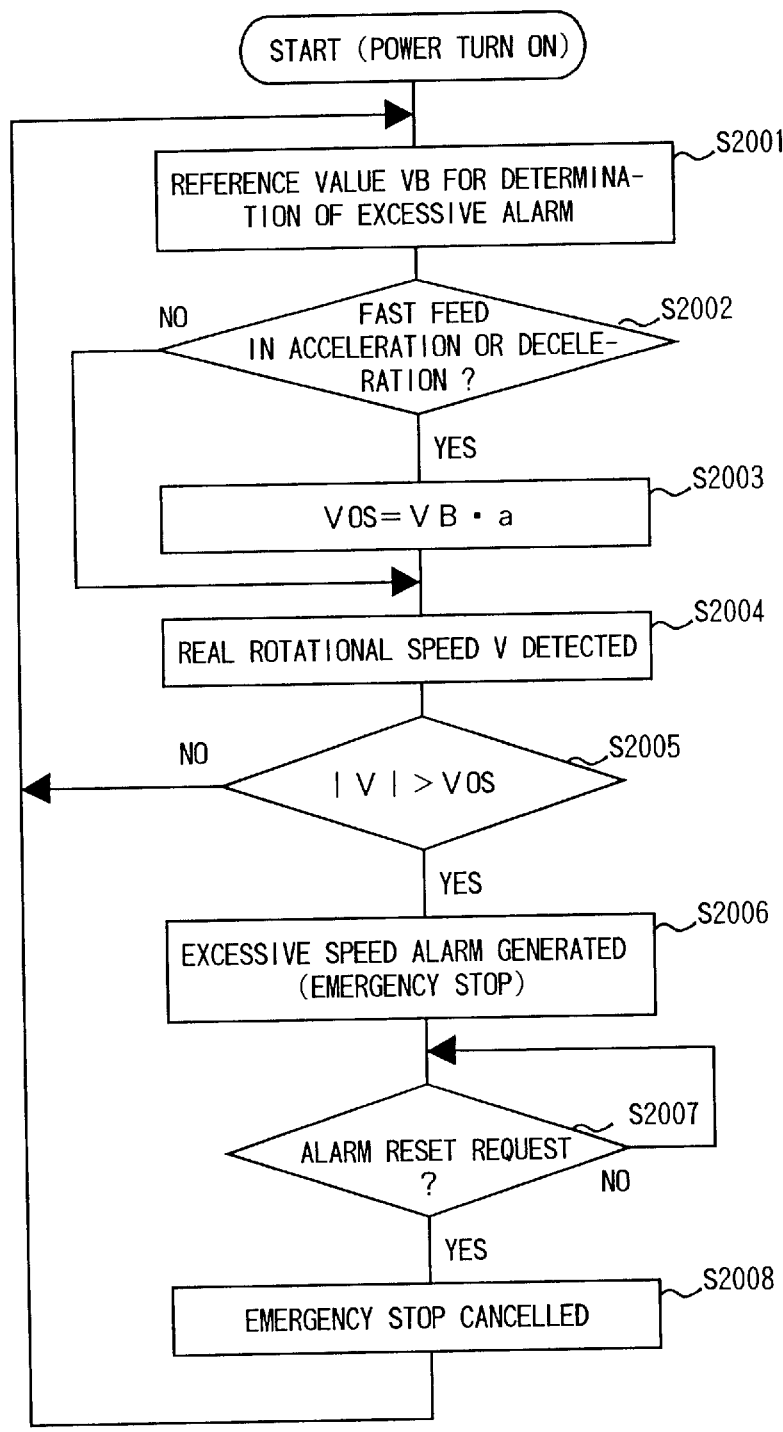

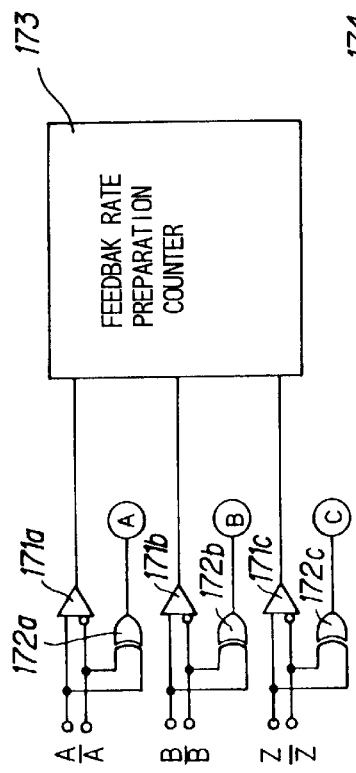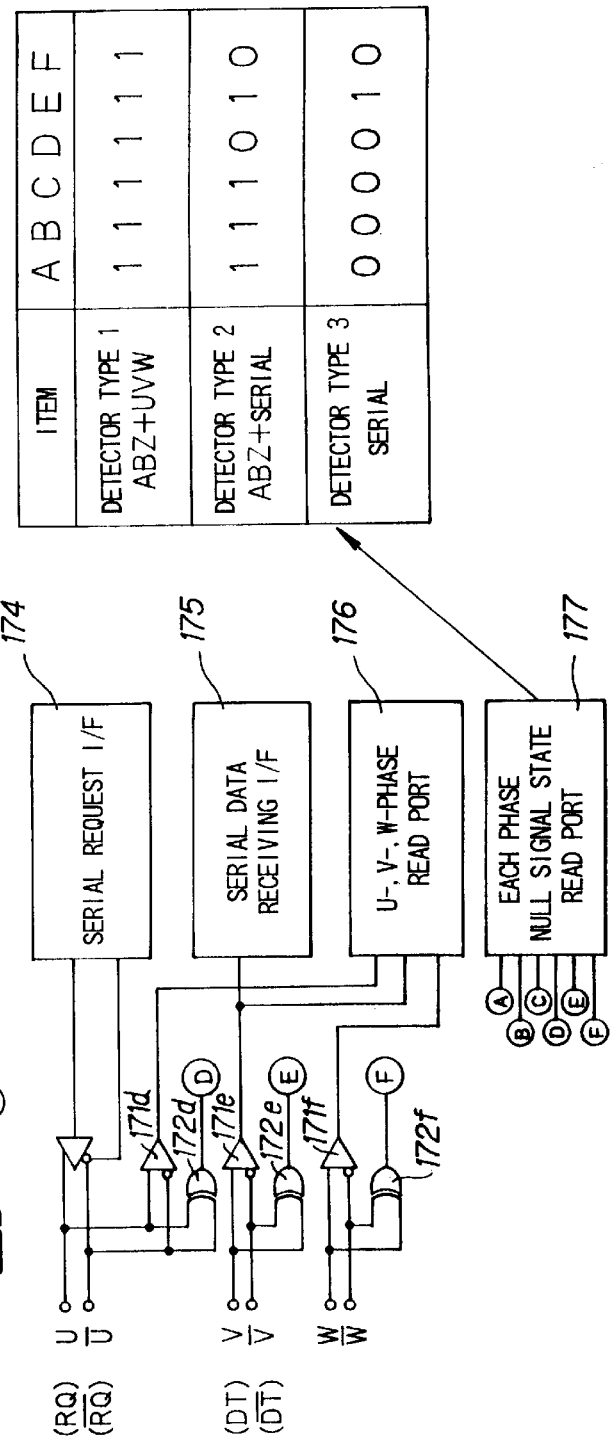
FIG. 39A
FIG. 39B

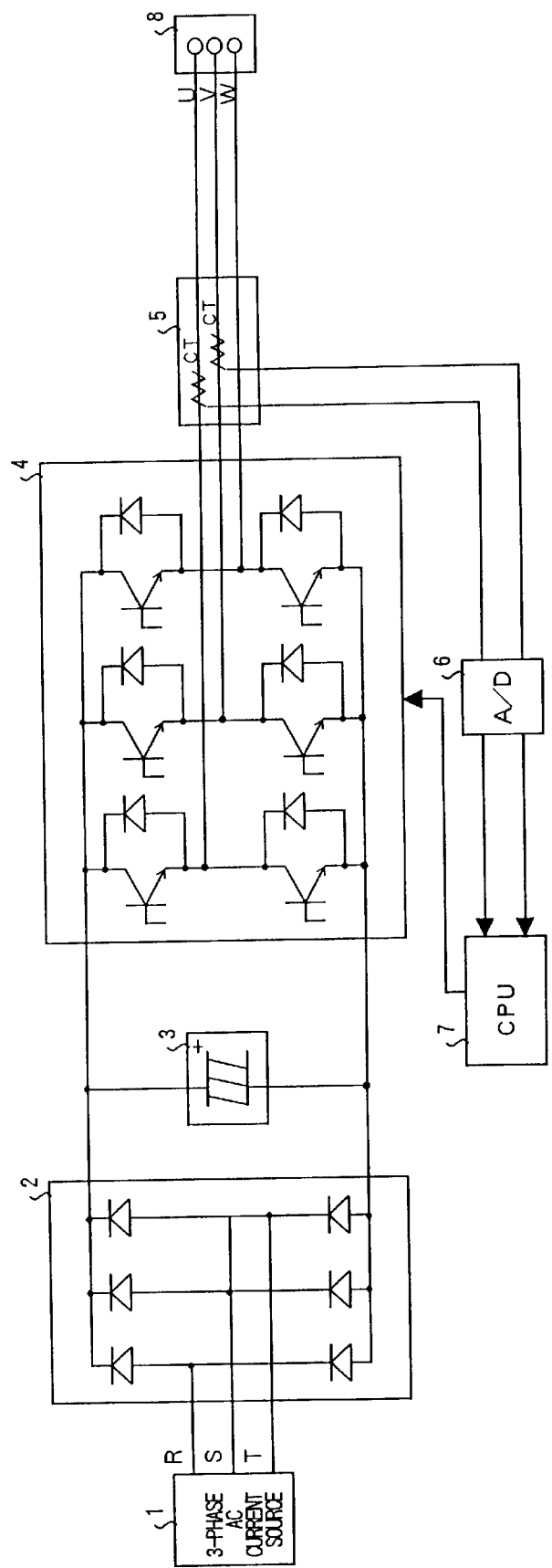
F I G. 43

METHOD OF DETECTING, DIAGNOSING AND AUTOMATICALLY CORRECTING ABNORMALITIES IN SERVO CONTROL SYSTEM

FIELD OF THE INVENTION

The present invention relates to a method of detecting and diagnosing as well as a method for correcting abnormalities in a servo control system used in, for instance, a numerical, control system controlling a machining tool, a robot or the like.

BACKGROUND OF THE INVENTION

FIG. 43 shows a general servo motor driver used in a servo control system. The servo motor driver comprises a rectifying circuit 2 for rectifying a 3-phase alternating current given from a 3-phase alternating current source 1, a smoothing capacitor 3 for smoothing a rectified output from the rectifying circuit 2, a semiconductor switching circuit 4 receiving an DC current smoothed by the smoothing capacitor 3 as an input and constituting an output section of a PWM circuit outputting the 3-phase AC current having been subjected to PWM conversion to an AC servo motor 8, a current detecting section 5 for detecting from a chant resistor CT values of U-phase and V-phase currents each flowing into the AC servo motor 8 from the semiconductor switching circuit 4, an A/D converter 6 for converting an analog voltage signal proportional to a current value detected by the current detecting section 5 to a digital signal, and a CPU 7 fetching a digital signal outputted from the A/D converter 6 as a current feedback signal, executing a specified computing operation according to a current feedback value and a speed command value, and outputting a PWM signal for each phase to a base terminal for each phase in the semiconductor switching circuit 4.

It should be noted that, in this specification, a circuit comprising the rectifying circuit 2 and the smoothing capacitor 3 is called converter.

FIG. 44 shows a general servo control system. Servo control system comprises a positional control section 11 for generating a command concerning speed from a difference between a positional command value outputted from the NC unit 10 and a positional feedback value from a motor edge or a machine edge, a speed control section 12 for generating a command concerning a current from a difference between a speed command value from the positional control section 11 and a speed feedback value, and a current control section 13 for generating a current provided to the servo motor 8 from a difference between a current command value from the speed control section 12 and a current feedback value from a chant resistor CT. The servo motor 8 rotates and drives a feed screw 16 with a reduction gear 15, and linearly moves a table 17 which is an object to be controlled.

In a case of semi-closed loop, a motor edge detector 18 connected to a servo motor 14 and detecting a rotational speed and a rotational angle of the servo motor 8 and a position of magnetic pole is used, and in a case of full-closed loop, a machine edge position detector 19 for detecting a position for linear movement of the table 17 is used, and a feedback signal is obtained with the detectors.

FIG. 45 shows a current control section in an AC servo motor. This current control section comprises a speed control section 20 for outputting a q-axis current command value, a limiter 21 for limiting the q-axis current command value outputted from the speed control section 20 to protect a semiconductor element constituting a PWM modulating section 25 described later, a d-q coordinate converting section 22 for converting U-phase and V-phase currents outputted to the AC servo motor 8 to d-axis and q-axis currents, a current controller 23a for receiving a difference between a d-axis current command value and a d-axis current value outputted from the d-q coordinate converting section 12 given thereto and generating a command concerning d-axis voltage so that the difference is zeroed, a current controller 23b for receiving a difference between a q-axis current command value outputted from the speed control section 20 and a q-axis current value outputted from the d-q coordinate converting section 22 given thereto and generating an command for q-axis voltage so that the difference is zeroed, a 3-phase converting section 24 for subjecting d-axis and q-axis voltage commands outputted from the current controllers 23a and 23b to three-phase conversion to generate commands for voltages in U, V and W phases, and a PWM modulating section 25 for generating a 3-phase AC current to be provided to the AC servo motor 8 from the voltage commands for each phase outputted from the three-phase converting section 24.

In the configuration as described above, when the NC unit 10 outputs a positional command value, an command concerning speed is generated by the position control section 11 so that the positional command value coincides with a positional feedback value from a motor edge position detector 18 in case of a semi-closed loop or from a machine edge position detector 19 in case of a full-closed loop, and a q-axis current command is generated by the speed controller 12 so that the speed command value will coincide with the speed feedback value detected by the motor edge position detector 18. In contrast to the q-axis current command, zero (0) is always given to the d-axis current command.

To follow the command, the 3-phase AC current for driving the AC servo motor 8 is finally subjected to PWM modulation by and outputted from the semiconductor switching circuit 4 shown in FIG. 43 according to the q-axis current command and d-axis current command.

Next, a description is made for operations of a protecting function in the conventional type of servo motor driver as described above.

As described above, when a q-axis current command is generated to follow a positional command from the NC unit 10, if the command value exceeds an allowable current value for the semiconductor switching circuit 4, controls are provided by the limiter 21 to limit the current.

Also if a percentage of a current command value or a phase current value detected by the current detecting section 5 against an allowable current value exceeds a certain level and the state continues for a prespecified period of time, a specific alarm is generated to indicate that the difference is excessive.

Also if a difference between a positional command value given to the positional control section and a positional feedback value is larger than a value deviated by a certain percentage against a logically computed deviation, an alarm indicating that the deviation is excessive is issued.

Also a current flowing in each transistor in the semiconductor switching circuit 4 is detected, and if it is determined that the current is excessive or a gate shutdown request from a multi-shaft driver or a converter section, or from an NC unit, a gate for each transistor in the semiconductor switching circuit is shut down by hardware.

In a full-closed loop having the machine edge detector 19, if a difference between a resolution as well as a number of pulses from the machine edge position detector 19 and a number of pulses presumably computed according to a resolution of and a number of pulses from the motor edge position detector 18 so that in normal operating mode a machine edge and a motor edge coincide with each other and the difference will be zero exceeds an allowable value, it is determined that there is abnormality in feedback, and a prespecified alarm is generated.

In the conventional type of servo motor driver, there is no function to monitor a pattern of a current wave form of: a current in each phase flowing in the motor output terminal, so that misconnection of the motor output terminal can not be detected, and there is no way but to provide an alarm indicating excessive difference or excessive load for stopping system operation, which is disadvantageous.

Also the conventional type of servo motor driver does go not have a function to detect a voltage in each phase loaded to the motor output terminal, so that it is disadvantageously impossible to detect that connection of the motor output terminal or that of a bus-bar for a converter has not been established.

Also the conventional type of servo motor driver does not have a function to monitor a gate shutdown signal to a transistor in an inverter section for controlling a current for a servo motor, nor a function to monitor a type of gate shutdown request signal, so that it is disadvantageously impossible to more detailedly determining causes for an alarm such as that for an excessive difference or feedback abnormality.

Also the conventional type of servo motor driver does not have a function to more detailedly determine, when an alarm indicating an excessive difference or an excessive load, or abnormality in feedback is generated in a full-closed loop having a machine edge position detector, causes for the alarm, and there is no way but to stop system operation, or a long time is required to find out the cause, which is disadvantageous.

Also the conventional type of servo motor river does not have a means for making a determination, when an alarm indicating an excessive difference or an excessive load is generated during acceleration or deceleration, as to whether the alarm has been generated because of a time constant for acceleration or deceleration is too small, or because an abnormal load has been generated, and for this reason there is no way but to stop system operation even in a case where the system operation could be continued by automatically readjusting related parameters.

Also the conventional type of servo motor driver does not have a function to recognize a type of detector, so that if actual specifications for communications of a detector set with parameters are different from those of a detector actually connected thereto, a no-signal alarm is generated and the state may be mistaken as a fault in the detector or the connection cable, and in addition a long time is required for restoration, and sometimes even very simple mistakes in parameter setting may disable system operation.

SUMMARY OF THE INVENTION

It is an object of the present invention to provide a method of detecting and diagnosing abnormalities in a servo control system for accurately detecting misconnection of a motor output terminal, non-connection of a motor output: terminal or a bus-bar for a converter, causes for alarms such as an excessive difference or abnormality in feedback, misconnection of a feedback cable, mis-setting of various types of parameter, mistakes in connection for a detector, shortage in a time constant for acceleration or deceleration, or generation of abnormal load, for evading system down by automatically restoring the system operation by means of automatic correction if any abnormality occurs, and furthermore for automatically changing various types of conditions for servo control so that servo control will be executed under the optimal conditions.

A method of detecting and diagnosing abnormalities in a servo control system according to the present invention is for detecting through at least current flowing two phases of U-phase, V-phase, and W-phase of a servo motor output terminal in first acceleration after power is turned ON and monitoring a pattern of a wave form of each current to detect misconnection of the motor output terminal, and it is an object of the present invention to provide a method of detecting and diagnosing as well as a method for correcting abnormalities in a servo control system for accurately detecting misconnection of a motor output terminal, non-connection of a motor output terminal or a bus-bar for a converter, causes for alarms such as an excessive difference or abnormality in feedback, misconnection of a feedback cable, mis-setting of various types of parameter, mistakes in connection for a detector, shortage in a time constant for acceleration or deceleration, or generation of abnormal load, for evading system down by automatically restoring the system operation by means of automatic correction if any abnormality occurs, and furthermore for automatically changing various types of conditions for servo control so that servo control will be executed under the optimal conditions.

In the method of detecting and diagnosing abnormalities in a servo control system according to the present invention, misconnection of motor output terminals is detected by detecting currents flowing through at least two of U-phase, V-phase, and W-phase of a servo output terminal in first acceleration after power is turned ON and monitoring patterns of the current wave forms. With this configuration, it is found out that the motor output terminal has been misconnected.

In another method of detecting and diagnosing abnormalities in a servo control system according to the present invention, all of U-phase, V-phase, and W-phase currents each flowing in an output terminal of a servo motor and phase voltages are detected, and it is determined that connection of the motor output terminal has not been established if there is a phase where a current does not flow even though the phase voltage is more than a prespecified value. With this configuration, it is found out that the motor output terminal has not been connected.

In another method of detecting and diagnosing abnormalities in a servo control system according to the present invention, all voltages in each phase acting on a motor output terminal in acceleration or deceleration are detected, and it is determined, when all the phase voltages are zero, that connection of a bus-bar for a converter has not been established. With this configuration, it is found out that the bus-bar for a converter has not been connected.

In another method of detecting and diagnosing abnormalities in a servo control system according to the present invention, a voltage between each phase of an output terminal of a servo motor is detected to compute a switching voltage for each phase, and a continuously smooth phase voltage is detected using a filter to which the computed switching voltage is inputted, so that a level of the phase voltage can easily be evaluated.

In another method of detecting and diagnosing abnormalities in a servo control system according to the present invention, when a gate shutdown signal to a transistor in an inverter section providing controls over a current for a servo motor is generated when an alarm is not operating, a section where the gate shutdown request signal has been generated is detected, times when the signal is generated is stored in a memory for each detected section for a certain period of time in the past, and causes for an alarm indicating abnormalities in the control system such as excessive error or abnormality in feedback are determined. With this configuration, it is found out what are causes for an alarm.

In another method of detecting and diagnosing abnormalities in a servo control system according to the present invention, in positional control for a closed loop system having a machine edge position detector, polarity of signals for a positional command, positional feedback, speed feedback, a current command, and current feedback is monitored since power is turned ON, and if only the positional feedback has a reverse polarity when all the signals are larger than a prespecified value, it is determined that wiring for the feedback cable is not corrected. With this configuration, it is found out that wiring for the feedback cable is not corrected.

In another method of detecting and diagnosing abnormalities in a servo control system according to the present invention, in positional control for a closed loop system having a machine edge position detector, a number of pulses detected by a motor edge position detector when movement is made by a prespecified distance corresponding to rotations of the motor or other factor is compared upon power turn ON to a number of detected pulses each indicating a machine edge, and parameter mis-setting for machine parameters such as a gear ratio in the machine, a ball screw pitch, resolution of a machine edge position detector or the like is detected according to a result of this comparison. With this configuration, it is found out that the machine parameters have been mis-set.

In another method of detecting and diagnosing abnormalities in a servo control system according to the present invention, in software for providing controls over a current for a servo motor, a servo motor model plotted with d-axis and q-axis current command as input is prepared and when an excessive error is indicated even though a difference between a positional feedback value in the model and an actual motor edge position feedback value is within a prespecified allowable range, it is determined that a constant for acceleration or deceleration is too small. With this configuration, it is found out that a constant for acceleration or deceleration is too small.

In another method of detecting and diagnosing abnormalities in a servo control system according to the present invention, in software for providing controls over a current for a servo motor, a servo motor model plotted with d-axis and q-axis current commands as input is prepared, and if rotor inertia and load inertia are within an allowable range and such a trouble as mis-shutting of a gate has not been generated when a difference between a positional feedback value in the model and an actual motor edge position feedback value exceeds a prespecified allowable range, it is determined that abnormal load is present. With this configuration, it is found out that abnormal load is present.

In another method of automatically correcting abnormalities in a servo control system according to the present invention, positional control with a semi-closed loop system is executed when power is turned ON, feedback polarity from the machine edge position detector is determined during this period of time, feedback polarity from the machine edge position detector is reverted when feedback polarity not. coincide with a direction of an instructed position, and then positional control with a full closed loop system is started. With this configuration, system operation can be continued without generating an alarm indicating an excessive error or a feedback fault and without system operation being stopped.

In another method of automatically correcting abnormalities in a servo control system according to the present invention, if a difference between a positional feedback rate from a motor edge position detector and a positional feedback rate from a machine edge position detector is more than a prespecified value after power is turned ON, feedback polarity from the machine edge position detector is reverted. With this configuration, system operation can be continued without system operation being stopped.

In another method of automatically correcting abnormalities in a servo control system according to the present invention, dual feedback control is executed, and a difference between a positional feedback rate from a motor edge detector and a positional feedback rate from a machine edge position detector after power is turned ON is more than a prespecified value, feedback polarity from the machine edge position detector is reverted. With this configuration, system operation can be continued without generating an alarm indicating an excessive error or a feedback fault and without system operation being stopped.

In another method of automatically correcting abnormalities in a servo control system according to the present invention, if feedback polarity from a machine edge position detector is reverted, the data is stored in a non-volatile memory, and feedback polarity is reverted depending on the data when power is turned ON again.

With this configuration, in next system operation, system can be operated in a state where feedback polarity from the machine edge position detector is correct from the beginning.

In another method of automatically correcting abnormalities in a servo control system according to the present invention, if misconnection of the servo motor output terminal is present, a sequence of outputting voltage commands is automatically changed. With this configuration, the servo control system can normally be operated even if misconnection of the servo motor output terminal is present.

In another method of automatically correcting abnormalities in a servo control system according to the present invention, an optimal time constant for acceleration or deceleration allowable for an output torque from a servo amplifier required for acceleration or deceleration in fast feed is computed, and a command is prepared with the computed optimal time constant for acceleration or deceleration in next acceleration or deceleration. With this configuration, a time constant for acceleration or deceleration is corrected, and a command is prepared with the time constant for acceleration or deceleration.

In another method of automatically correcting abnormalities in a servo control system according to the present invention, an optimal time constant for acceleration or deceleration allowable for an output torque of a servo amplifier required for acceleration or deceleration in fast feed is discretely computed for each direction of movement, and a command is prepared with the computed optimal time constant for acceleration or deceleration for the corresponding direction of movement in next acceleration or deceleration. With this configuration, a time constant for acceleration or deceleration is discretely corrected for each direction of movement, and a command is prepared with the time constant for acceleration or deceleration.

In another method of automatically correcting abnormalities in a servo control system according to the present invention, an optimal time constant for acceleration or deceleration allowable for an output torque from a servo amplifier required for acceleration or deceleration in fast feed is discretely computed for acceleration and deceleration respectively, and a command is prepared with the corresponding computed optimal time constant for acceleration or deceleration discretely for acceleration and for deceleration in next acceleration or deceleration. With this configuration, a time constant for acceleration or deceleration is discretely corrected for acceleration and for deceleration, and a command is prepared with the time constant for acceleration or deceleration.

In another method of automatically correcting abnormalities in a servo control system according to the present invention, an optimal time constant for acceleration or deceleration allowable for an output torque from a servo amplifier required for acceleration or deceleration in fast feed is discretely computed for acceleration or for deceleration and for each direction of movement to always provide a time constant allowable for an output torque from a servo amplifier required for acceleration or for deceleration in each feeding direction respectively, and a command is prepared with the corresponding optimal time constant for acceleration or deceleration and for the corresponding direction in next acceleration or deceleration. With this configuration, a time constant for acceleration or deceleration and for each direction of movement is discretely corrected, and a command is prepared with the time constant for acceleration or deceleration.

In another method of automatically correcting abnormalities in a servo control system according to the present invention, assuming a case that time constant for acceleration or deceleration in fast feed is set to a small value or reaches the maximum output torque from a servo amplifier affected by abnormal load, a deviation rate of a position for determination of the necessity of excessive error alarm (an error from an ideal droop rate) is set to a value larger than an ordinary one only during acceleration or deceleration in fast feed. With this configuration, system operation can be continued without generating an excessive error alarm.

In another method of automatically correcting abnormalities in a servo control system according to the present invention, assuming a case that a time constant for acceleration or deceleration in fast feed is set to a small value or reaches the maximum output torque from a servo amplifier affected by abnormal load, a rotational speed of a motor for determination of the necessity for excessive speed alarm is set to a value larger than an ordinary one only during acceleration or deceleration in fast feed. With this configuration, system operation can be continued without generating a speed alarm.

In another method of automatically correcting abnormalities in a servo control system according to the present invention, assuming a case that time constant for acceleration or deceleration in fast feed is set to a small value or reaches the maximum output torque from a servo amplifier affected by abnormal load, a maximum speed for a command concerning speed is clamped at a specified value. With this configuration, overshoot hardly occurs.

In another method of automatically correcting abnormalities in a servo control system according to the present invention, a maximum speed for a command concerning speed is clamped at a specified value only during acceleration or deceleration. With this configuration, overshoot hardly occurs even though time constant for acceleration or deceleration in fast feed is set to a small value, or an output torque reaches a maximum torque from a servo amplifier under influence by an abnormal load.

In another method of automatically correcting abnormalities in a servo control system according to the present invention, a maximum speed for a command concerning speed is clamped at a specified value only while a maximum current for a servo amplifier is being restricted. With this configuration, overshoot hardly occurs even though a time constant for acceleration or deceleration in fast feed is set to a small value, or an output torque reaches a maximum output torque from a servo amplifier under influence by an abnormal load.

In another method of automatically correcting abnormalities in a servo control system according to the present invention, if a time constant for acceleration or deceleration in fast feed is set to a small value, or an output torque reaches a maximum output torque from a servo amplifier under influence by an abnormal load, an command concerning speed is clamped at a rated rotational speed of a motor, a command concerning position for overshooting is thinned out, and the rate thinned out from start of deceleration is distributed and added to each time constant. With this configuration, overshoot speed hardly occurs.

In another method of automatically correcting abnormalities in a servo control system according to the present invention, a change rate (command concerning speed) of a command concerning position per unit time is suppressed when a current command value has reached a current limit value during acceleration in fast feed. With this configuration, overshoot hardly occurs, and an excessive difference alarm hardly be generated.

In another method of automatically correcting abnormalities in a servo control system according to the present invention, when an output torque has reached a maximum output torque from a servo amplifier during fast feed under influence by an abnormal load, a positional loop gain is reduced only during the period. With this configuration, system operation can be continued without generating an excessive difference alarm.

In another method of automatically correcting abnormalities in a servo control system according to the present invention, when an output torque has reached a maximum output torque from a servo amplifier under influence by an abnormal load during fast feed, a positional loop gain is reduced by a specified time constant. With this configuration, system operation can be continued without generating an excessive difference alarm.

In another method of automatically correcting abnormalities in a servo control system according to the present invention, when an output torque has reached a maximum output torque from a servo amplifier under influence by an abnormal load during fast feed, a positional loop gain when a command concerning speed indicates a rated rotational speed of a motor is computed from a current droop rate, and control is provided so that the command concerning speed will not exceed the rated rotational speed of the motor. With this configuration, system operation can be continued without generating an excessive difference alarm.

In another method of detecting and diagnosing abnormalities in a servo control system according to the present invention, a connection state of a plurality of receiving circuits each for a detector in the transmitting side thereof is checked when power is turned ON to automatically detect a type name of a detector actually connected thereto, and if the type of a detector indicated by the detected parameter is different from a detector actually connected thereto, a parameter abnormality alarm is generated. With this configuration, it is found out that a parameter is abnormal.

In another method of automatically correcting abnormalities in a servo control system according to the present invention, a connection state of a plurality of receiving circuits each for a detector in the transmitting side thereof is checked when power is turned ON to automatically detect a type name of a detector actually connected thereto, and if the type of a detector indicated by the detected parameter is different from a detector actually connected thereto, a receiving circuit is switched to the one corresponding to the connected detector. With this configuration, data for a position and speed is prepared by using a detecting circuit corresponding to the detector or without generating an alarm indicating non-signal or the like.

Other objects and features of this invention will become understood from the following description with reference to the accompanying drawings.

BRIEF DESCRIPTION OF THE DRAWINGS

FIG. 3A is an explanatory view showing a result of determination of misconnection of the motor output terminals;

FIG. 3B is an explanatory view showing a result of determination of misconnection of the motor output terminals;

FIG. 4 is a flow chart showing a routine for detecting a phase voltage used for diagnosing connection of the motor output terminal as well as a bus-bar for a converter in the method of detecting and diagnosing abnormalities in a servo control system according to the present invention;

FIG. 29 is a flow chart showing a routine for changing a value of determination of an excessive speed alarm in the method of automatically correcting abnormalities in a servo control system according to the present invention;

FIG. 39A is a block diagram showing a feedback detecting circuit;

FIG. 39B is an explanatory view showing a state of a read port when three types of detectors are connected;

FIG. 43 is a block diagram showing a general servo motor driver used in a servo control system;

DETAILED DESCRIPTION OF THE PREFERRED EMBODIMENTS

Figure 1:
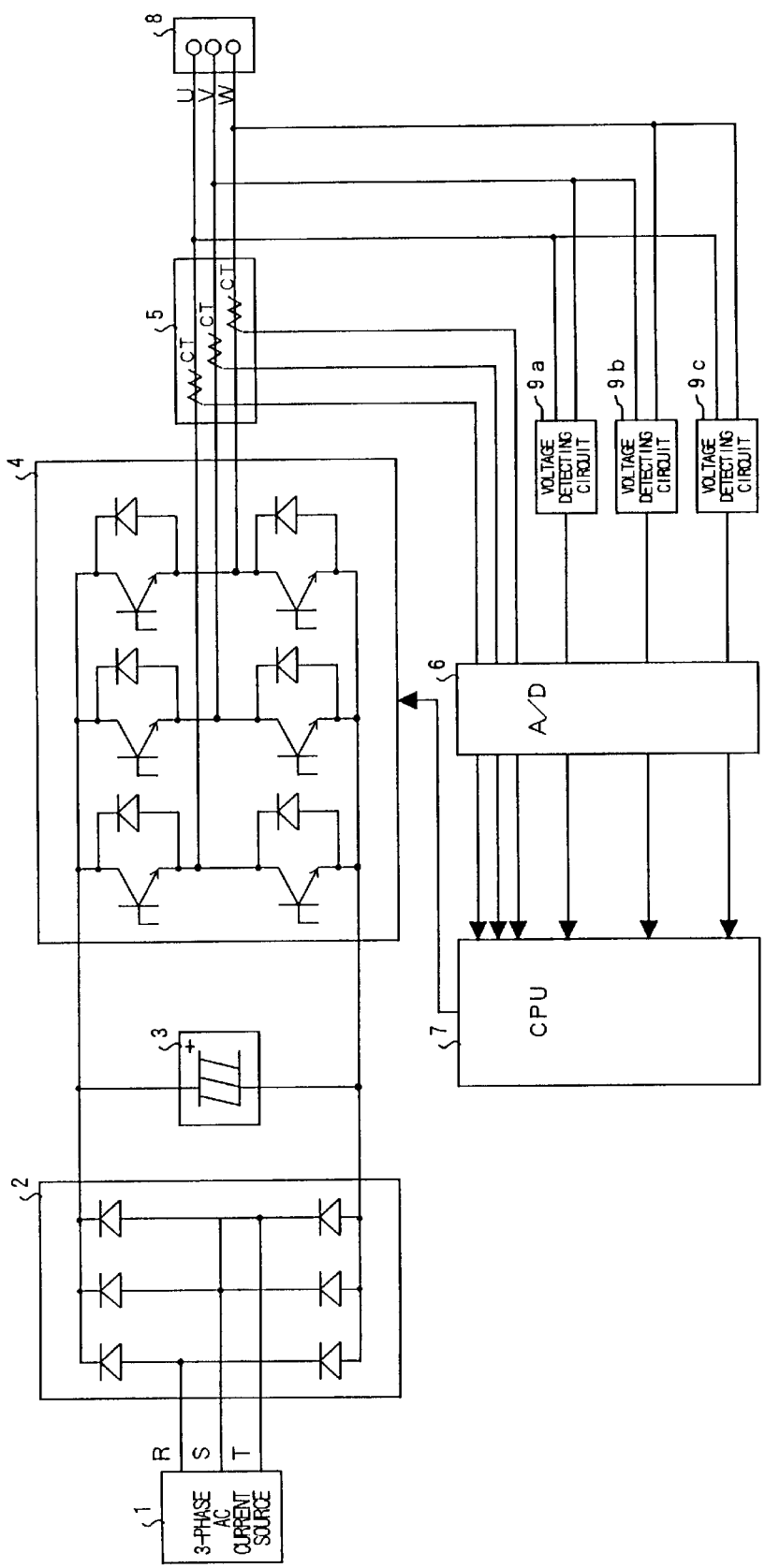
FIG. 1 is a block diagram showing an embodiment of a servo motor driver used for implementation of the method of detecting and diagnosing abnormalities in a servo control system according to the present invention.

Detailed description is made for embodiments of the present invention with reference to the related drawings. It should be noted that the same reference numerals are assigned to the same components as those in the conventional technology and description thereof is omitted.

FIG. 1 shows an embodiment of servo motor driver used for implementation of the method of detecting and diagnosing abnormalities in a servo control system according to the present invention. In this servo motor driver, a current detector 5 for detecting a phase current flowing in a motor output terminal detects, in addition to U-phase and V-phase currents, a W-phase current.

This servo motor driver has voltage detecting circuits 9a, 9b, and 9c. The voltage detecting circuits 9a, 9b, 9c divides a voltage between each of the U-phase, V-phase, and W-phase, and outputs a voltage in proportion to a voltage between each phase to an A/D converter. The A/D converter 6 converts a voltage detected by each of the voltage detecting circuits 9a, 9b, and 9c to a digital value, and outputs the digital signal to a CPU 7.

Figure 2:
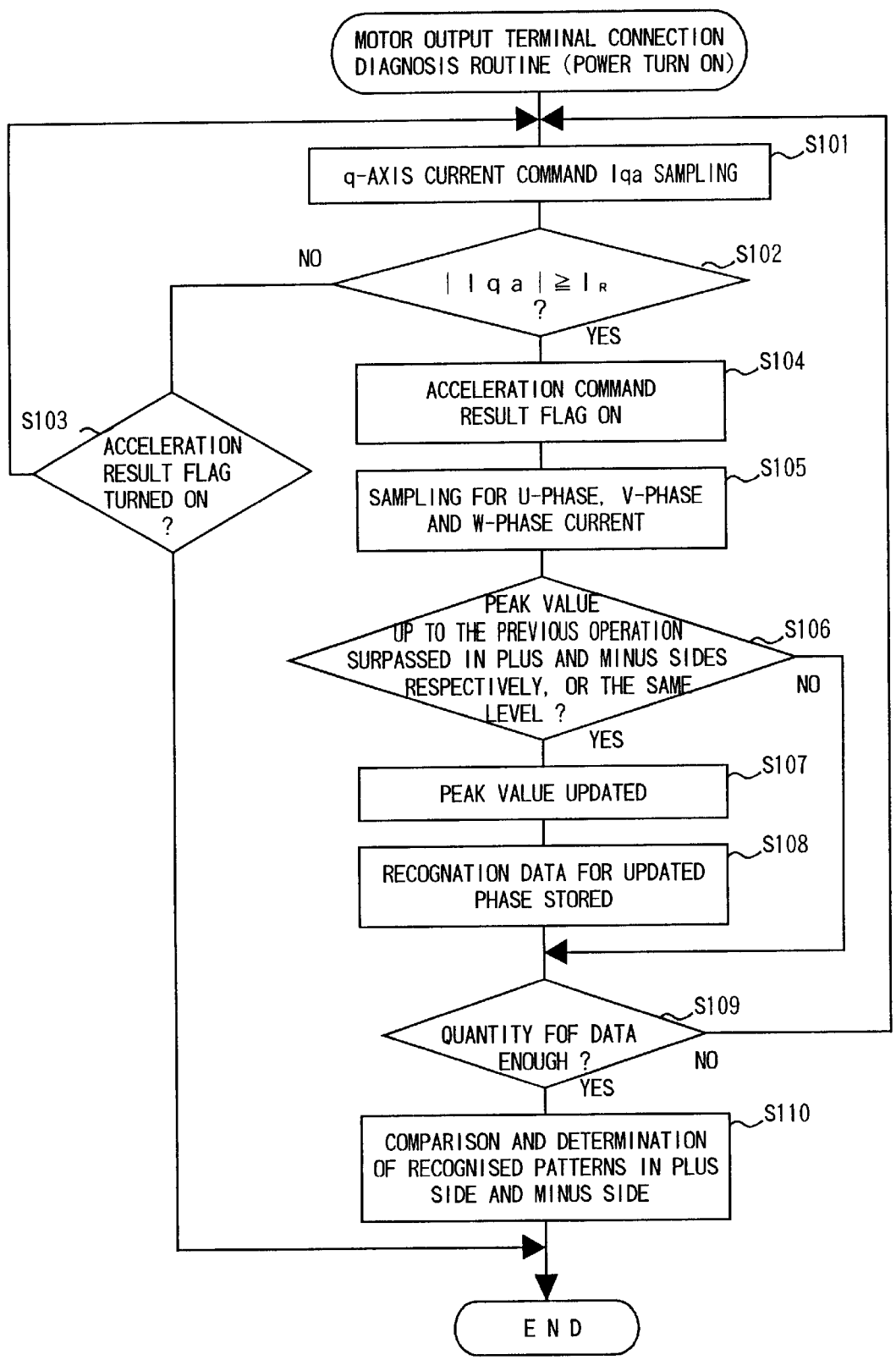
FIG. 2 is a flow chart showing a routine for diagnosing connection of motor output terminals in the method of detecting and diagnosing abnormalities in a servo control system according to the present invention.

FIG. 2 shows a routine for diagnosing connection of a motor output terminal in the method of detecting and diagnosing abnormalities in the servo control system according to the present invention.

In this connection diagnosis routine, after power is turned ON, in step 101, a q-axis current command Iqa is detected once for every sampling period, and then system operation goes to the next step S102.

In Step S102, determination is made as to whether an absolute value of the q-axis current command Iqa is more than a prespecified value $I_R$ or not, and if it is determined that the absolute value of the q-axis current command Iqa is more than the prespecified value $I_R$, it is recognized that acceleration is required, and then system operation goes to step S104. In contrast, if it is not recognized that acceleration is required, system operation goes to step S103.

In step S103, determination is made as to whether an acceleration command result flag is ON or not, and if it is determined that the acceleration command result flag is ON, it is recognized that a first acceleration request is finished. If there is misconnection in connection for a motor output terminal, the first acceleration request continues until an alarm for an excessive error or an excessive load alarm is generated, so that, if the acceleration command result flag is ON and it is recognized that the first acceleration request is finished, it is recognized that the connection is normal, and the connection diagnosis routine is finished. In contrast, if it is determined that the acceleration command result flag is not ON, it is recognized that an acceleration command request has not been generated even though power has been turned ON, and system operation returns to step S101.

In step S104, to recognize in step S103 that an acceleration command request is generated after power is turned ON, the acceleration command result flag is turned ON, and system operation goes to the next step S105.

In step S105, a current in each of U-phase, V-phase, and W-phase is detected once for every sampling period. It should be noted that it is not always necessary to detect a current flowing through a W-phase, and it is necessary to detect currents in at least two of the three phases, but in this embodiment all currents in the three phases are detected.

In the next step S106, an absolute value of a current in each phase detected as described above is compared to a peak value up to the previous operation in the plus side and minus side of current polarity respectively. As a result of comparison, if it is determined that a value obtained is higher than or equal to the peak value up to the previous operation, system operation goes to step S107, and otherwise system operation goes to step 109.

In step S107, values recognized as higher than or equal to peak values in the plus and minus sides of the current polarity are newly written as peaks values used for comparison in step S106, and system operation goes to step S108.

In step S108, recognition data of a phase or phases in which values higher or equal to peak values in the plus side and minus side of the current polarity respectively are detected are sequentially stored in memories for the respective values, and system operation goes to the next step S109.

In step S109, when a quantity of recognition data stored in the previous step S108 exceeds a certain quantity, system operation goes to the next step S110, and otherwise the system step returns to step S101.

In step S110, a patten of current wave form is found out from the recognition data stored in step S108, and determination is made as to whether there is misconnection for the motor output terminal or not.

In a case where a command for acceleration is a request for rotation of the motor in the regular direction, as shown in FIG. 3A, if the pattern indicates that peak values in currents flowing through U-phase, V-phase, and W-phase are stored in this order with peak values in U-phase as reference in both the plus and minus sides of current polarity, it is determined that connection for all of U-, V-, and W-phases is normal, and in contrast, if the pattern indicates that peaks values are stored in the order of U-, W-, and V-phases in both plus and minus sides of current polarity, it is determined that misconnection causing the sequence of V-, W-, and U-phases or W-, U- and V-phases has been implemented.

In a case where a command for acceleration is a request for rotating a motor in the reverse direction, as shown in FIG. 3B, if the pattern indicates that peak values of currents flowing through U-phase, W-phase and V-phase are stored in this order with the peak values in the U-phase as reference in both the plus and minus sides of current polarity, it is determined that connection for U-, V-, and W-phases is correct, and in contrast, if a pattern of U-, V-, and W-phases is indicated, it is determined that connection causing an order of V-, W- and U-phases, or an order of W-, U-, and V-phases is present.

In any of the cases above, if a patten of recognition data in the plus side of current polarity does not coincide with that in the minus side, it is determined that there exists other type of misconnection. With the determination described above, the connection diagnosis routine is finished.

With this connection diagnosis routine, misconnection for the motor output connection is automatically detected, which makes it possible to prevent operation of the servo control system in a state where misconnection for the motor output terminal has not been corrected.

Also as described above, with this connection diagnosis routine, it is possible to continue operation by automatically switching a voltage command output phase with software after misconnection for U-, V-, and W-phases is identified.

In this case, each voltage command output phase is replaced with each other by means of software processing according to a result of determination for misconnection as shown in FIGS. 3A, and 3B, so that the connection will be a virtually correct one. This is one of the embodiments of automatically correcting abnormalities in a servo control system according to the present invention.

FIG. 4 shows a routine for detecting a phase voltage used for diagnosing connection of a motor output terminal as well as of a bus-bar for a converter in the method of detecting and diagnosing abnormalities in a servo control system according to the present invention.

In step S201, each data for a voltage Vuv between a U-phase and a V-phase, a voltage Vvw between a V-phase and a W-phase, and a voltage Vwu between a W-phase and a U-phase each detected by the voltage detecting section 9a to 9c, converted to a digital signal by the A/D converter 6 and fetched into the CPU 7, is sampled once for every specified period of time.

In the next step S202, switching voltages Vua, Vva, and Vwa are computed depending on the data.

Vua=(Vuv−Vwu)/3
Vva=(Vvw−Vuv)/3
Vwa=(Vwu−Vvw)/3

The voltages Vua, Vva, and Vwa computed in step S202 are switching voltages in the inverter section and discrete data, and to make it easier to evaluate a level of each phase voltage, in the next step S203, the phase currents are passed through a filter having nominal values for an electro-mechanical element inductance L and an electro-mechanical element resistance R to obtain continuously smooth phase voltages Vu, Vv, and Vw.

Vu=R·Vua/(Ls+R)
Vv=R·Vva/(Ls+R)
Vw=R·Vwa/(Ls+R) Herein s indicates a Laplacian operator.

Figure 5:
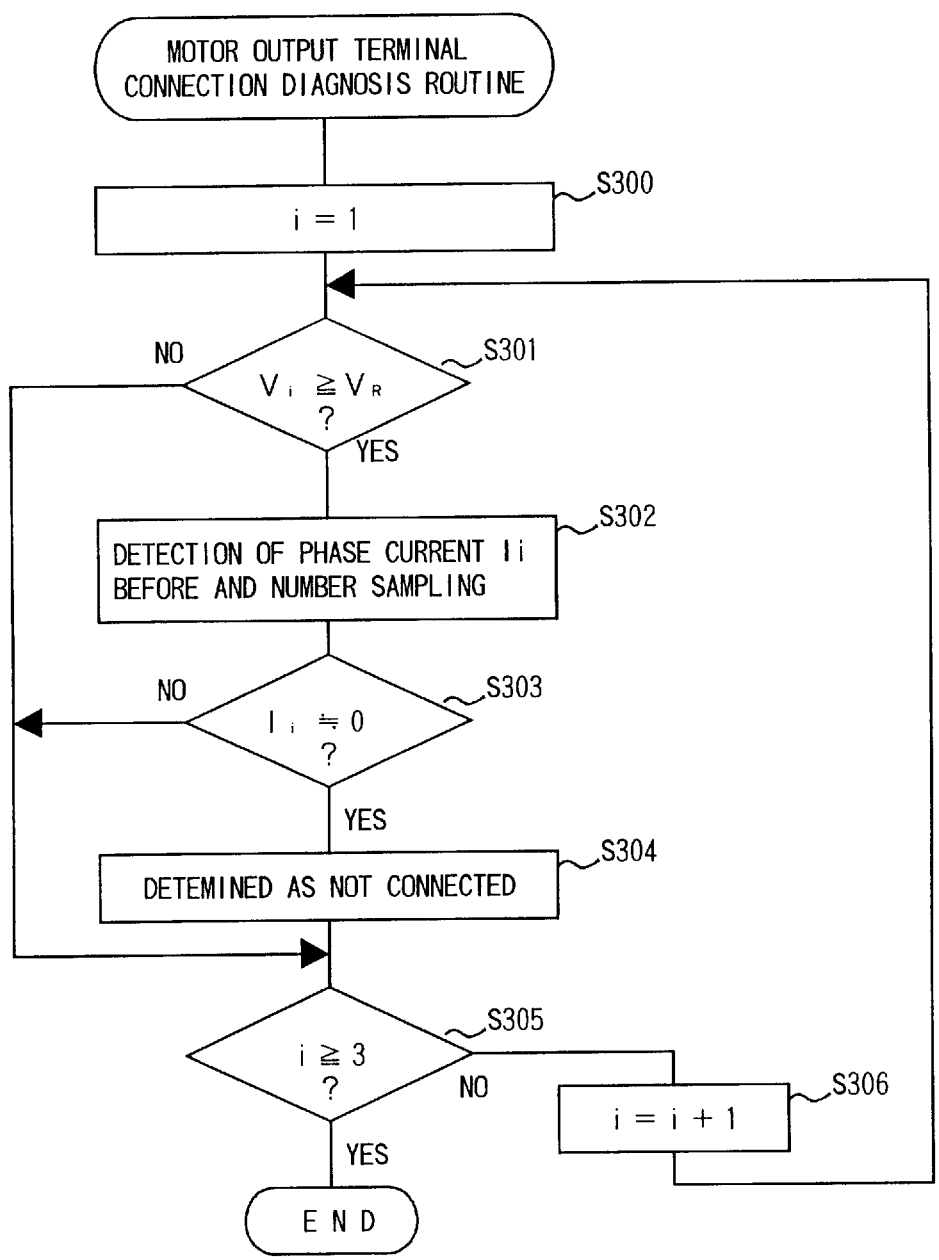
FIG. 5 is a flow chart showing a routine for diagnosing connection of the motor output terminal in the method of detecting and diagnosing abnormalities in a servo control system according to the present invention.

FIG. 5 shows a connection diagnosis routine for a motor output terminal in the method for detecting and diagnosing abnormalities in a servo control system according to the present invention. In this motor output terminal connection diagnosis routine, at first in step S300, i is set to 1, and in step S301 determination is made as to whether a phase voltage Vi (Vu, Vv, or Vw) is more than a prespecified value $V_R$ or not. If Vi is larger than or equal to $V_R$, system operation goes to the next step S302.

In step S302, a phase current Ii before and after the sampling (Iu, Iv, or Iw) are detected, and in the next step S303, determination is made as to whether the phase current Ii is almost zero or not. If the phase Ii is almost zero, then system operation goes to step S304, and it is determined that connection for i-phase has not been established.

As it is defined previously that i is equal to 1 (i =1) in U-phase, equal to 2 (i=2) in V-phase, and equal to 3 (i=3) in W-phase, in steps S301 to S303, the connection diagnosis routine is executed for U-phase, V-phase, and W-phase in this order by determining whether i is larger than or equal to 3 or not in step S305, and updating a phase i to be detected by updating i to i + 1 in step S306.

With this configuration, whether connection of the motor output terminal for each of U-phase, V-phase, and W-phase has been established or not is automatically and accurately detected.

Figure 6:
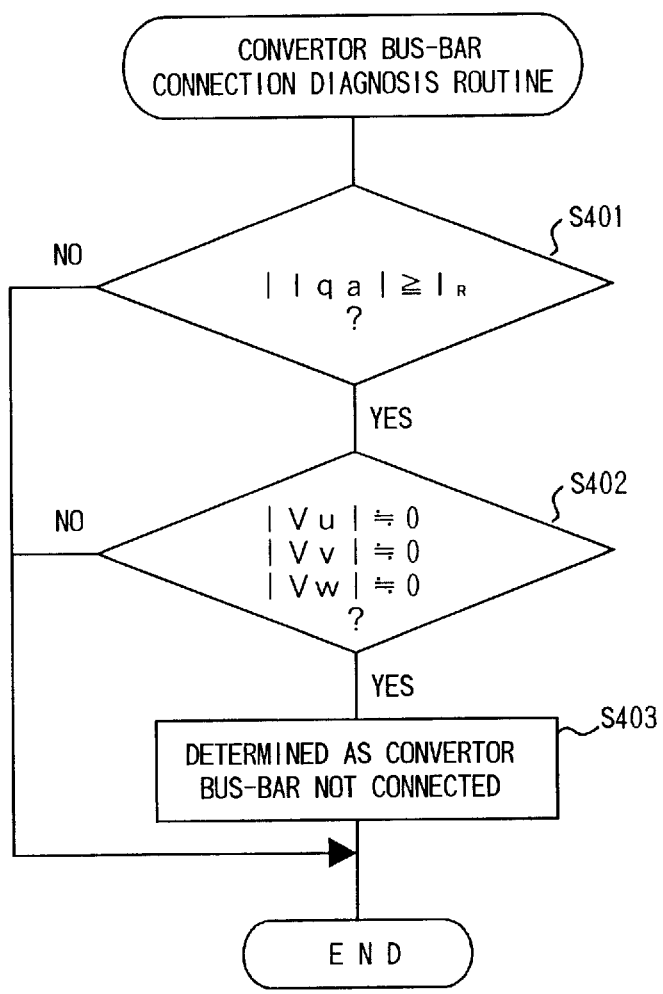
FIG. 6 is a flow chart showing a routine for diagnosing connection of the bus-bar for a converter in a method of detecting and diagnosing abnormalities in a servo control system according to the present invention.

FIG. 6 shows a connection diagnosis routine for a bus-bar for a converter in the method of detecting and diagnosing abnormalities in a servo control system according to the present invention. In this converter bus-bar connection is diagnosis routine, at first in step S401, whether an absolute value of the q-axis current command Iqa is larger than a specified value $I_R$ or not is determined. If it is determined that an absolute value of the q-axis current command Iqa is larger than the specified value $I_R$, system operation goes to step S402.

In step S402, determination is made as to whether all of the phase voltages Vu, Vv, and Vw computed in a case where it was recognized in step S401 that an amplifier is demanding acceleration are almost zero or not. If it is determined that all of the phase voltages Vu, Vv, and Vw are almost zero, system operation goes to step S403, and it is determined that connection of bus-bar for a converter has not been established.

With this configuration, the fact that connection of bus-bar for a converter has not been established is automatically and accurately detected.

Figure 7:
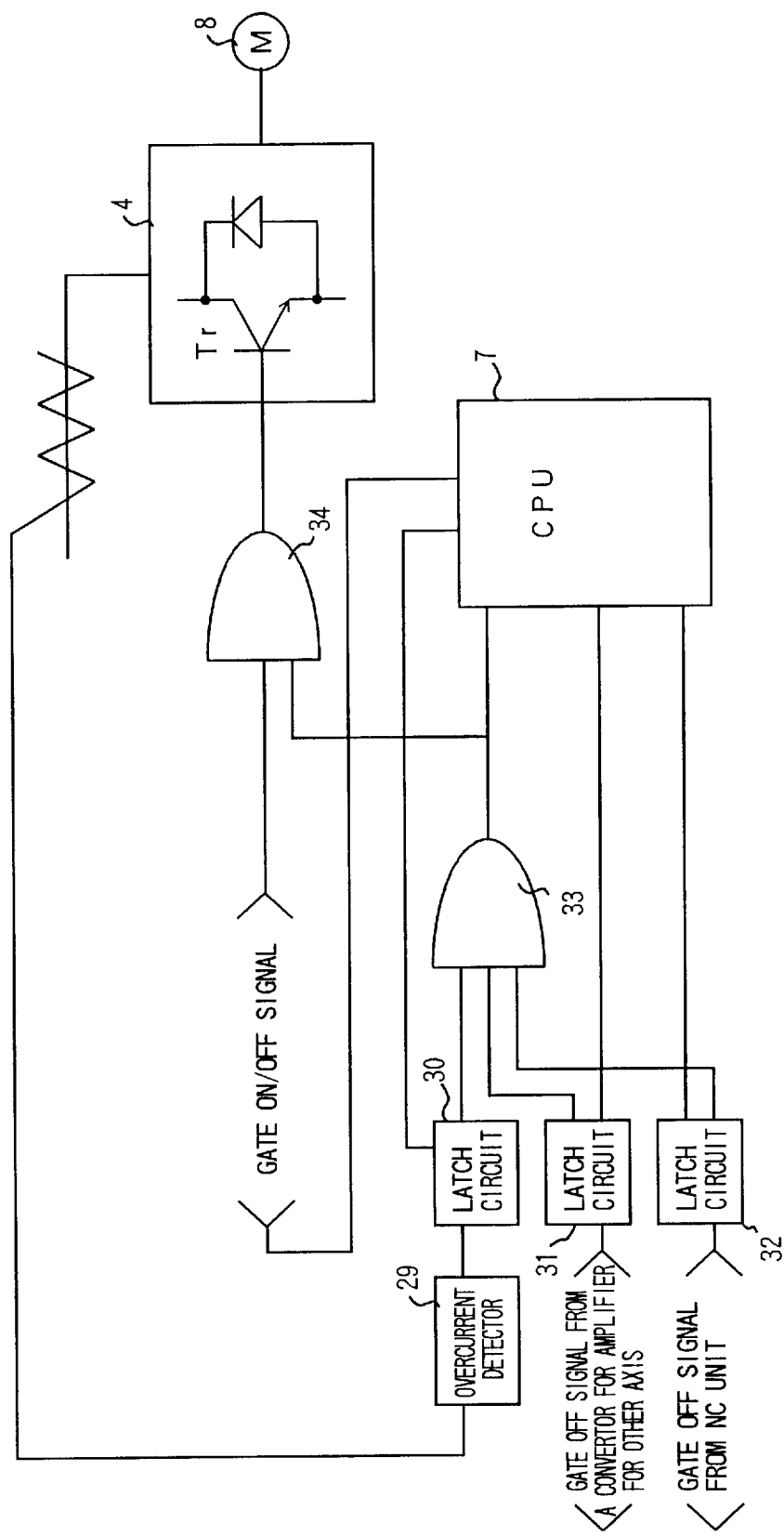
FIG. 7 is a block diagram showing a gate control circuit in a current control section used for implementation of the method of detecting and diagnosing abnormalities in a servo control system according to the present invention.

FIG. 7 shows a gate control circuit of a transistor in the semiconductor switching circuit 4 in a current control section (inverter section) used for implementation of the method of detecting and diagnosing abnormalities in a servo control system according to the present invention. This gate control circuit has an overcurrent detector 29 for detecting that an overcurrent flew in the semiconductor switching circuit 4.

The CPU 7 fetches a signal indicating that an overcurrent was detected by the overcurrent detector 29 from a latch circuit 30, a gate-off signal indicating that a gate shutdown request has been issued from an amplifier or a converter for the other axis from a latch circuit 31, and a gate-off signal from an NC unit from a latch circuit 32 respectively, and a logical product signal for these three signals is obtained by an AND gate 33.

An AND gate 34 is connected to a gate of a transistor Tr in the semiconductor switching circuit 4, and the AND gate 34 receives an output signal from the AND gate 33 and a gate ON/OFF signal outputted from the CPU 7.

In this gate control circuit, the CPU 7 checks an output from each of the latch circuits 31, 32 in a case where an overcurrent flows in the inverter section or a gate shutdown request was issued from an amplifier for other axis or a converter, or where, even though a gate-off (gate shutdown) signal from an NC unit has been generated, no alarm is detected and a gate-off signal is not issued to the AND gate 34 based on the recognition that the system is working normally; sets a corresponding flag in a section where the gate shutdown request signal was generated according to a result of checking above, stores times of generation of the signal for a certain period of time in the past in a memory and determines, if the times exceeds a certain value, that some abnormality exists in the section where the signal was generated. With this configuration, a cause for abnormality (a section where the abnormality exists) such as an excessive error, or feedback fault in a control system can automatically be detected and determined.

Figure 8:
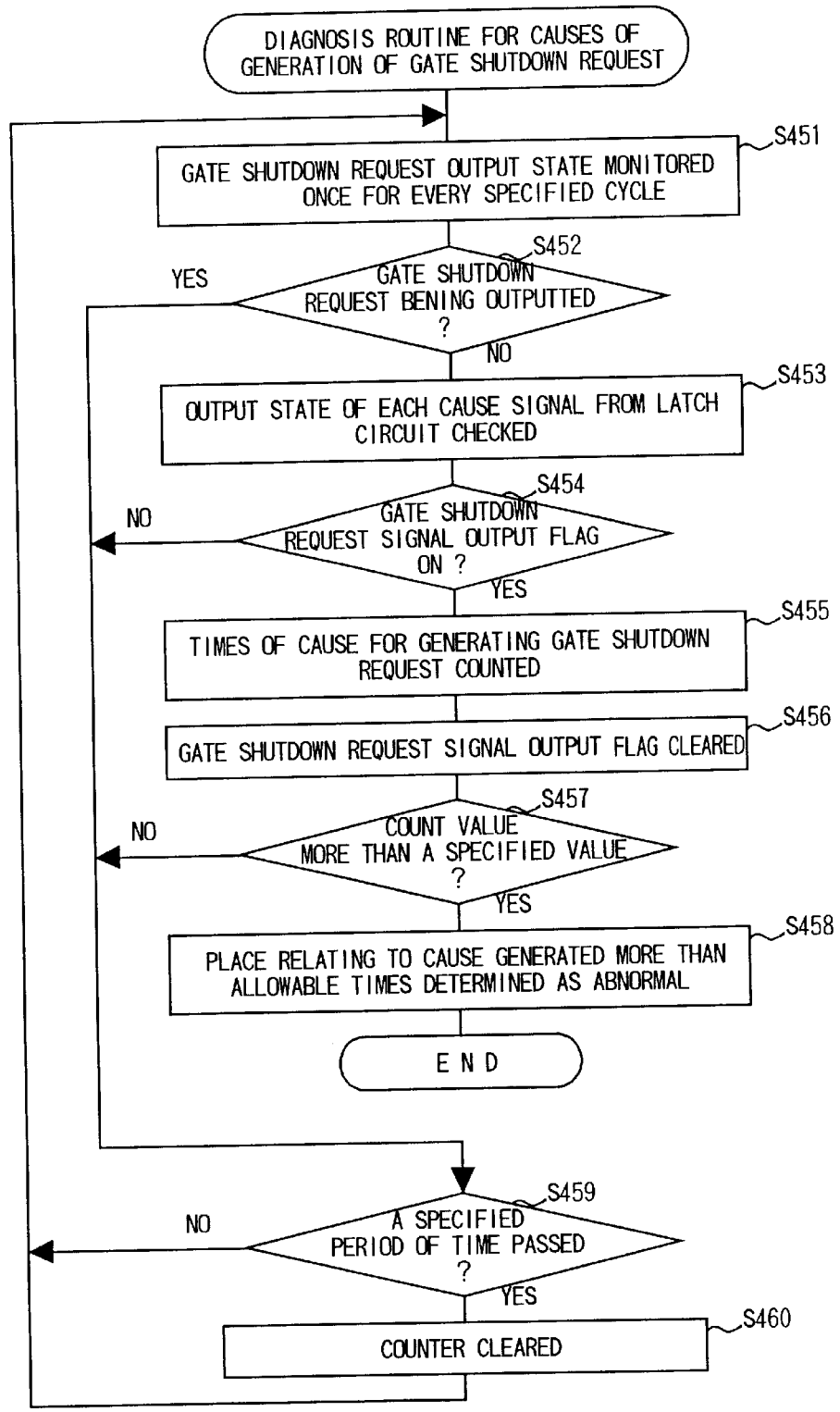
FIG. 8 is a flow chart showing a routine for diagnosing causes of generation of a gate shutdown in the method of detecting and diagnosing abnormalities in a servo control system according to the present invention.

FIG. 8 shows a routine for diagnosing a cause for generation of a gate shutdown request in the method of detecting and diagnosing abnormalities in a servo control system according to the present invention.

In this diagnosis routine, in step S451, a gate shutdown request output state to the AND gate 34 is monitored with a prespecified cycle, and in step S452, determination is made as to whether a gate shutdown request, namely a gate-off signal is being outputted to the AND gate 34 or not.

If it is determined that a gate shutdown request is not being outputted, system operation goes to step S453, and in step S453, an output state of each cause signal from the latch circuits 31, 32 is checked.

Then in step S454, a result of checking of an output: state from the latch circuits 31, 32 is reflected to a gate shutdown signal output flag in the CPU 7, and if the gate shutdown signal output flag is ON, system operation goes to step S445, and times of gate shutdown output request generated for each cause of abnormality (times when the gate shutdown signal output flag is turned ON for each latch circuit) is counted.

In the next step S456, the gate shutdown signal output flag is cleared off, and in the next step S457, determination is made as to whether a count value for output of gate shutdown request has exceeded a prespecified value or not.

If the count value of gate shutdown request output has exceeded a prespecified value, system operation goes to step S458, and a section where abnormality causing generation of gate shutdown requests more than a prespecified value exists (for instance, a converter or an NC unit for other axis) is determined.

It should be noted that, if it is determined in step S452 that a gate shutdown request is being outputted, system operation goes to step S459, where determination is made as to whether a specified period of time has been passed or not, and if it is determined that a specified period of time has passed, system operation goes to step S460, and a count value for times of gate shutdown request output is cleared to zero. With this configuration a section where an abnormality such as an excessive error or feedback fault in the servo control system can quickly be found out.

Figure 9:
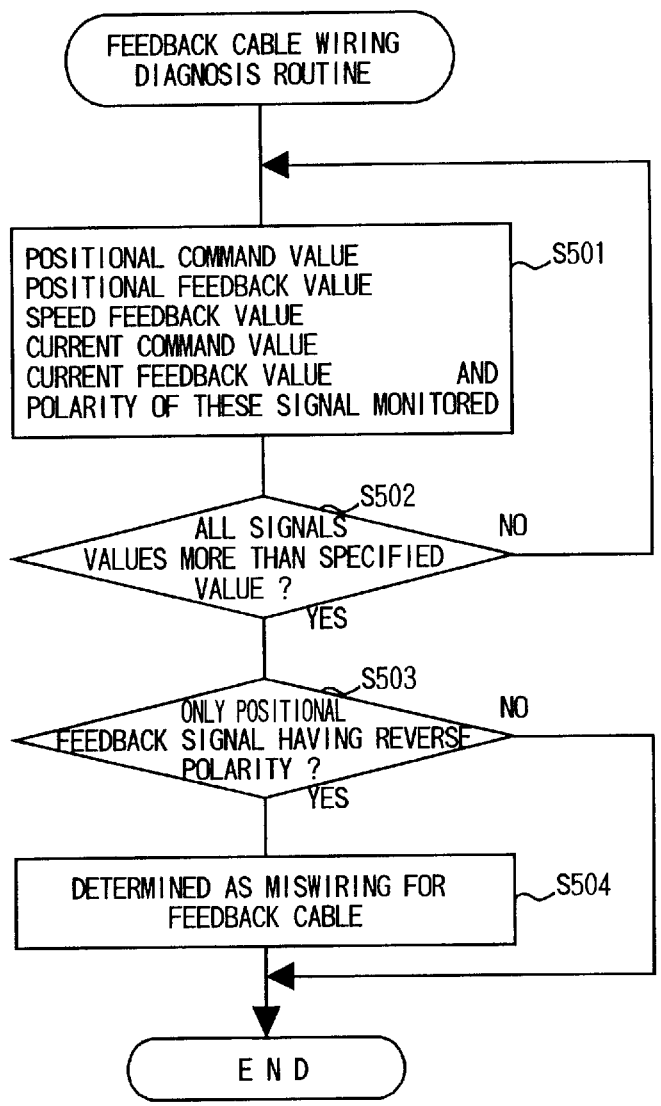
FIG. 9 is a flow chart showing a routine for diagnosing wiring of a feedback cable in the method of detecting and diagnosing abnormalities in a servo control system according to the present invention.

FIG. 9 shows a wiring diagnosis routine for a feedback cable in the method of detecting and diagnosing abnormalities in a servo control system according to the present invention. This feedback cable wiring diagnosis is an application to a servo control system based on the full closed loop shown in FIG. 43, and at first in step S501, a positional command value outputted from an NC unit 10, a positional feedback value outputted from a machine edge position detector 19, a speed feedback value outputted from a motor edge position detector 18, a current command value outputted from a speed control section 12, a current feedback value, and polarity of each signal are always detected and monitored from power turn ON.

Then in step S502, determination is made as to whether all of these signal values are more than a prespecified value respectively, and if it is determined that all of these signal values are more than a prespecified value respectively, system operation goes to step S503.

In step S503, determination is made as to whether only the positional feedback value has a reverse polarity or not, and if it is determined that only the positional feedback signal has a reverse polarity, system operation goes to step S504, and it is determined that wiring for the feedback cable is not correct.

With this configuration, miswiring for the feedback cable is automatically and accurately detected.

Figure 10:
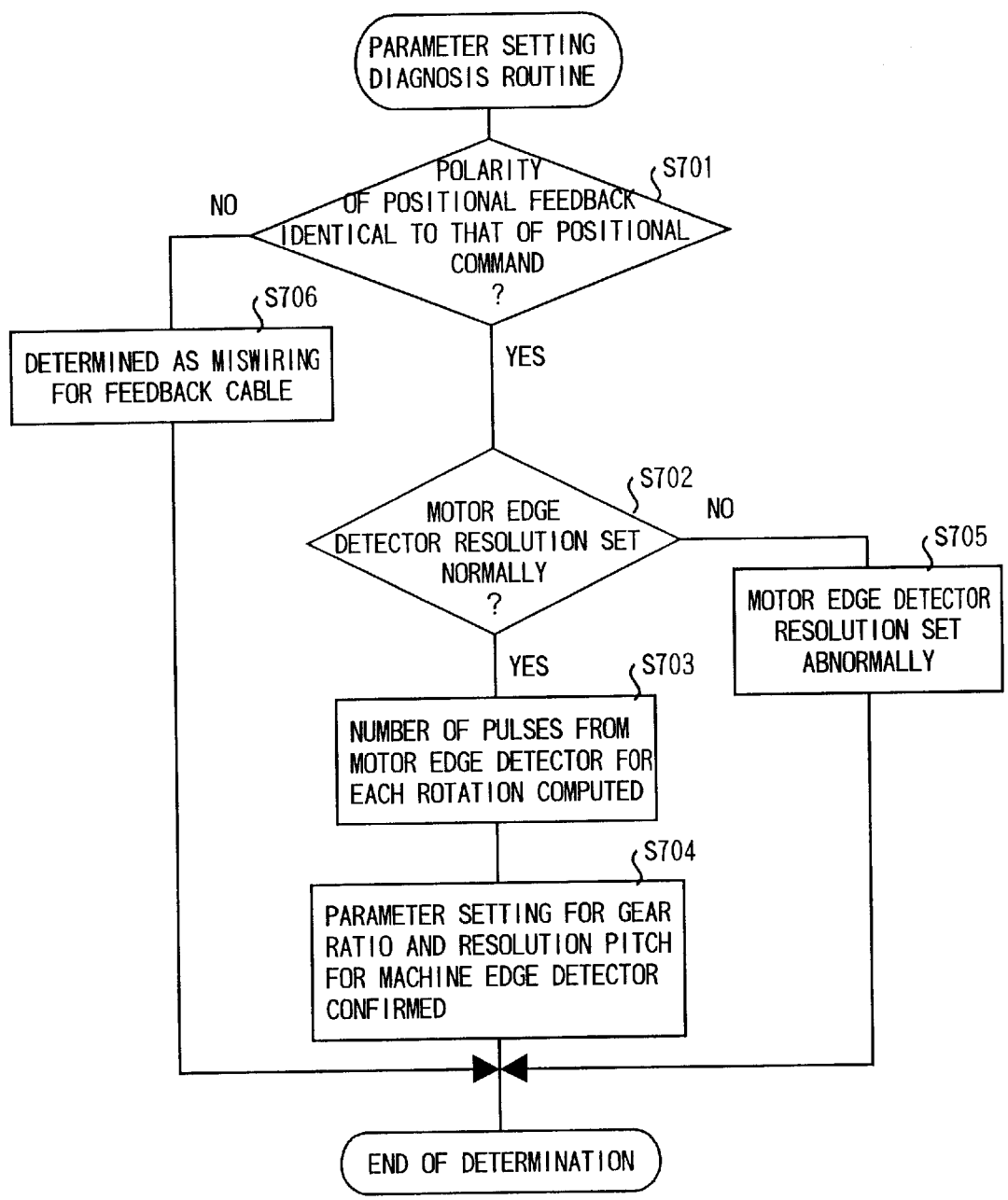
FIG. 10 is a flow chart showing a routine for diagnosing parameter setting in the method of detecting and diagnosing abnormalities in a servo control system according to the present invention.

FIG. 10 shows a parameter setting diagnosis routine in the method of detecting and diagnosing abnormalities in a servo control system according to the present invention. In the parameter setting diagnosis routine, at first in step S701, determination is made as to whether polarity of a positional feedback signal is the same as that of a positional command or not, and if it is determined that the two signals have the same polarity, system operation goes to step S702, and if it is determined that the two signals do not have the same polarity, system operation goes to step S706.

In step S702, a number of pulses from Z-phase to Z-phase of the motor edge position detector 18 is counted, and whether the number of pulses coincides with a preset resolution of the motor edge position detector or not is checked. If it is determined that the setting is correct, system operation goes to the next step S703, and otherwise to step S705.

In step S703, when positioning for a certain feed rate is executed, how many times the servo motor 8 rotated is computed from a resolution of the machine edge position detector 19 and a number of pulses then, and a number of pulses for one rotation of the motor edge detector 18 is computed.

Then in step S704, if a result of checking above indicates that the detected resolution is X times higher than the actual resolution of the motor edge detector, it is determined that the actual setting is X times erroneous than the rated setting (X = Gear ratio/resolution of the machine edge position detector/pitch).

In step S705, it is determined that setting of resolution of the motor edge position detector 18 is abnormal.

In step S706, it is determined that wiring for the feedback cable is incorrect.

With this configuration, when a feedback fault occurs in initialization of a machine, determination is made as to whether the fault occurred due to abnormalities in machine (scale abnormalities), or due to a mistake in parameter setting a gear ratio, or a resolution of a machine edge position detector, or a pitch.

Figure 11:
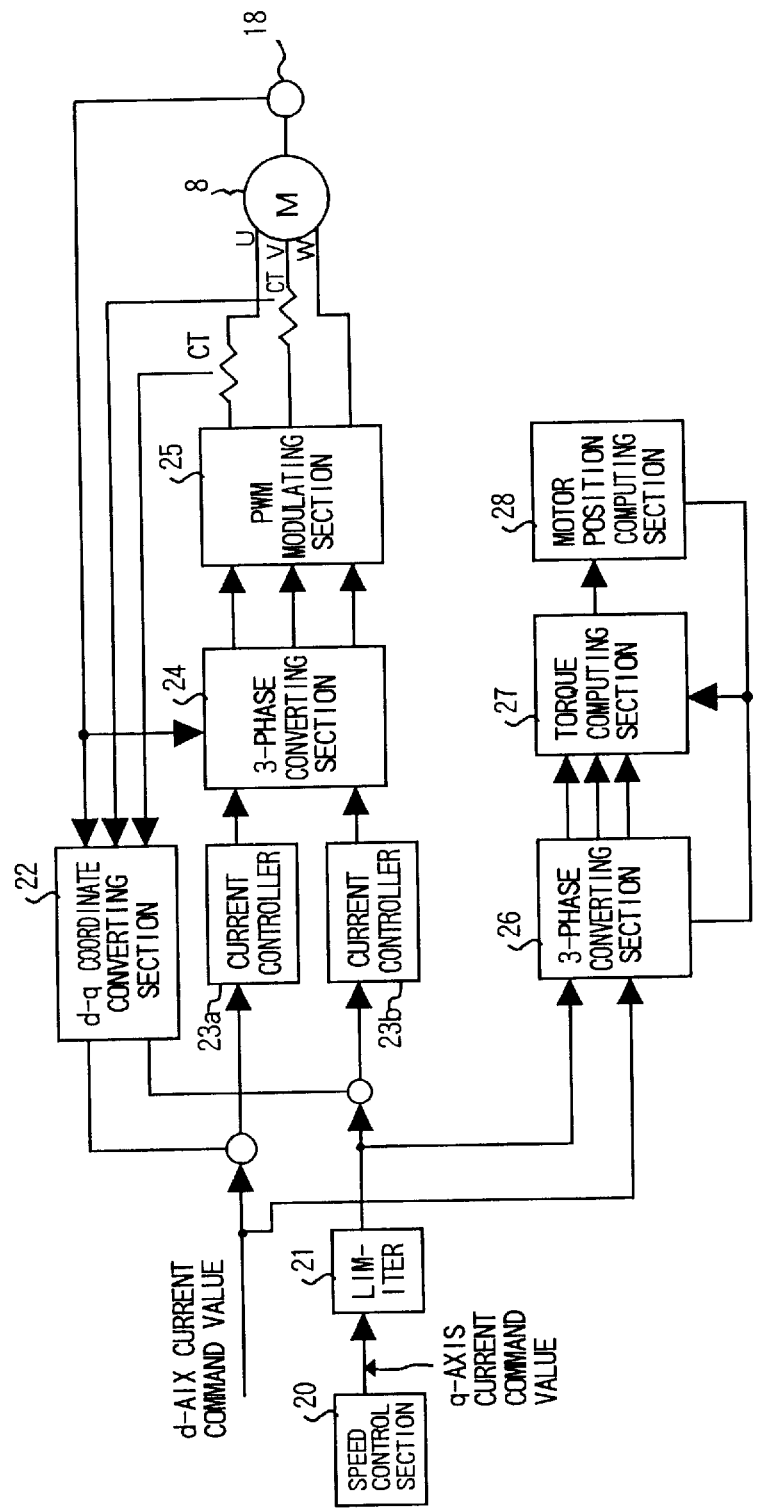
FIG. 11 is a block diagram showing internal configuration in the current control section used for implementation of the method of detecting and diagnosing abnormalities in a servo control system according to the present invention.
Figure 44:
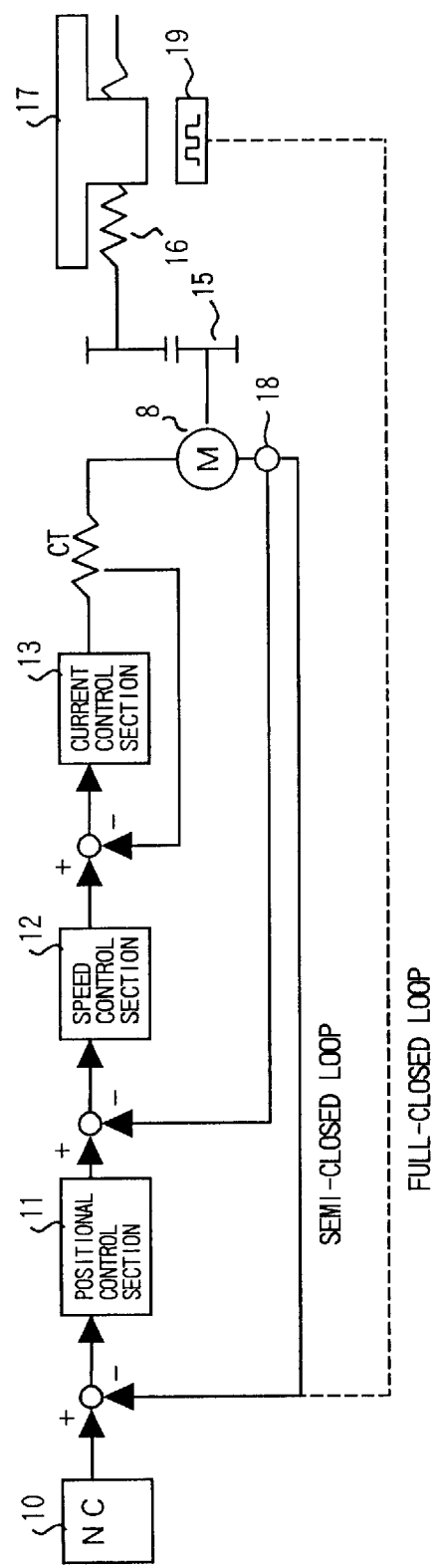
FIG. 44 is a block diagram showing a general servo control system.
Figure 45:
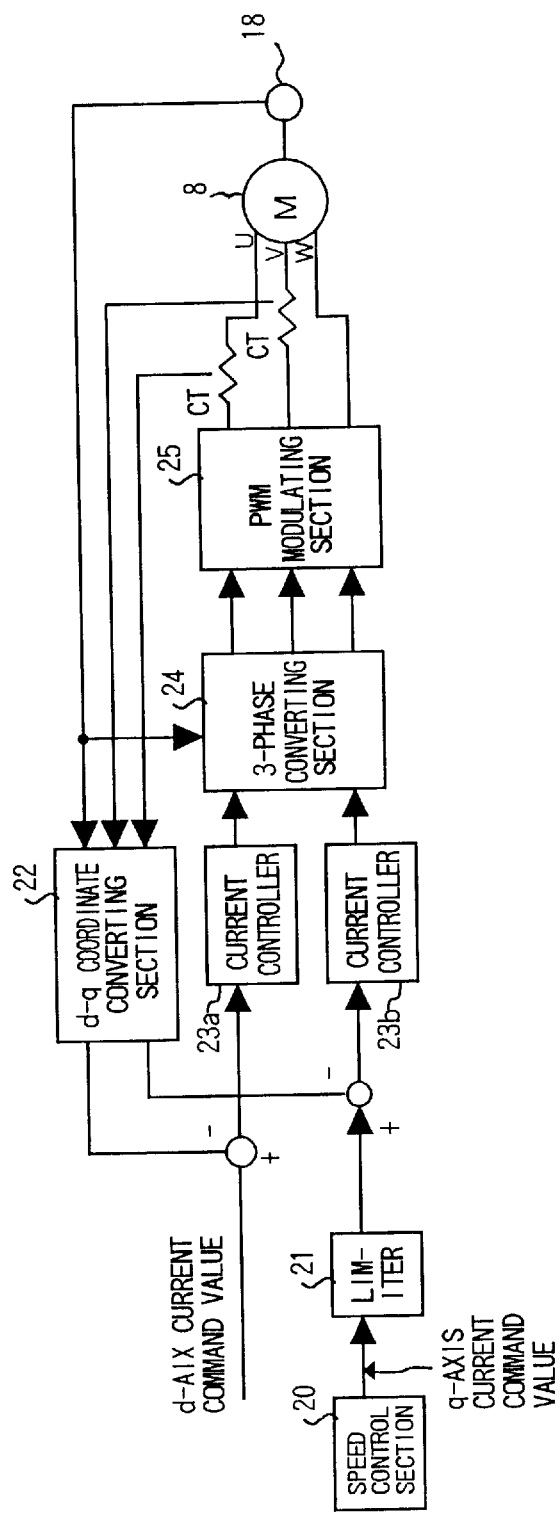
FIG. 45 is a block diagram showing a current control section of an AC servo motor.

FIG. 11 shows internal configuration of a current control section used in the method of detecting and diagnosing abnormalities in a servo control system according to the present invention. This current control section corresponds to a current control section 13 in a general servo control system as shown in FIG. 43, and comprises, in addition to configuration of the conventional type of current control section shown in FIG. 44, a three-phase converting section 26, a torque computing section 27, and a motor position computing section 28.

The three-phase converting section 26 subjects d-axis and q-axis current command values to three-phase conversion using a magnetic pole position actually detected from a motor edge as a initial value in the initial stage of acceleration or deceleration, and obtains three-phase currents Ium, Ivm, and Iwm for a motor model. The torque computing section 27 computes a model output torque Tem from the model three-phase current values Ium, Ivm, and Iwm outputted from the three-phase converting section 26 as well as from a torque constant KT.

The motor position computing section 28 computes a magnetic pole position θrm of the motor model using the model output torque Tem outputted from the torque computing section 27 and a nominal value for inertia and a number of magnetic poles, and then computes a motor model output torque Tem though the following expression using the three-phase current values Ium, Ivm, and Iwm subjected to three-phase conversion in the motor model and the magnetic pole position θrm:

$$Tem = \sqrt{\frac{2}{3}} \cdot KT \cdot \{-Ium \cdot \sin\theta rm - Ivm \cdot \sin(\theta rm - 2\pi/3) - Iwm \cdot \sin(\theta rm - 2\pi/3)\}$$

From the motor model output torque Tem computed as described above, a positional feedback value θm for the motor model is obtained. Further a difference between a positional feedback value θm for the motor model obtained as described above and a positional feedback value θ for an actual motor edge is monitored, and when this value is within an allowable range after a current value is limited, it is determined until immediately before generation of an alarm indicating an excessive error or an overload that a constant for acceleration or deceleration is too small. With this configuration, shortage of a constant for acceleration or deceleration is recognized.

When the difference between the positional feedback value θm for the motor model and the positional feedback value θ for the actual motor edge exceeds a prespecified value, if an error between an actual value for a rotor inertia or a load inertia and a set value is within a allowable range and such an event of incorrect gate shutdown has not occurred, it is determined that there exists an overload. With this configuration, it is recognized that an overload, namely an abnormal load exists.

Figure 12:
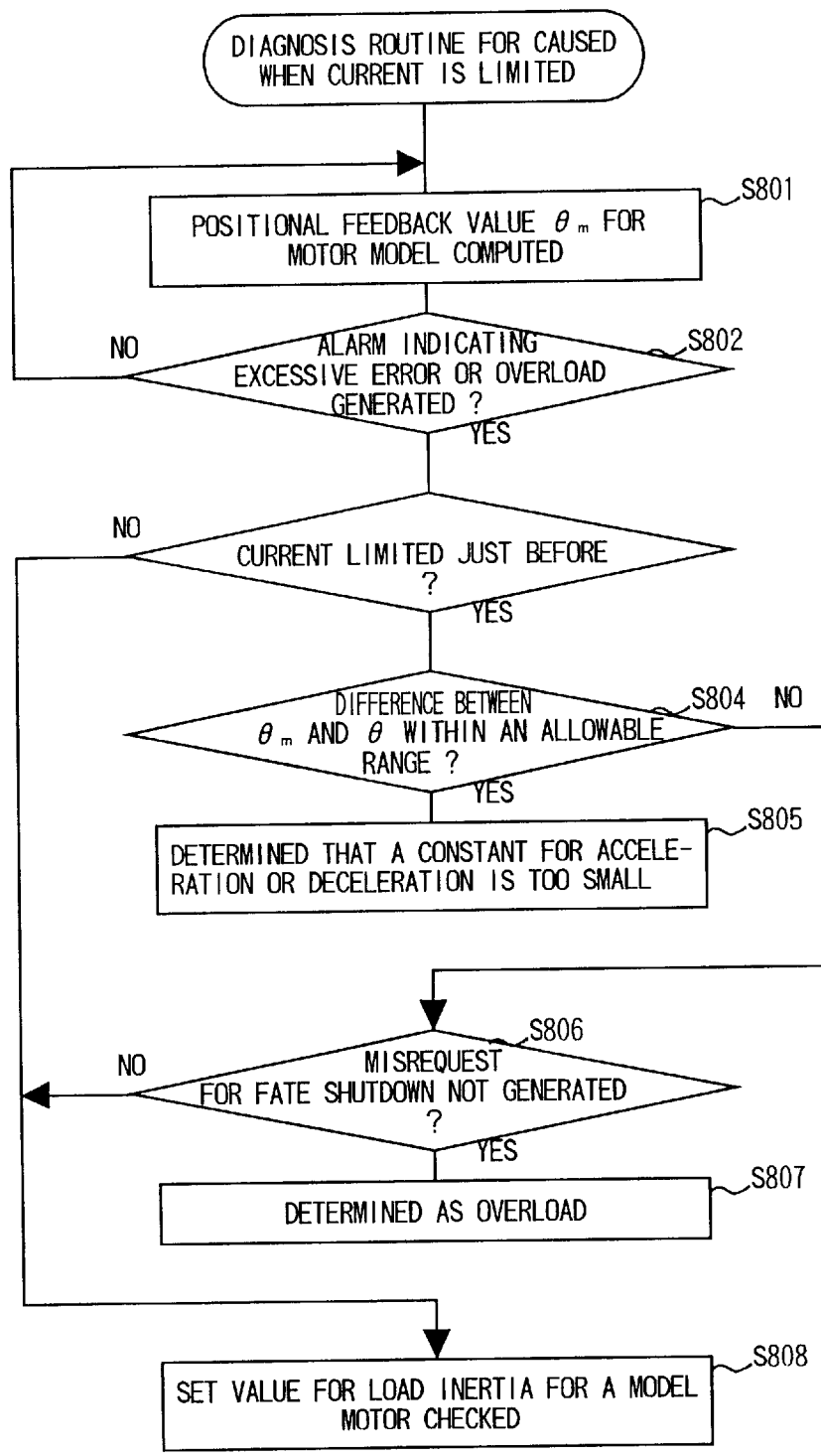
FIG. 12 is a flow chart showing a routine for diagnosing for searching causes while power is being controlled in the method of detecting and diagnosing abnormalities in a servo control system according to the present invention.

FIG. 12 shows a diagnosis routine for searching for a cause when a current is limited in the method of detecting and diagnosing abnormalities in a servo control system according to the present invention.

In this routine, at first in step S801, a positional feedback value θm for a motor model is computed.

Then in step S802, determination is made as to whether an alarm indicating an excessive error or an overload has been generated or not, and if it is determined that an alarm indicating an excessive error or an overload has been generated, system operation goes to step S803, and determination is made as to whether a current had been limited until immediately before generation of the alarm or not.

If it is determined that a current had been limited, system operation goes to step S804, and determination is made as to whether a positional feedback value θm for the motor model and a positional feedback for the actual motor edge is within an allowable range or not.

If it is determined that the difference between the positional feedback θm for the motor model and the positional feedback θ for the actual motor edge is within an allowable range, system operation goes to step S805, and it is determined that a constant for acceleration or deceleration is too small.

In contrast, if it is determined that the difference between the positional feedback value θm for the motor model and the positional feedback θ for the actual motor edge is not within an allowable range, system operation goes to step S806, and determination is made as to whether a misrequest for gate shutdown or the like has been generated or not. If it is determined that a misrequest for gate shutdown or the like has not been generated, system operation goes to step S807, and it is determined that there exists an overload.

It should be noted that, in a case wherein it is determined in step S803 that a current had not been limited, system operation goes to step S809, and a set value for load inertia for a motor model is checked. With this diagnosis routine, diagnosis for adaptability of a constant for acceleration or deceleration and determination for an overload are executed.

The method of automatically correcting abnormalities in a servo control system according to the present invention is carried out to a general servo control system as shown in FIG. 43, and when power for an amplifier is turned ON, of a semi-closed loop system and a full closed loop system, always a semi-closed system is selected for positional control with a feedback signal from the motor edge position detector 18. Then also a feedback signal from the machine edge position detector 19 is processed simultaneously, and checking is executed as to whether an accumulated range of movement detected by the motor edge detector 18 coincides with the polarity or not. If the two parameters coincide, system control shifts to positional control based on a full-closed loop system, while if the polarity is reverse, system control automatically shifts to positional control based on a full-closed loop system without stopping the system operation by reverting positional data accumulated by the machine edge position detector 19.

Figure 13:
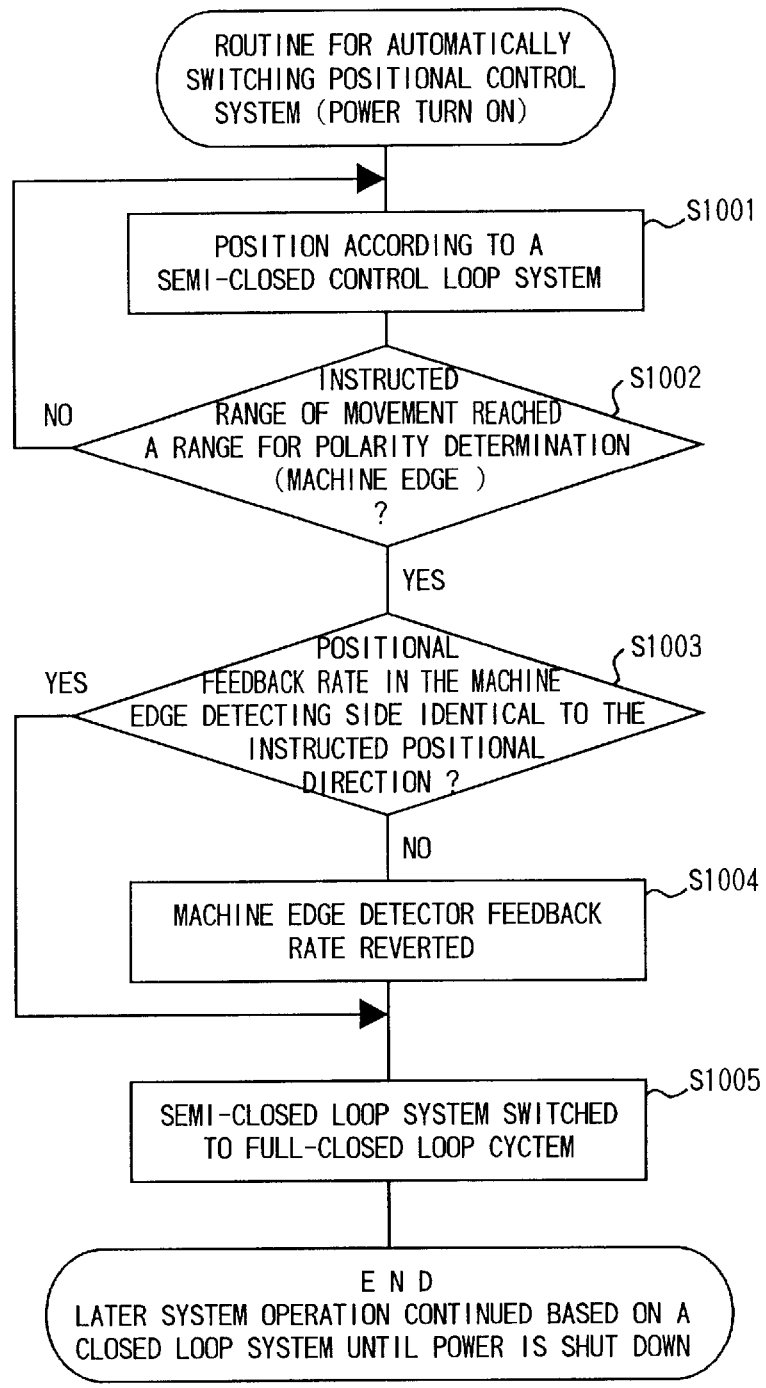
FIG. 13 is a flow chart showing a routine for automatically switching positions in a position control system in the method of automatically correcting abnormalities in a servo control system according to the present invention.

FIG. 13 shows a routine for automatically switching a positional control system in the method of automatically correcting abnormalities in a servo control system according to the present invention. In step S1001, as power had just been turned ON, positional control based on a semi-closed loop system is executed.

Then in step S1002, determination is made as to whether an accumulated range of movement according to a positional command from the NC unit 10 has reached a prespecified value (e.g., 1 mm) or not, namely as to whether a specified range of movement has reached a range for polarity determination by the machine edge position detector 19 or not. If it is determined that the accumulated range of movement according to a positional command from the NC unit 10 has reached a prespecified value, system operation goes to step S1002.

In step S1003, an accumulated feedback position in the full-closed loop side is compared to code of an instructed accumulated position, namely checking is made as to whether polarity of a positional feedback rate of the machine edge position detector 19 coincides with that of a positional command or not. If it is determined that polarity of a positional feedback rate of the machine edge detector 19 coincides with that of a positional command, system operation goes to step S1005, and otherwise to step S1004.

In step S1004, the accumulated feedback rate generated by the machine edge position detector 19 is reverted.

In step S1005, a feedback signal for the accumulated range of movement up to the point of time is switched to the full-closed loop side, and positional control based on a semi-closed loop system is switched to that based on a full-closed loop system.

With this configuration, even if polarity of a positional feedback rate from the machine edge position detector 19 does not coincide with that of a positional command when the system is initialized, a system state for the polarity is automatically corrected, and system operation can be continued without being stopped.

As described above, positional control can be executed by storing reverse polarity of a feedback from the machine edge position detector automatically detected in a non-volatile memory and using the correct feedback polarity from the first time when power is turned ON again.

However, as there is the possibility that some error to some mechanical elements such as backlash may be included in the semi-closed loop system, it is desirable to add a filter such as that for a primary delay for switching.

In the method of automatically correcting abnormalities in a servo control system according to the present invention, positional control based on a full-closed loop system using a machine edge position detector 19 is executed since just after power is turned ON, and if the error with a feedback rate by the motor edge position detector 18 becomes larger than a specified value, the system state can automatically be corrected by reverting a feedback rate by the machine edge position detector 19 up to the point of time.

Figure 14:
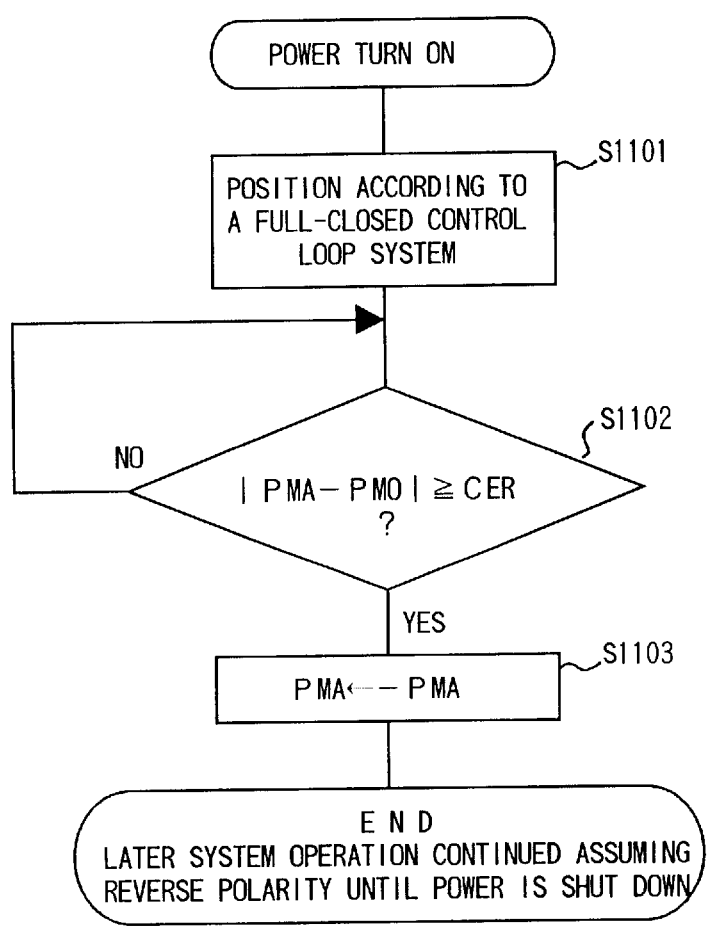
FIG. 14 is a flow chart showing a routine for automatically reverting a polarity in the method of automatically correcting abnormalities in a servo control system according to the present invention.

FIG. 14 shows a routine for automatically reverting polarity in the method of automatically correcting abnormalities in a servo control system according to the present invention. In step S1101, just after power is turned ON, the positional control mode based on a closed-loop system is formed as in the ordinary operation. In the next step S1102, checking is made as to whether a difference between a feedback position PMA in the side of full-closed loop and a feedback position PMO in the side of semi-closed loop has reached a preset reference value CER for identifying reverse polarity of feedback based on a full-closed loop system or not, and also as to whether signs of the two types of positional feedback above are contrary to each other or not. If it is determined that the difference has reached the reference value CER for determination and also that the signs are contrary to each other, system operation goes to step S1103.

In step S1103, an accumulated feedback position in the full-closed loop side is reverted, and after that a range of movement is regarded in processing as having reverse polarity.

With this configuration, also in this case, even if polarity of a positional feedback rate from the machine edge position detector 19 is reverted when the system is initialized, the system state concerning the polarity is automatically corrected, and system operation can be continued without being interrupted.

Also in this case, by storing the automatically detected reverse polarity of feedback from the machine edge position detector 19 in a non-volatile memory, positional control can be carried out with a correct feedback polarity from the first operation when power is turned ON next.

Figure 15:
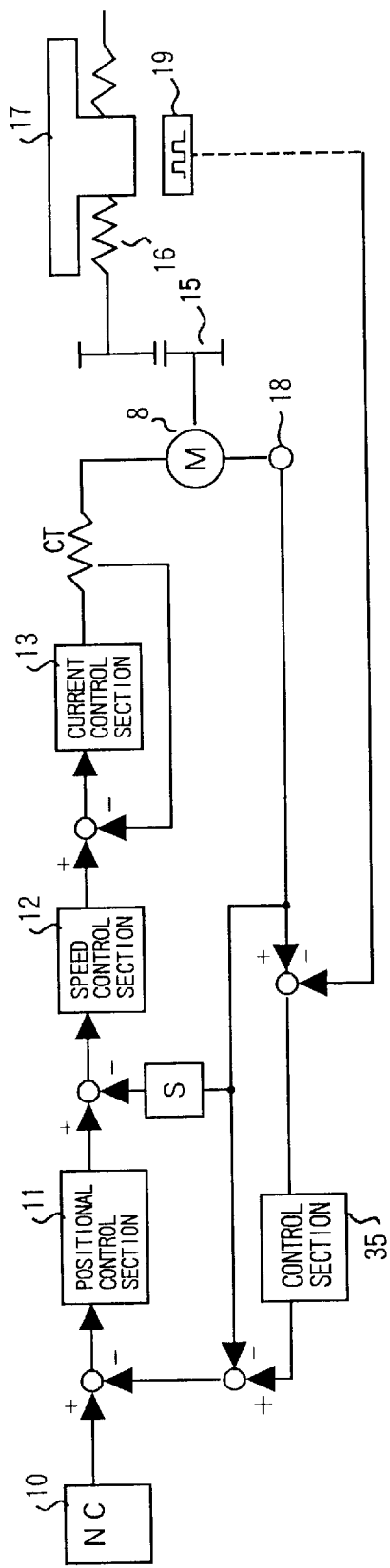
FIG. 15 is a block diagram showing a servo control system in a dual feedback control system used for implementation of the method of automatically correcting abnormalities in a servo control system according to the present invention.

FIG. 15 shows a servo control system based on a dual feedback control system used for implementation of the method of automatically correcting abnormalities in a servo control system according to the present invention. This servo control system has a control section 35 for filtering for primary delay a difference between a feedback position by the motor edge position detector 18 and a feedback position by the machine edge position detector 19, and an output from the control section 35 is used as an actual positional feedback rate.

This dual feedback control is statically based on a full-closed loop system, and is a control for following a difference between positional feedback provided by the motor edge position detector 18 and that provided by the machine edge position detector 19 with a certain time constant, which is applied to a machine with low rigidity.

Figure 16:
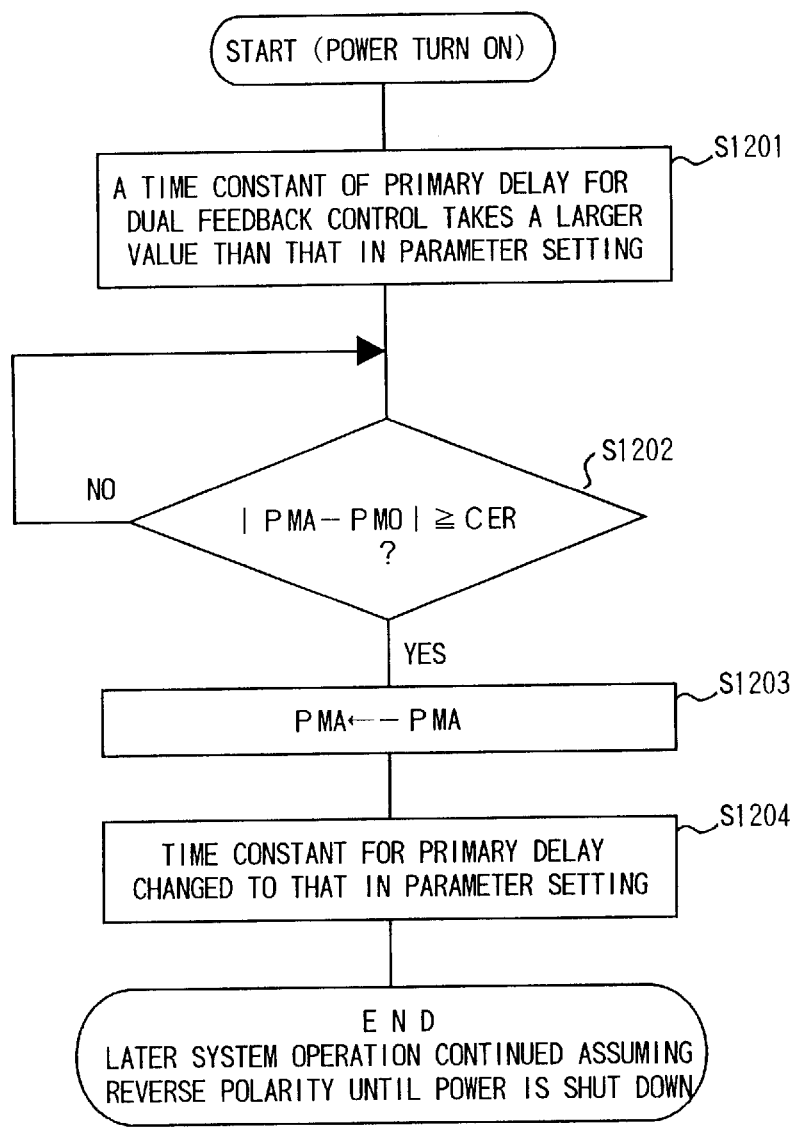
FIG. 16 is a flow chart showing a routine for automatically reverting a polarity in the servo control system in the dual feedback control system.

FIG. 16 shows a routine for automatically reverting polarity in a servo control system based on the dual feedback control system described above. In step S1201, immediately after power is turned ON, dual feedback control is formed. Then a time constant for primary delay filter is set to a value larger than an ordinary set value.

In the next step S1202, checking is made as to whether a difference between a feedback position PMA in the full-closed loop side and a feedback position PMO in the semi-closed loop side has reached a preset reference value CER for determination of reverse polarity of feedback based on a full-closed loop system, and also as to whether signs of the two feedback positions above are contrary to each other or not. If it is determined that the difference has reached the reference value CER for determination and also that the signs are contrary to each other, system operation goes to step S1203.

In step S1203, an accumulated feedback position in the full-closed loop side is reverted, and later a range of movement is processed assuming reverse polarity.

In step S1204, a time constant for the primary delay filter for dual feedback control is reset to a value in parameter setting, and system operation is continued.

With this configuration, even if polarity of a positional feedback rate of the machine edge position detector 19 is reverted, like in this case, when the system is initialized, system state concerning the polarity is automatically corrected and system operation can be continued without being interrupted.

Also in this case, by storing reverse polarity of feedback from the machine edge position detector 19 in a non-volatile memory, positional control can be executed with correct feedback polarity from the first operation when power is turned ON again.

Figure 17:
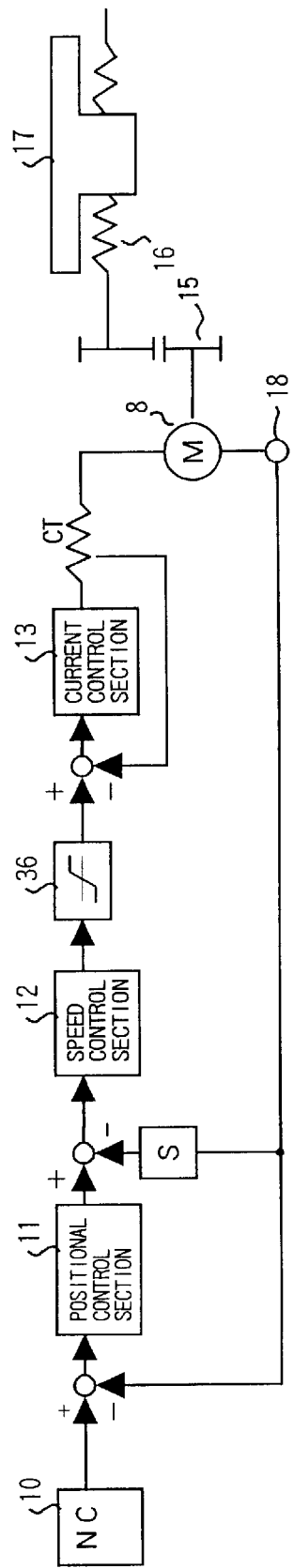
FIG. 17 is a block diagram showing an embodiment of the servo control system used for implementation of the method of automatically correcting abnormalities in a servo control system according to the present invention.

FIG. 17 shows an embodiment of a servo control system used for implementation of the method of automatically correcting abnormalities in a servo control system according to the present invention. This servo control system includes a control section 36 for clamping a maximum value of a current command computed by the speed control section 12.

Figure 18:
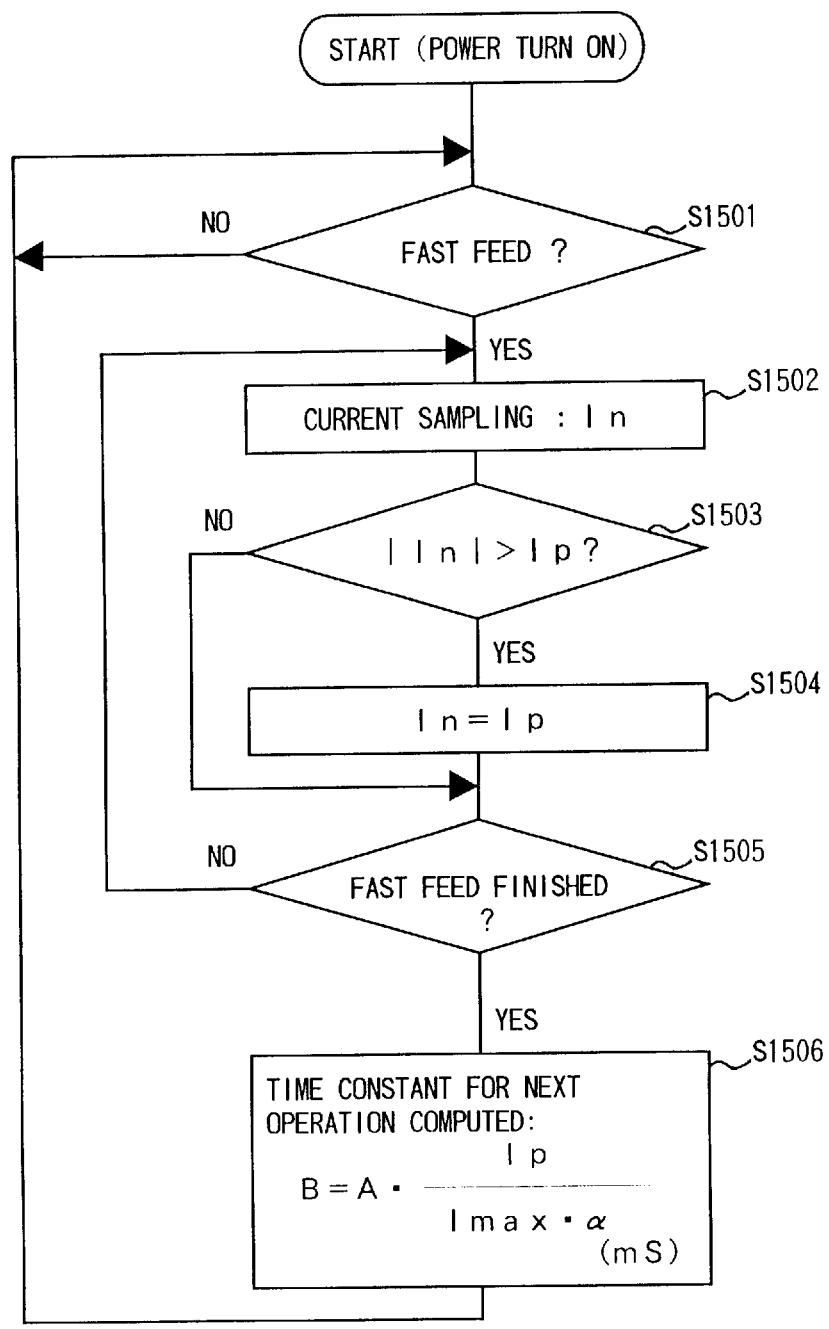
FIG. 18 is a flow chart showing an embodiment of a routine for correcting a time constant in the method of automatically correcting abnormalities in a servo control system according to the present invention.

FIG. 18 shows a routine for correcting a time constant in acceleration or deceleration in the method of automatically correcting abnormalities in a servo control system according to the present invention.

At first in step S1501, determination is made as to whether fast feed is now being executed or not. If it is determined that fast feed is now being executed, system operation goes to step S1502, and a current command value In is sampled. Sampling of this current command value In is executed at a certain cycle (at max. several ms) during fast feed.

Next in step S1503, an absolute value |In| of the sampled current command value is compared to a maximum value Ip of a current command sampled up to the previous time during fast feed this time. If |In| is larger, system operation goes to step S1504, and the maximum value Ip is changed to |In| in the current cycle.

Then in step S1505, determination is made as to whether fast feed in a current cycle has been finished or not. "In fast feed" defined herein indicates a total time required for movement in one operation. When fast feed is finished, system operation goes to step S1506, and when fast feed is not finished, system operation returns, after a sampling cycle is over, to step S1502, and then the next current command value In is sampled.

In step S1506, a ratio β of a maximum value Ip of a current command in a current cycle of fast feed against the maximum current Imax which a motor driver such as a servo amplifier or the like can output is computed through the following expression:

$$\beta = Ip/Imax$$

Assuming that an ideal output ratio is α, to get closer an output ratio in acceleration or deceleration in the next cycle of fast feed to an ideal output ratio, the time constant B for the next cycle of fast feed is obtained through the following expression:

$$B = A \cdot \beta/\alpha = A \cdot (Ip/Imax \cdot \alpha)$$

Herein A is a time constant for fast feed in a current cycle, α is an ideal output ratio, and β is a ratio.

The time constant B for acceleration or deceleration obtained as a result of computing above is substituted into A, and acceleration or deceleration in the next cycle of operation is executed with this time constant.

With this configuration, each time acceleration or deceleration is executed, the most suited time constant for acceleration or deceleration can be computed in real time mode, a time constant for acceleration or deceleration can automatically be corrected, and acceleration or deceleration can be realized without the system stability being affected by change in a load to a machine.

It should be noted that, if a load varies according to a direction of movement as in case of an imbalance shaft, it is necessary to decide a time constant using a larger current command value in each operating direction.

Also as generally a mechanical load does not change so much, a time constant for acceleration or deceleration may be decided depending on an average value of maximum values or a peak value for acceleration or deceleration in several to several tens of operating cycles. Furthermore, generally when power is turned ON in the morning, a machine does not work smoothly and a mechanical load becomes largest, so that a time constant in the initial stage after power is turned ON may be set to a value which is around 50% of Imax and then may be corrected automatically.

Figure 19:
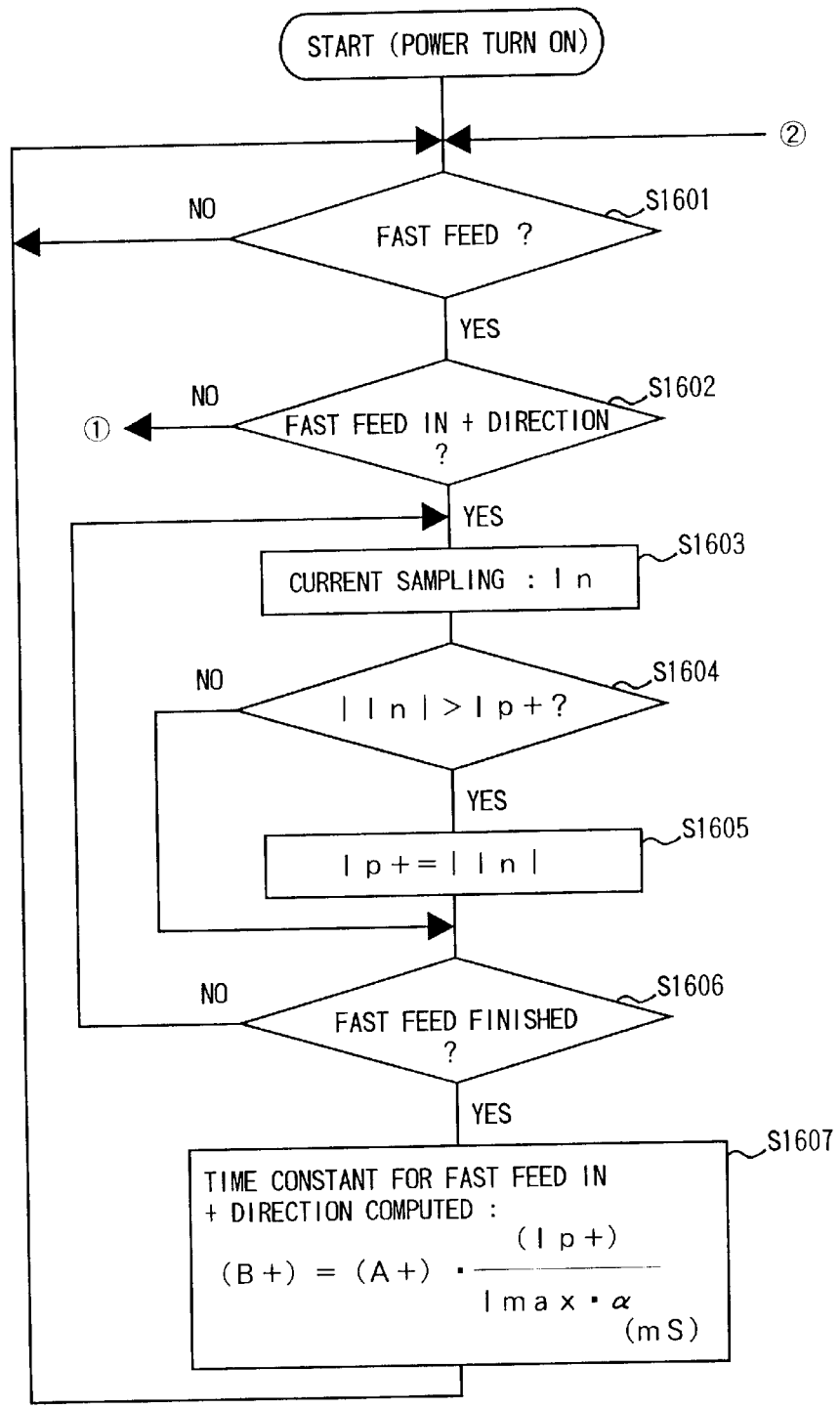
FIG. 19 is a flow chart showing another embodiment of a routine for correcting a time constant in the method of automatically correcting abnormalities in a servo control system according to the present invention.
Figure 20:
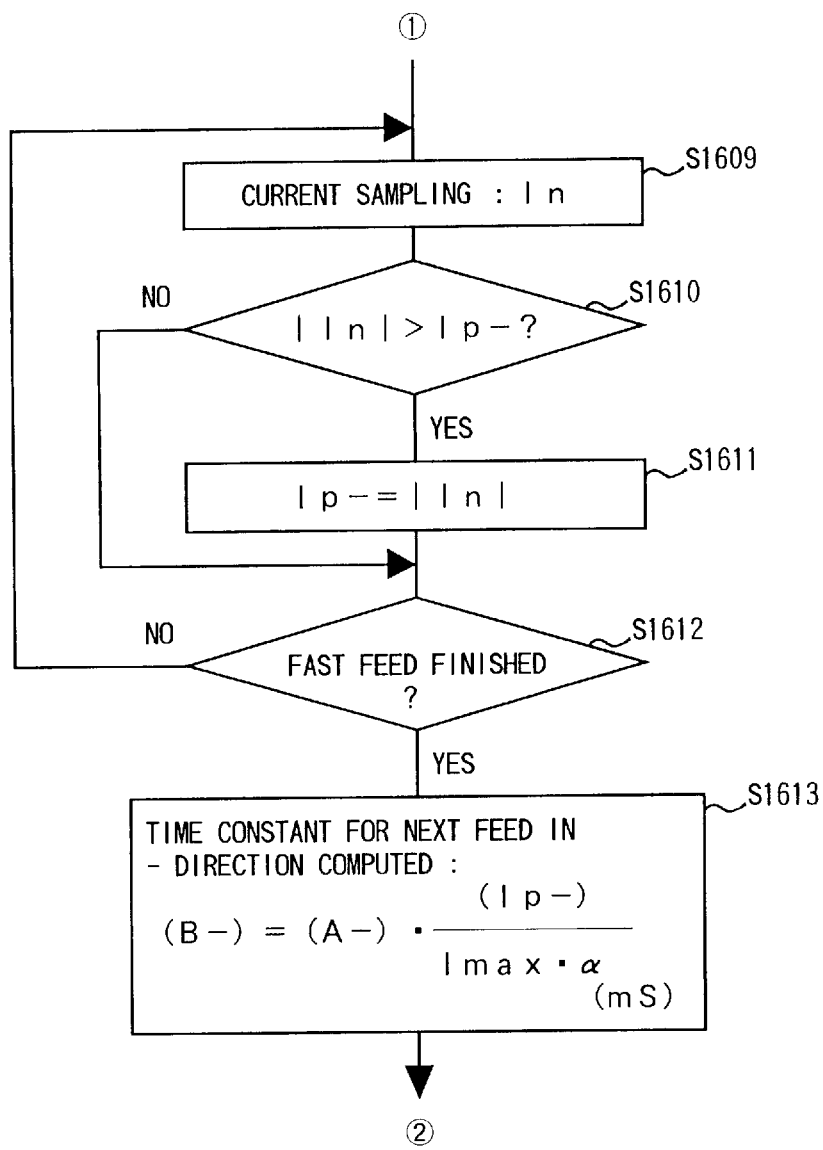
FIG. 20 is a flow chart showing another embodiment of a routine for correcting a time constant in a method of automatically correcting abnormalities in the servo control system according to the present invention.

FIG. 19 and FIG. 20 show a routine for correcting a time constant suited to a case where a required torque varies for a direction of movement as in a case of an imbalance shaft.

At first in step S1601, determination is made whether fast feed is now being executed or not. If it is determined that fast feed is being executed, system operation goes to step S1602, and a direction of fast feed is checked. When fast feed is executed in a + direction, system operation goes to step S1603. In contrast, in a case where fast feed is not executed in the + direction, fast feed is executed in a − direction, so that system operation goes to step S1611. In step S1603, a current command value In is sampled. This sampling of current command value In is executed once for every cycle (max. several microseconds).

In the next step S1604, an absolute value |In| of the sampled current command value is compared to the maximum value Ip+ of current commands sampled up to the previous operation in a current cycle of fast feed, and if it is determined that |In| is larger, system operation goes to step S1605, and the maximum value Ip+ is updated to |In| obtained in the current cycle of operation.

Then in step S1606, determination is made as to whether fast feed in a current cycle has been finished or not. "In fast mode" defined herein also is effective during a total period of time required to movement in one cycle of operation. When fast feed is finished, system operation goes to step S1607, and when fast feed is not finished, system operation goes back to step S1603 after a current sampling cycle, and the next current command value In is sampled.

In step S1607, a ration β of a maximum value Ip + of a current command in a current cycle of fast feed against the maximum current Imax which a motor driver such as a servo amplifier or the like can output is computed through the following expression:

$$\beta = (Ip+)/Imax$$

Assuming that an ideal output ratio is α, to get closer an output ratio in acceleration or deceleration in the next cycle of fast feed to an ideal output ratio, the time constant B+ for the next cycle of fast feed is obtained through the following expression:

$$(B+) = (A+) \cdot \beta/\alpha = (A+) \cdot \{(Ip+)/Imax \cdot \beta)\}$$

Herein A+ is a time constant for fast feed in a current cycle, α is an ideal output ratio, and β is a ratio.

The time constant B+ for acceleration or deceleration obtained as a result of computing above is substituted into A+, and acceleration of deceleration in the + direction in the next cycle of operation is executed with this time constant.

In step S1609, a current command value In is sampled. Also sampling of this current command value In is executed once for every cycle during fast feed (max. several microseconds).

In the next step S1610, an absolute value |In| of the sampled current command value is compared to the maximum value Ip– of current commands sampled up to the previous operation in a current cycle of fast feed. If it is determined that |In| is larger, system operation goes to step S1611, and the maximum value Ip– is updated to |In| obtained in the current cycle of operation.

Then in step S1612, determination is made as to whether fast feed in a current cycle has been finished or not. "In fast model" defined herein also is effective during a total period of time required to movement in one cycle of operation. When fast feed is finished, system operation goes to step S1613, and when fast feed is not finished, system operation goes back to step S1609 after a current sampling cycle, and the next current command value In is sampled.

In step S1613, a ratio β of a maximum value Ip– of a current command in a current cycle of fast feed against the maximum current Imax which a motor driver such as a servo amplifier or the like can output is computed through the following expression:

$$\beta = (Ip-)/Imax$$

Assuming that an ideal output ratio is α, to get closer an output ratio in acceleration or deceleration in the next cycle of fast feed to an ideal output ratio, the time constant B for the next cycle of fast feed is obtained through the following expression:

$$(B-) = (A-) \cdot \beta/\alpha = (A-) \cdot \{(Ip-)/Imax \cdot \alpha\}$$

herein A– is a time constant for fast feed in a current cycle, α is an ideal output ratio, and β is a ratio.

The time constant B– for acceleration or deceleration obtained as a result of computing above is substituted into A–, and acceleration or deceleration in the – direction in the next cycle of operation is executed with this time constant.

With this configuration, each time acceleration or deceleration is executed, a time constant for acceleration or deceleration most suited to each direction of movement is discretely computed, so that a time constant for acceleration or deceleration in each direction of movement can discretely and automatically be corrected and an operation for acceleration or deceleration can be realized without the system stability being affected by change in a mechanical load.

As a result, although a time constant for acceleration or deceleration has been decided with a torque required for an imbalance shaft to go up in the conventional technology, the time constant can be made smaller when the imbalance shaft goes down, which makes it possible to reduce a time required for machining.

When a machine is driven, an output torque in acceleration is different from that in deceleration due to a frictional force and an optimal time constant for acceleration is different from that for deceleration, so that automatic correction of time constants for acceleration and deceleration are executed for acceleration and for deceleration discretely in Embodiment 10.

Figure 21:
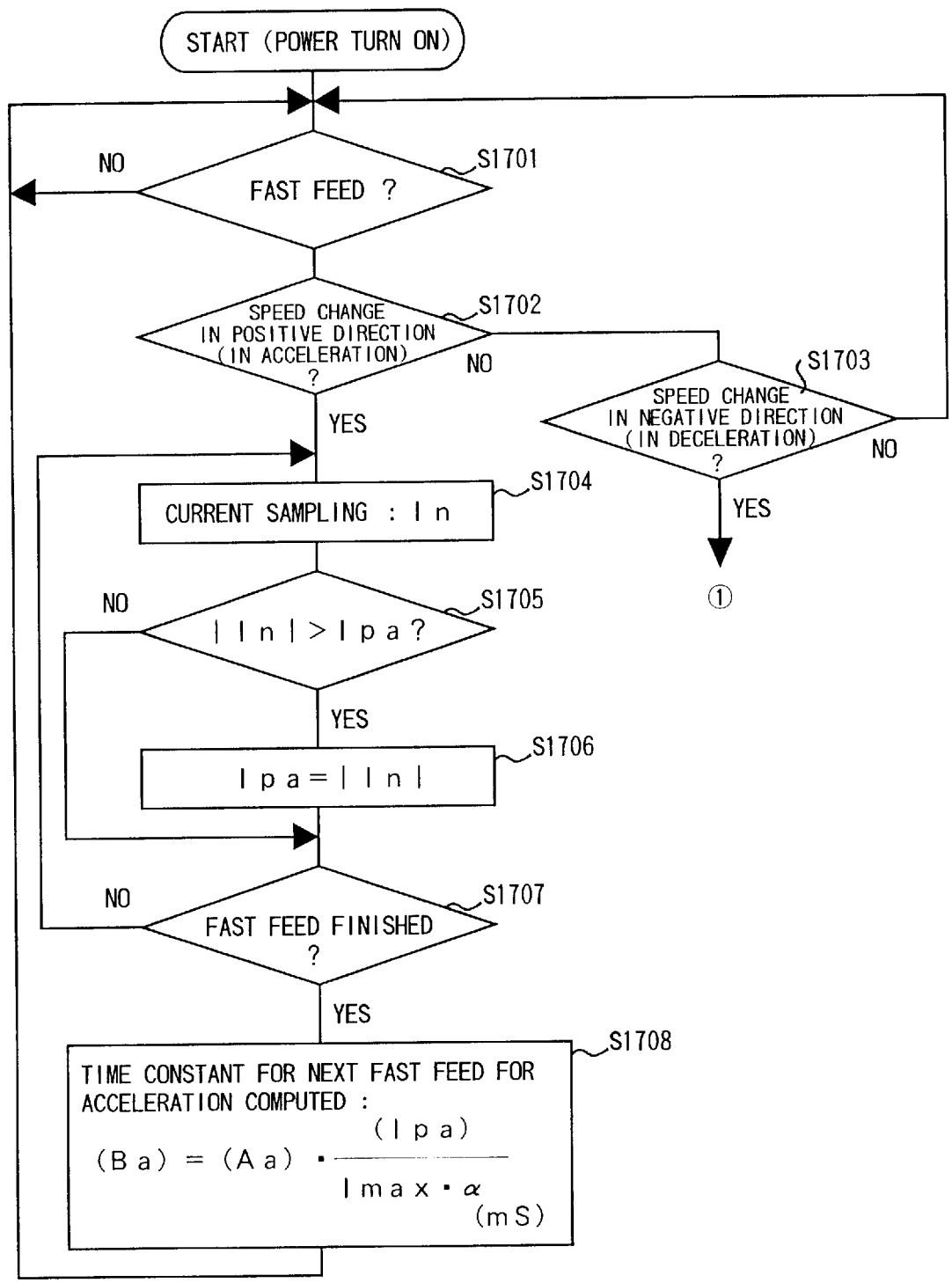
FIG. 21 is a flow chart showing another embodiment of a routine for correcting a time constant in the method of automatically correcting abnormalities in a servo control system according to the present invention.
Figure 22:
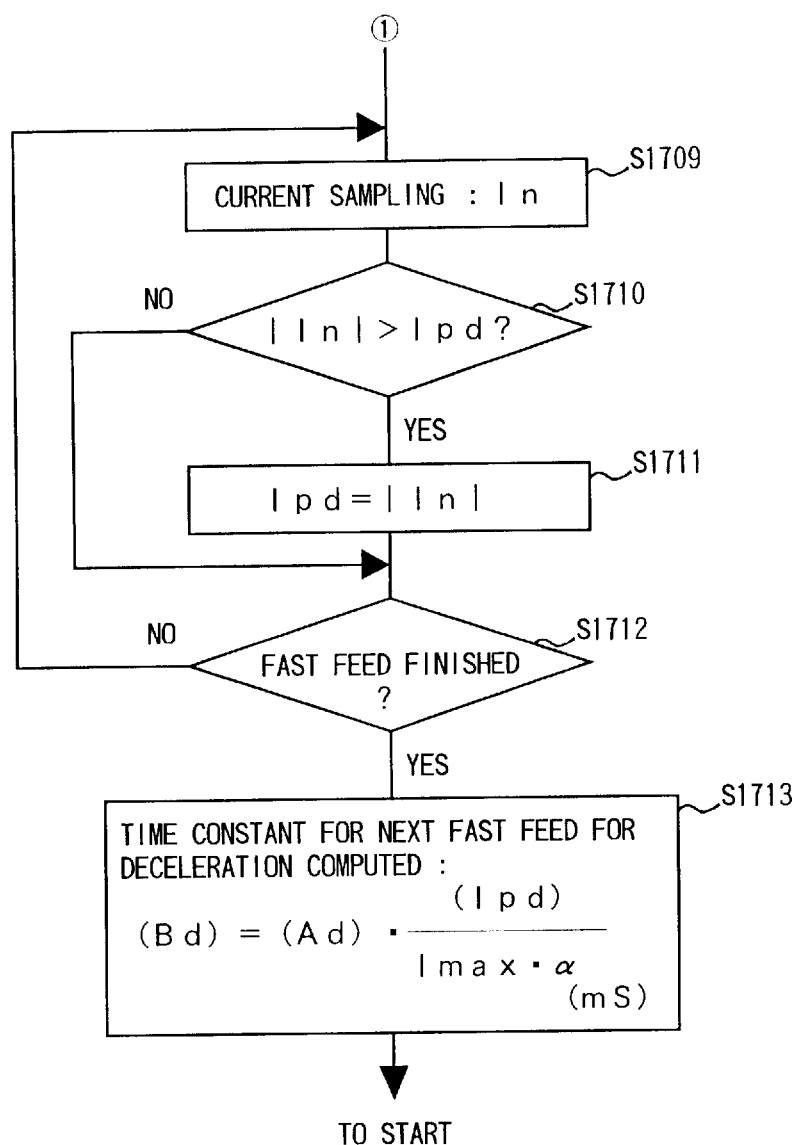
FIG. 22 is a flow chart showing another embodiment of a routine for correcting a time constant in the method of automatically correcting abnormalities in a servo control system according to the present invention.
Figure 23:
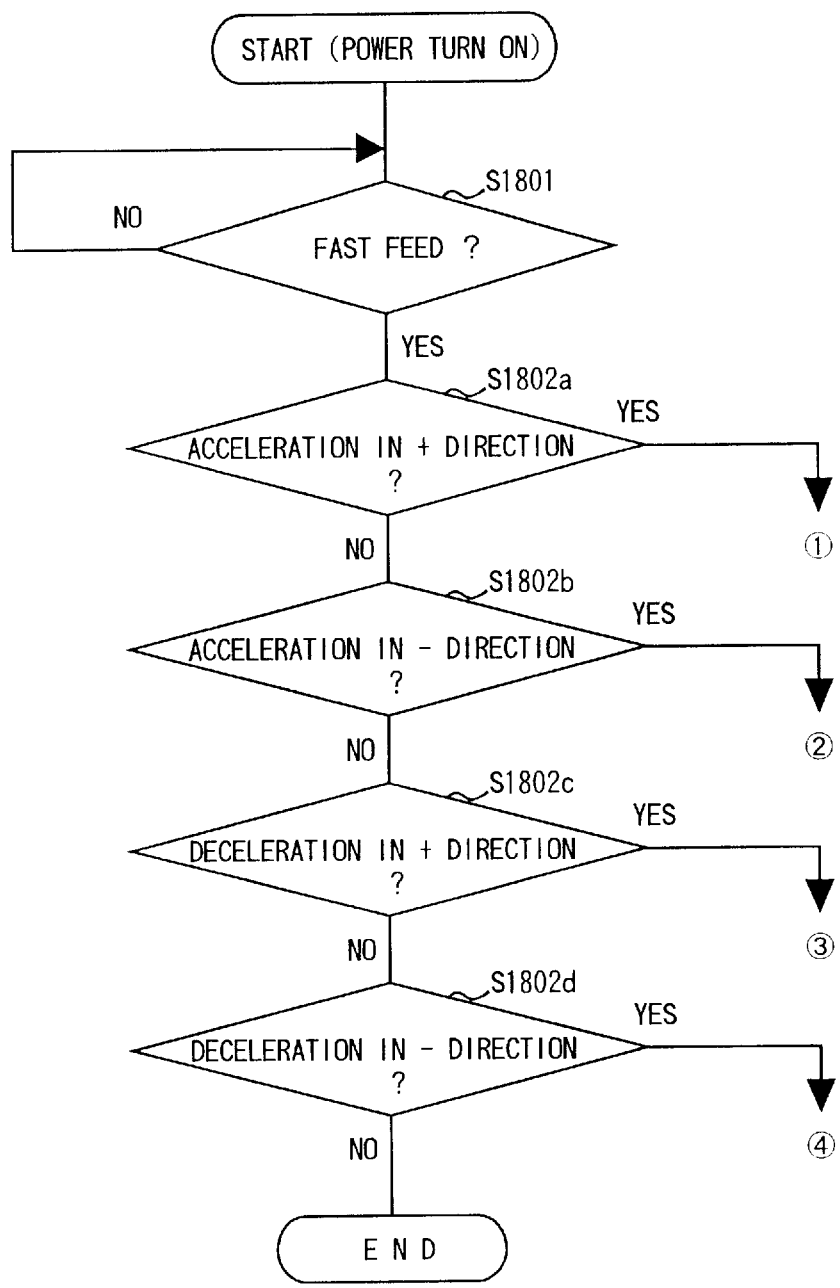
FIG. 23 is a flow chart showing another embodiment of a routine for correcting a time constant in the method of automatically correcting abnormalities in a servo control system according to the present invention.
Figure 24:
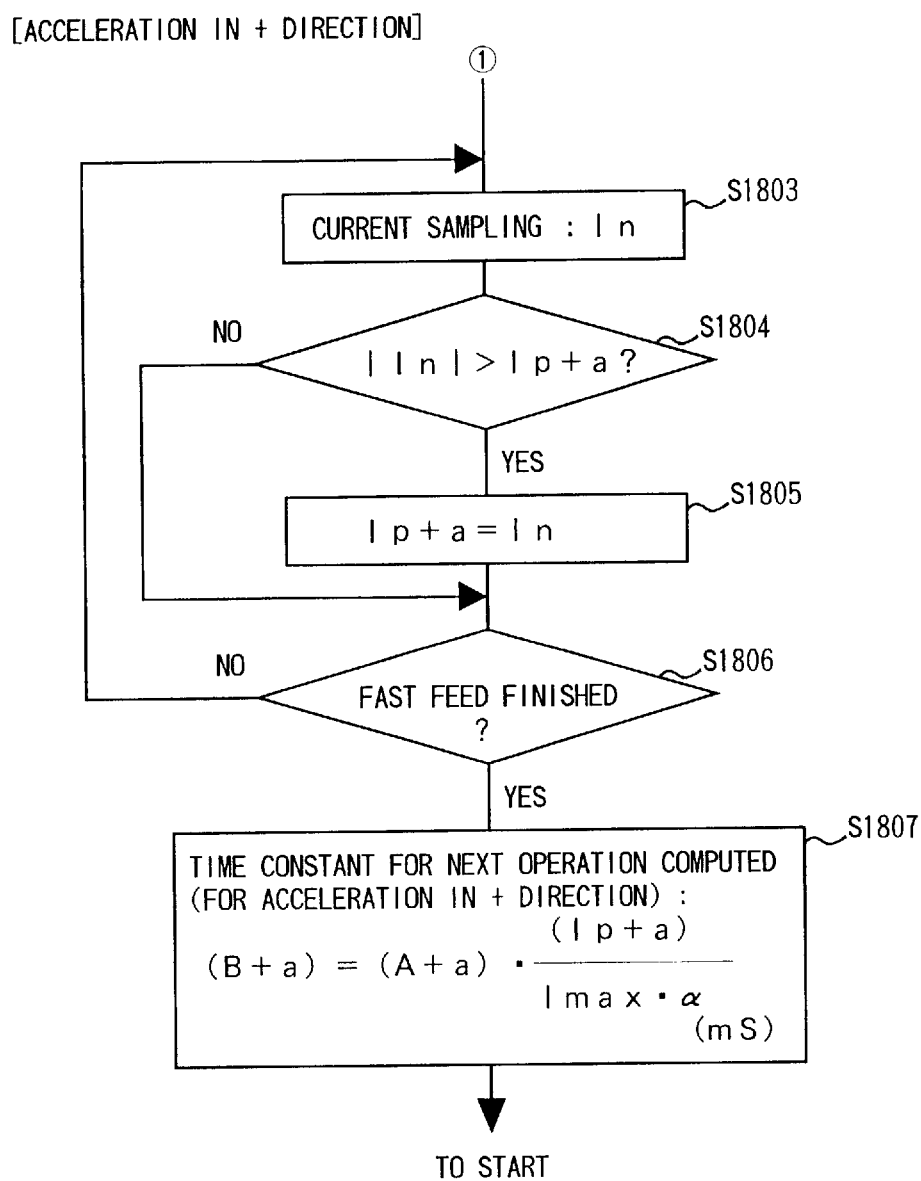
FIG. 24 is a flow chart showing another embodiment of a routine for correcting a time constant in the method of automatically correcting abnormalities in a servo control system according to the present invention.
Figure 25:
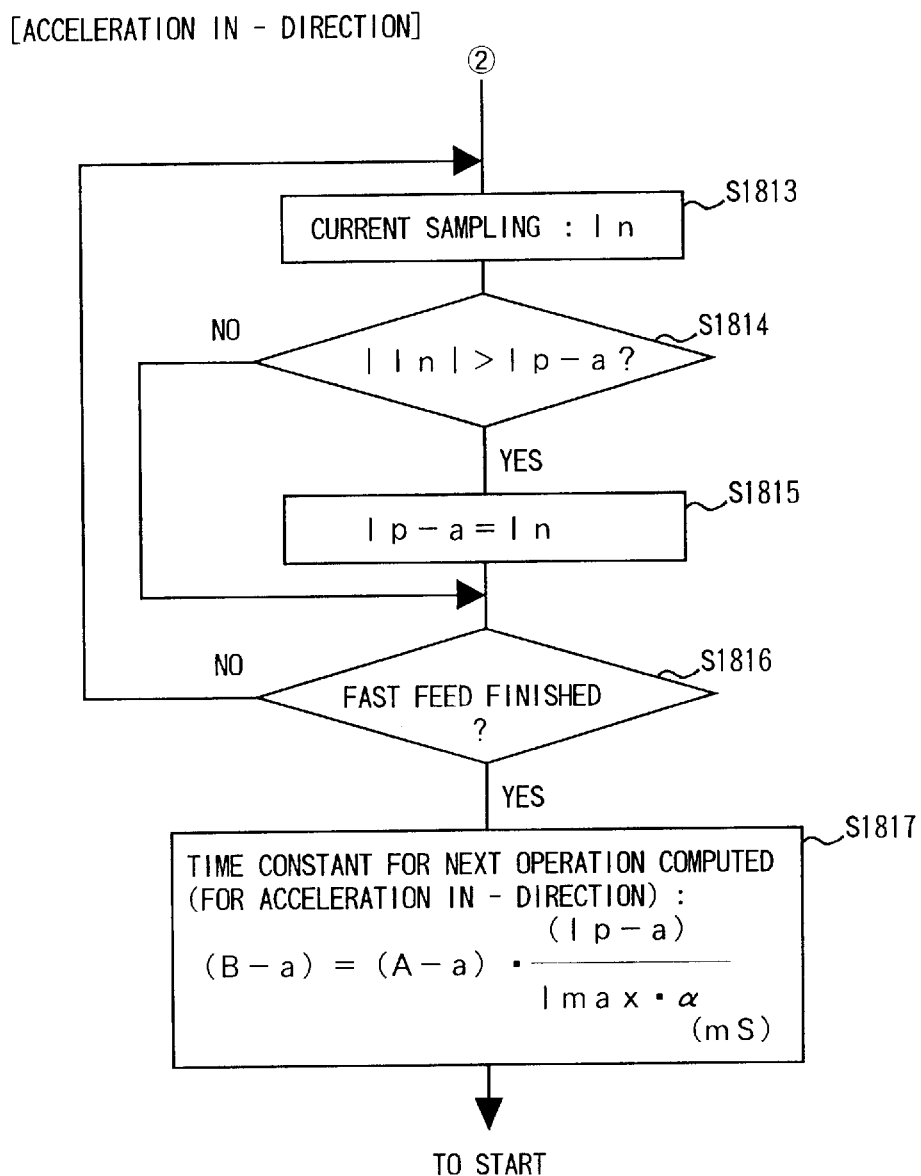
FIG. 25 is a flow chart showing another embodiment of a routine for correcting a time constant in the method of automatically correcting abnormalities in a servo control system according to the present invention.
Figure 26:
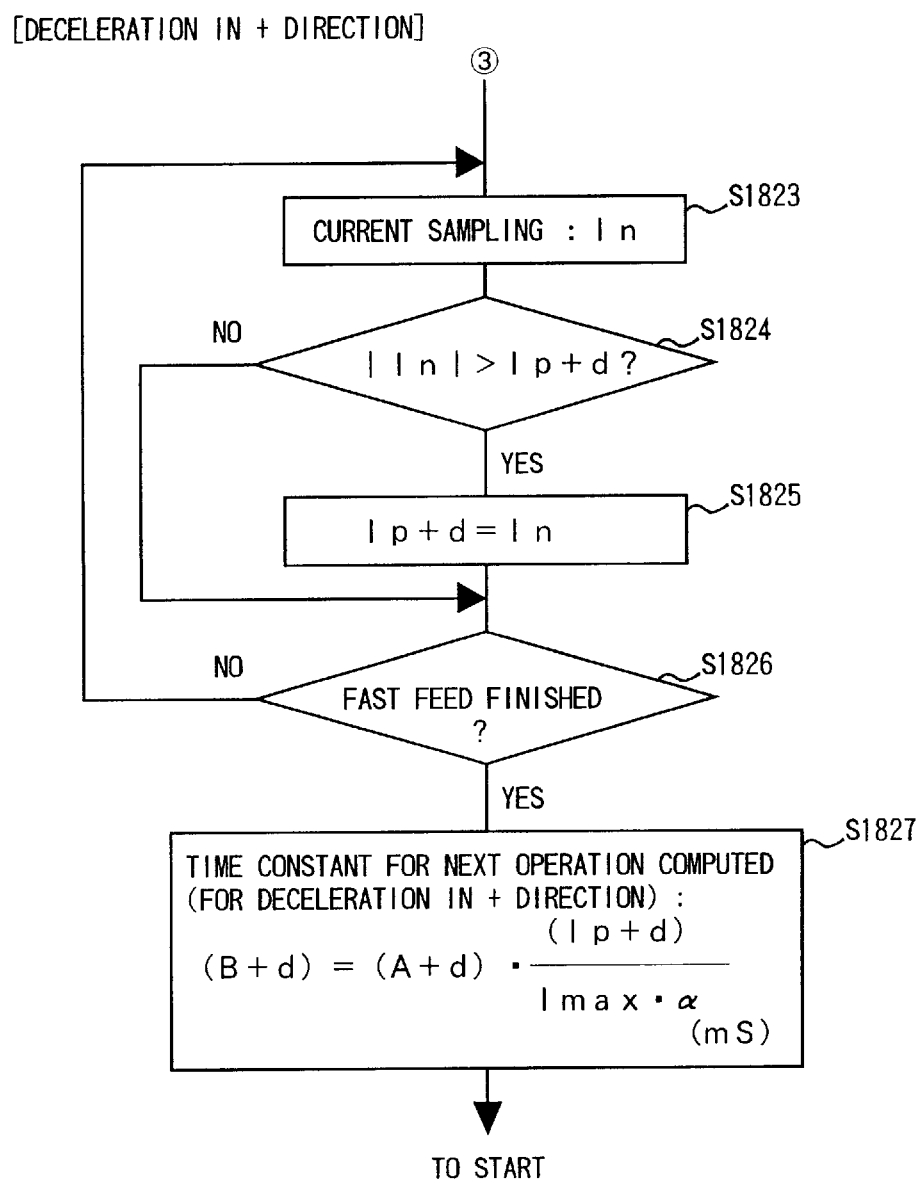
FIG. 26 is a flow chart showing another embodiment of a routine for correcting a time constant in a method of automatically correcting abnormalities in the servo control system according to the present invention.
Figure 27:
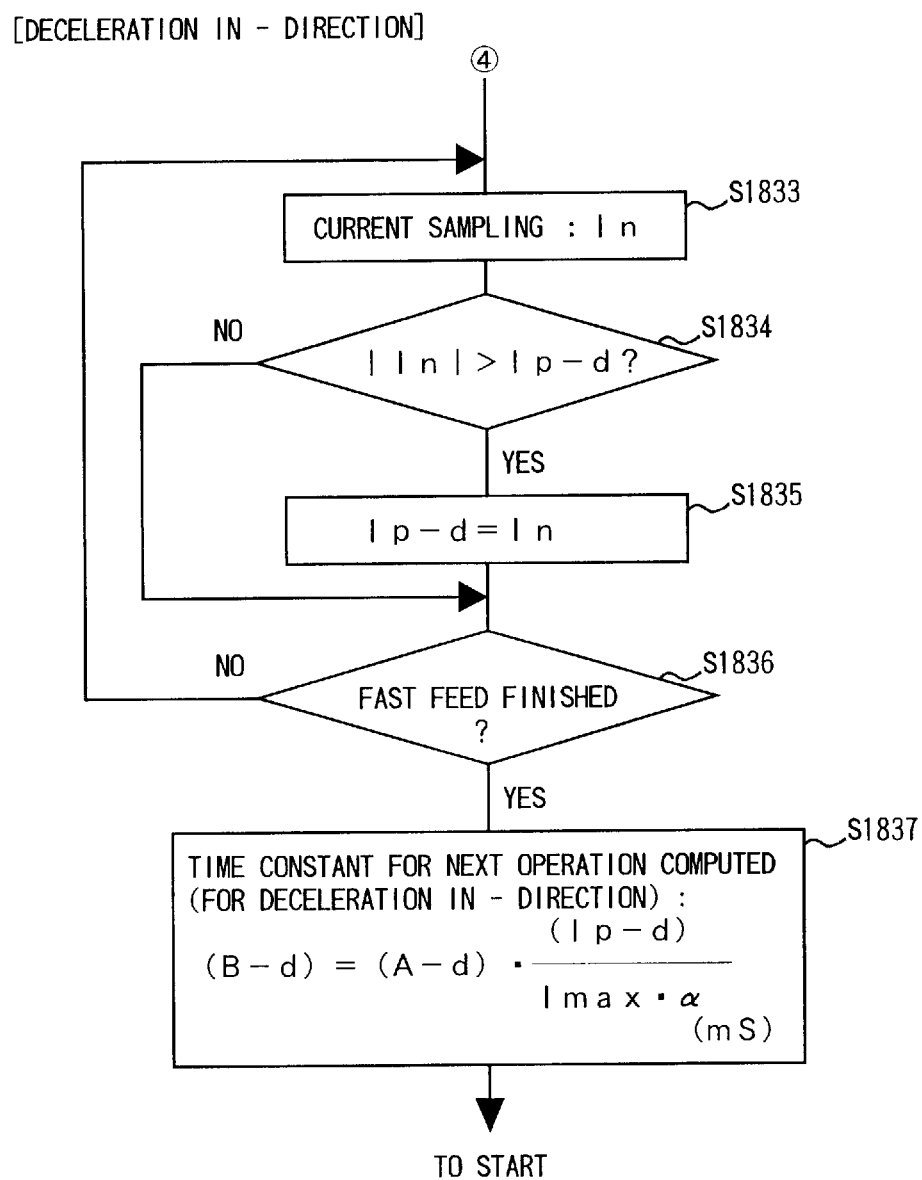
FIG. 27 is a flow chart showing another embodiment of a routine for correcting a time constant in the method of automatically correcting abnormalities in a servo control system according to the present invention.

FIG. 21 and FIG. 22 shows a routine for automatically correcting a time constant for acceleration or deceleration for acceleration and for deceleration discretely.

At first, in step S1701, determination is made as to whether fast feed is now being executed or not. If it is determined that fast feed is now being executed, system operation goes to step S1702, and in step S1702, determination is made by checking change in speed change as to whether acceleration is being executed or not. If it is determined that acceleration is now being executed, system operation goes to step S1704, otherwise to step S1703.

In step S1703, determination is made by checking change in speed change whether deceleration is now being executed or not. If it is determined that now deceleration is being executed, system operation goes to step S1709, and otherwise returns to step S1701.

In step S1704, a current command value In is sampled. Sampling of the current command value In is executed once for every specified cycle during fast feed.

Then in step S1705, an absolute value |In| of the sampled current command value is compared to the maximum value Ipa of current commands sampled up to the previous operation in a current cycle of fast feed. If it is determined that |In| is larger, system operation goes to step S1706, and the maximum value Ipa is updated to |In| obtained in the current cycle of operation.

Then in step S1707, determination is made as to whether acceleration for fast feed in a current cycle has been finished or not. When acceleration for fast feed is finished, system operation goes to step S1708 and when acceleration for fast feed is not finished, system operation goes back to step S1704 after a current sampling cycle, and the next current command value In is sampled.

In step S1708, a ratio β of a maximum value Ipa of a current command in a current cycle of fast feed against the maximum current Imax which a motor driver such as a servo amplifier or the like can output is computed through the following expression:

$$\beta = (Ipa)/Imax$$

Assuming that an ideal output ratio is α, to get closer an output ratio in acceleration or deceleration in the next cycle of fast feed to an ideal output ratio, the time constant Ba for the next cycle of fast feed is obtained through the following expression:

$$(Ba) = (Aa) \cdot \beta/\alpha = (Aa) \cdot \{(Ipa)/Imax \cdot \alpha\}$$

Herein Aa is a time constant for fast feed in a current cycle, α is an ideal output ratio, and β is a ratio. The time constant Ba for acceleration obtained through the computing above is substituted into Aa, and acceleration for fast feed in the next cycle is executed with this time constant.

Also in step S1709, the current command value In is sampled. Sampling of the current command value In is executed once for every cycle during fast feed.

Then in step S1710, an absolute value |In| of the sampled current command value is compared to a maximum value Ip– of a current command sampled up to the previous cycle during the current fast feed cycle. If |In| is larger, system operation goes to step S1711, and the maximum value Ipb is updated to the |In| obtained in the current cycle.

Then in step S1712, determination is made as to whether fast feed in the current cycle has been finished or not. If it is determined that fast feed has been finished, system operation goes to step S1713, and if it is determined that fast feed has not been finished, system operation returns after the sampling cycle to step S1709, and the next current command value In is sampled.

In step S1713, a ratio β of a maximum value Ipb of a current command in a current cycle of fast feed against the maximum current Imax which a motor driver such as a servo amplifier or the like can output is computed through the following expression:

$$\beta = (Ipb)/Imax$$

Assuming that an ideal output ratio is α, to get closer an output ratio in acceleration or deceleration in the next cycle of fast feed to an ideal output ratio, the time constant Bb for the next cycle of fast feed is obtained through the following expression:

$$(Bb)=(Aa)\cdot\beta/\alpha=(Ab)\cdot\{(Ipb)/Imax\cdot\alpha\}$$

Herein Ab is a time constant for fast feed in a current cycle, α is an ideal output ratio, and β is a ratio.

The time constant Bd for deceleration obtained through the computing above is substituted into Ab, and deceleration for fast feed in the next cycle is executed with this time constant.

With this configuration, an optimal time constant for acceleration or deceleration can discretely be computed in the real time mode each time acceleration or deceleration is executed, a time constant for acceleration and a time constant for deceleration can automatically be corrected respectively, and an accelerating or decelerating operation can be realized without the system stability being affected by change in mechanical load.

FIGS. 23 to 27 show a routine for correcting a time constant in which a time constant for acceleration and that for deceleration are automatically and discretely corrected according to a direction of movement.

In step S1801, determination is made as to whether fast feed is being executed or not. If it is determined that fast feed is not being executed now, system operation returns to step S1801, and if it is determined that fast feed is being executed, system operations goes to steps S1802a to 1802d.

In steps S1802a to 1802d, in which of the following 4 types of mode fast feed is being executed is checked.

Namely, in step S1802a, determination is made as to whether acceleration is being executed in the + direction or not, and if it is determined that acceleration is being executed in the + direction, system operation goes to step S1803.

In step S1802b, determination is made as to whether acceleration is being executed in the − direction or not, and if it is determined that acceleration is being executed in the − direction, system operation goes to step S1813.

In step S1802c, determination is made as to whether deceleration is being executed in the + direction or not, and if it is determined that deceleration is being executed in the + direction, system operation goes to step S1823.

In step S1802d, determination is made as to whether deceleration is being executed in the − direction or not, and if it is determined that deceleration is being executed in the − direction, system operation goes to step S1833.

In step S1803, a current command value In is sampled once for every cycle during fast feed.

Then in step S1804, an absolute value |In| of the sampled current command value is compared to a maximum value Ip+a of a current command sampled up to the previous operation during the current cycle of fast feed. If |In| is larger, system operation goes to step S1805, and the maximum value Ip+a is updated to |In| obtained in this cycle.

Then in step S1806, determination is made as to whether fast feed in the current cycle has been finished or not. If it is determined that fast feed in the current cycle has been finished, system operation goes to step S1807, and if it is determined that fast feed in the current cycle has not been finished, system operation returns after the sampling cycle to step S1803, and then the next current command value In is sampled.

In step S1807, a ratio β of a maximum value Ip+a of a current command in a current cycle against the maximum current Imax which a motor driver such as a servo amplifier or the like can output is computed through the following expression:

$$\beta=(Ip+a)/Imax$$

Assuming that an ideal output ratio is α, to get closer an output ratio in acceleration or deceleration in the next cycle of fast feed to an ideal output ratio, the time constant B+a for the next cycle of fast feed is obtained through the following expression:

$$(B+a)=(A+a)\cdot\beta/\alpha=(A+a)\cdot\{(Ip+a)/Imax\cdot\alpha\}$$

Herein A+a is a time constant for fast feed in a current cycle, LT is an ideal output ratio, and β is a ratio.

The time constant (B+a) for acceleration or deceleration through the computing above is substituted into (A+a), and a command for acceleration for fast feed in the + direction in the next cycle is prepared with this time constant.

In step S1813, a current command value In is sampled once for every cycle during fast feed.

Then in step S1814, an absolute value of the sampled current command value |In| is compared to a maximum value Ip−a of a current command sampled up to the previous cycle during the current fast feed. If |In| is larger, system operation goes to step S1815, and the value Ip−a is updated to |In| obtained in the current cycle.

Then in step S1816, determination is made as to whether fast feed in the current cycle has been finished or not. If it is determined that fast feed has been finished, system operation goes to step S1817, and if it is determined that fast feed has not been finished, system operation returns after the sampling cycle to step S1813, and the next current command value In is sampled.

In step S1817, a ratio β of a maximum value Ip−a of a current command in a current cycle against the maximum current Imax which a motor driver such as a servo amplifier or the like can output is computed through the following expression:

$$\beta=(Ip-a)/Imax$$

Assuming that an ideal output ratio is α, to get closer an output ratio in acceleration or deceleration in the next cycle of fast feed to an ideal output ratio, the time constant B−a for the next cycle of fast feed is obtained through the following expression:

$$(B-a)=(A-a)\cdot\beta/\alpha=(A-a)\cdot\{(Ip-a)/Imax\cdot\alpha\}$$

Herein A−a is a time constant for fast feed in a current cycle, α is an ideal output ratio, and β is a ratio.

The time constant (B−a) for acceleration or deceleration through the computing above is substituted into (A−a), and a command for acceleration for fast feed in the − direction in the next cycle is prepared with this time constant.

In step S1823, a current command value In is sampled once for every cycle during fast feed.

Then in step S1824, an absolute value |In| of the sampled current command value is compared to a maximum value Ipa of a current command sampled to the previous cycle during the current fast feed. If |In| is larger, system operation goes to step S1825, and the value Ip+d is updated to |In| obtained in the current cycle.

Then in step S1826, determination is made as to whether fast feed in the current cycle has been finished or not. If it is determined that fast feed has been finished, system operation goes to step S1827, and if it is determined that fast feed has not been finished, system operation returns after the sampling cycle to step S1823, and the next current command value In is sampled.

In step S1827, a ratio β of a maximum value Ipd of a current command in a current cycle against the maximum current Imax which a motor driver such as a servo amplifier or the like can output is computed through the following expression.

$$\beta = (Ip+d)/Imax$$

Assuming that an ideal output ratio is $\alpha$, to get closer an output ratio in acceleration or deceleration in the next cycle of fast feed, the time constant B+d for the next cycle of fast feed is obtained through the following expression:

$$(B+d) = (A+d) \cdot \beta/\alpha = (A+d) \cdot \{(Ip+d)/Imax \cdot \alpha\}$$

Herein A+d is a time constant for fast feed in a current cycle, $\alpha$ is an ideal output ratio, and $\beta$ is a ratio.

The time constant (B+d) for acceleration or deceleration through the computing above is substituted into (A+d), and a command for deceleration for fast feed in the + direction in the next cycle is prepared with this time constant.

In step S1833, a current command value In is sampled once for every cycle during fast feed.

Then in step S1834, an absolute value |In| of the sampled current command value is compared to a maximum value Ip−d of a current command sampled up to the previous cycle during the current fast feed. If |In| is larger, system operation goes to step S1835, and the value Ip−d is updated to |In| obtained in the current cycle.

Then in step S1836, determination is made as to whether fast feed in the current cycle has been finished or not. If it is determined that fast feed has been finished, system operation goes to step S1837, and if it is determined that fast feed has not been finished, system operation returns after the sampling cycle to step S1833, and the next current command value In is sampled.

In step S1837, a ratio $\beta$ of a maximum value Ip−d of a current command in a current cycle against the maximum current Imax which a motor driver such as a servo amplifier or the like can output is computed through the following expression:

$$\beta = (Ip-d)/Imax$$

Assuming that an ideal output ratio is $\alpha$, to get closer an output ratio in acceleration or deceleration in the next cycle of fast feed, the time constant B−d for the next cycle of fast feed is obtained through the following expression:

$$(B-d) = (A-d) \cdot \beta/\alpha = (A-d) \cdot \{(Ip-d)/Imax \cdot \alpha\}$$

Herein A−d is a time constant for fast feed in a current cycle, $\alpha$ is an ideal output ratio, and $\beta$ is a ratio.

The time constant (B−d) for acceleration or deceleration through the computing above is substituted into (A−d), and a command for deceleration for fast feed in the − direction in the next cycle is prepared with this time constant.

With this configuration, an optimal time constant for acceleration or deceleration in each direction can be computed in the real time mode, and an accelerating or decelerating operation can be realized without the system stability being affected by change in a mechanical load including friction.

Even if a time constant for acceleration or deceleration is corrected, when a current command value reaches a limit value, a following error of a position under servo control is delayed from an ideal value, which may cause overshoot in speed or generation of an alarm indicating an excessive error, and it may in turn stop system operation.

As a countermeasure against this phenomenon, a value for determination of an excessive error width in acceleration or deceleration during fast feed is made variable for making it hard for an excessive error alarm to be generated.

Figure 28:
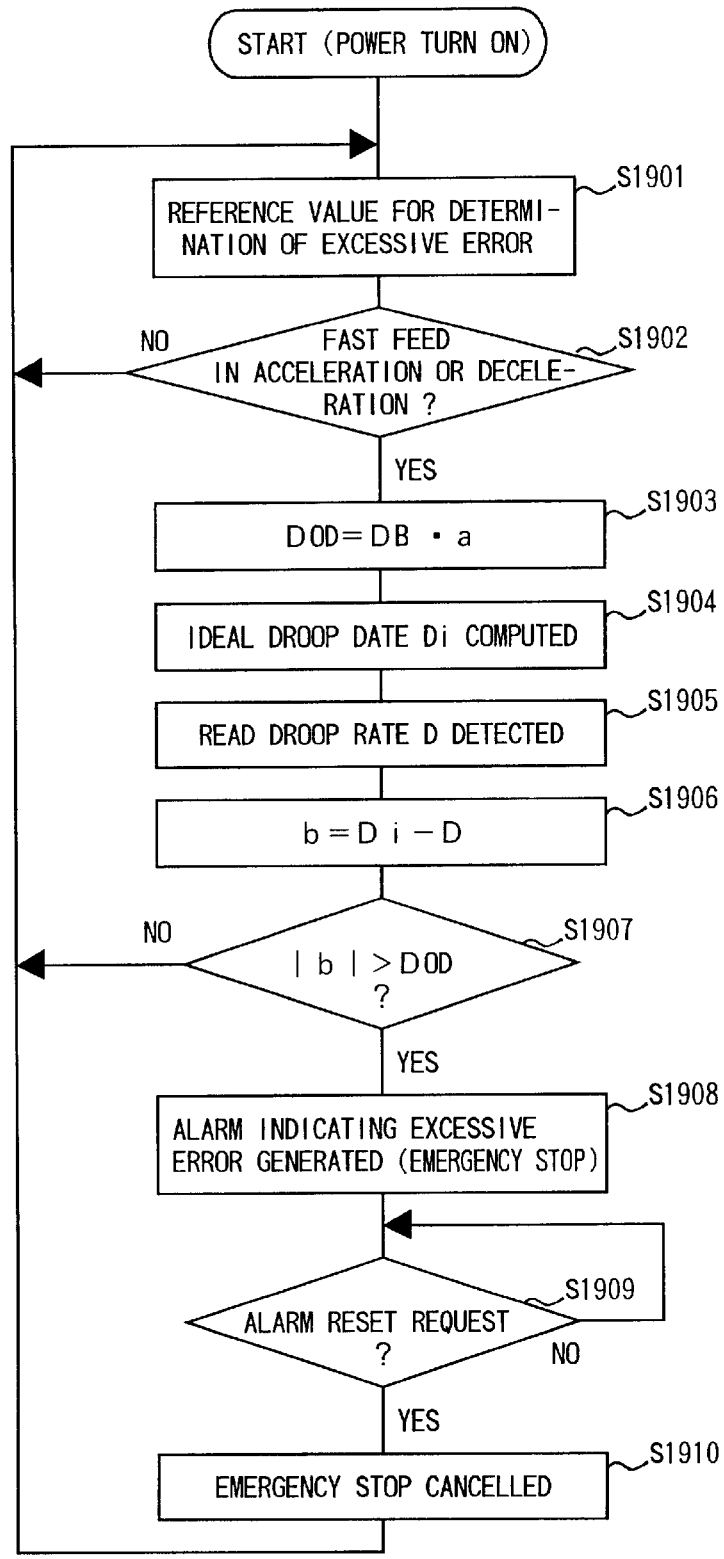
FIG. 28 is a flow chart showing a routine for changing a value of determination of an excessive error in the method of automatically correcting abnormalities in a servo control system according to the present invention.

FIG. 28 shows a routine for changing a reference value for determination of an excessive error width.

In step S1901, a value DOD for determination of an excessive error width is a standard value DB. Namely DOB = DB. DB is generally set to around 50% of an ideal droop rate generated during fast feed at the maximum speed (constant state).

In step S1902, determination is made according to a change rate in a positional command value per unit time outputted from a C-device as to whether acceleration or deceleration is being executed during fast feed or not. If it is determined that acceleration or deceleration is being executed during fast feed, system operation goes to step S1903, and otherwise system operation returns to step S1901.

In step S1903, it is assumed that a value for determination of excessive error width DOD is equal to DB · a indicates an allowance factor for excessive error width in acceleration or deceleration, and a is set to a value larger than 1 (a > 1), and generally to around 2.

In step S1904, an ideal droop rate (positional deviation) Di against a current command input is computed.

In step S1905, an actual droop rate D at the current point is detected.

Then in step S1906, a difference b between the ideal droop rate Di and actual droop rate D is computed.

Then in step S1907, determination is made as to whether an absolute value of the error b of the actual droop rate is more than DOD or not. If it is determined that the absolute value is not more than DOD, system operation returns to step S1901 in a certain period of time, and if it is determined that the absolute value is more than DOD, system operation immediately goes to step S1908.

In step S1908, an alarm indicating an excessive error is generated to effect emergency stop of the system operation, and NC reset is waited.

In step S1909, determination as to whether an alarm reset request has been issued from an NC unit (actually inputted by an operator) or not, and if it is determined that the request has been issued, system operation goes to step S1910.

In step S1910, emergency stop is canceled, and system operation returns to step S1901.

With this configuration, it becomes possible to provide a servo control system in which an alarm indicating excessive speed is hardly generated and which has high reliability.

In a case where, although a time constant for acceleration or deceleration has been corrected, a following error of a position in servo control is delayed from an ideal value because a current command has reached a limit value, and overshoot in speed or an excessive error alarm is generated because of the delay and system operation is stopped, an output current (output torque) inevitably reaches a maximum value causing overshoot in speed.

Generally, when a servo motor rotates at a speed around 1.2 times higher than the rated maximum rotational speed (rpm) of the servo motor, an excessive speed alarm is generated to protect the system, so that, if a load to a machine unexpectedly increases or changes and the system enters the mode as described above, an alarm is generated.

To cope with the case as described above, a value for determination of excessive speed VOS is changed only in acceleration or deceleration during fast feed so that this alarm will not be generated.

FIG. 29 shows a routine for changing the value for determination of an excessive speed alarm.

In speed S2001, a rotational speed VOS of a motor used as a reference value for determination of alarm for excessive speed is regarded as a reference value VB. Generally the VB should preferably be set to around 1.2 times of the maximum rotational speed of the motor.

Then in step S2002, determination is made according to a change rate in a positional command per unit time outputted from an NC unit as to whether acceleration or deceleration during fast speed is being executed or not. If it is determined that acceleration or deceleration during fast speed is being executed, system operation goes to step S2003, and otherwise to step S2004.

In step S2003, a rotational speed VOS of a motor used as a reference value for determination of alarm for excessive speed is equal to VB a. a is an allowance factor for excessive speed in acceleration or deceleration, and a is set to a value larger than 1, and generally to around 1.2.

Then in step S2004, an actual rotational speed V of a motor is detected.

Then in step S2005, determination is made as to whether the actual rotational speed of motor (rpm) V is more than the value VOS for determination of excessive speed alarm or not. If it is determined that the actual rotational speed of motor is not more than the value VOS, system operation returns to step S2001 in a certain period of time, and otherwise immediately to step S2006.

In step S2006, a n excessive speed alarm is generated to effect emergency stop, and NC reset is waited.

In step S2007, determination is made as to whether an alarm reset request has been issued from an NC unit (actually inputted by an operator), and if it is determined that an alarm reset request has been issued, system operation goes to step S2008.

In step S2008, emergency stop is canceled, and system operation returns to step S2001.

With this configuration, it becomes possible to provide a servo control system in which an excessive speed alarm is hardly generated and which has high reliability.

Figure 30:
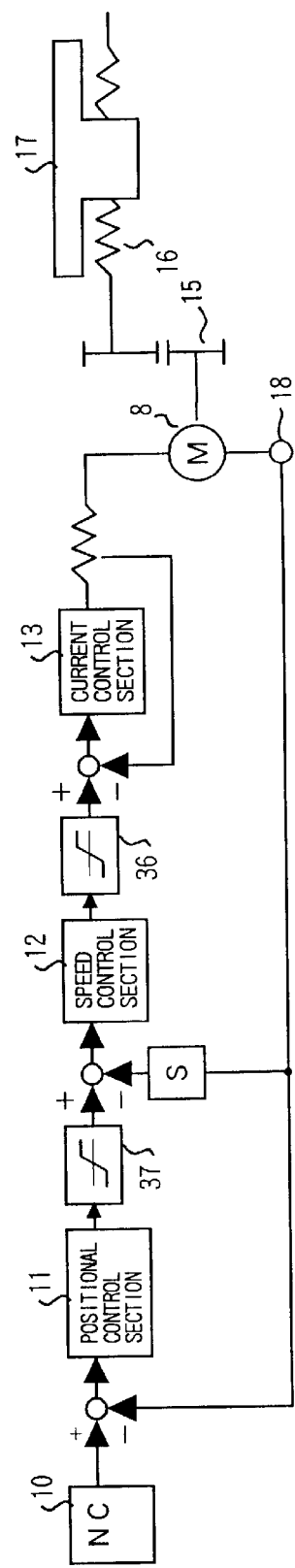
FIG. 30 is a block diagram showing an embodiment of the servo control system used for implementation of the method of automatically correcting abnormalities in a servo control system according to the present invention.

FIG. 30 shows an embodiment of a servo control system for implementation of the method of automatically correcting abnormalities in a servo control system according to the present invention. This servo control system includes a control section 37 for clamping a maximum value of a speed command computed by the positional control section 11.

With this configuration, even if a current reaches a limit value, an overshoot rate can be suppressed by clamping a speed command at a specified value $V_{MAX}$ (a value around 1.2 times higher than the maximum rotational speed of the motor).

In this embodiment, an overshoot rate is suppressed by clamping a speed command only in acceleration or deceleration during fast feed, so that such a work as high speed cutting will not be affected and followability to a command with high acceleration will not be sacrificed.

Figure 31:
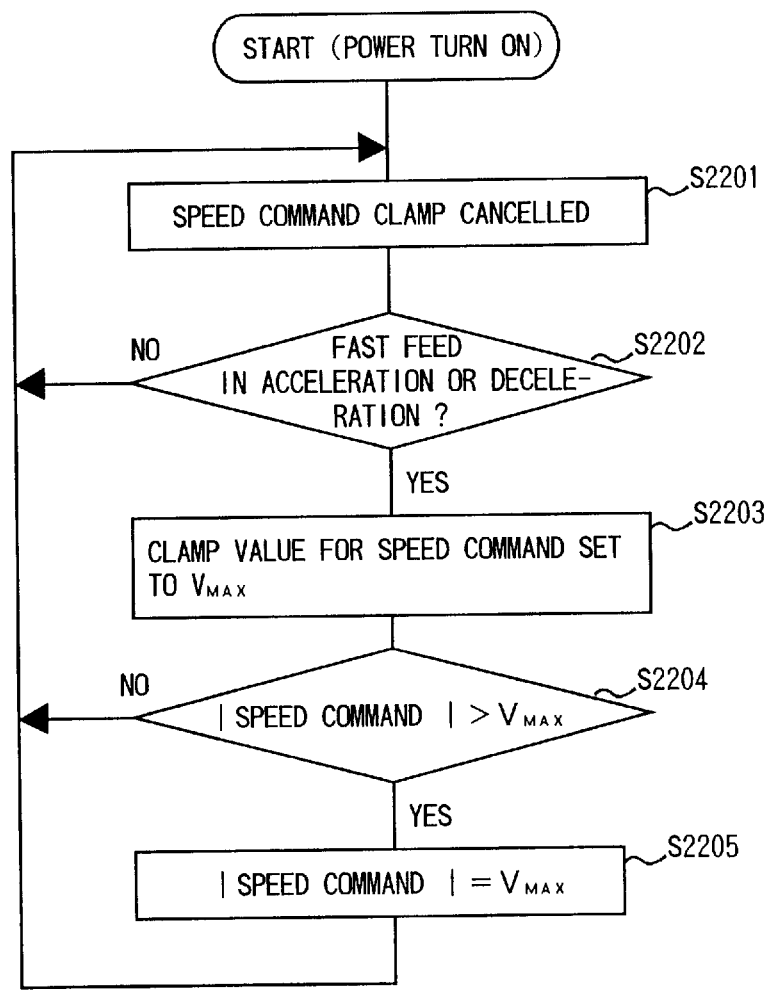
FIG. 31 is a flow chart showing an embodiment of a routine for clamping a command concerning speed in the method of automatically correcting abnormalities in a servo control system according to the present invention.

FIG. 31 shows a speed command clamp routine in this embodiment.

At first in step S2201, clamping of a speed command is canceled.

Then in step S2202, determination is made according to a change rate in a positional command per unit time outputted from an NC unit whether acceleration or deceleration during fast feed is being executed or not. If it is determined that acceleration or deceleration is being executed, system operation goes to step S2203, and otherwise system operation returns to step S2201. In step S2203, because acceleration or deceleration is being executed during fast feed, a maximum clamp value for a speed command is set to $V_{MAX}$.

In step S2204, determination is made as to whether a speed command computed for positional control exceeds $V_{MAX}$ or not. If it is determined that a speed command exceeds $V_{MAX}$, system operation goes to step S2205, where an absolute value of the speed command is outputted as $V_{MAX}$, and then system operation returns to step S2201.

With this configuration, a maximum speed for a speed command is clamped at a specified value only during acceleration or deceleration, so that overshoot hardly occurs even when an output torque from a servo amplifier has reached a maximum value under influence by an abnormal load.

In this embodiment, a speed command is clamped only when a current command value has reached its limit.

Figure 32:
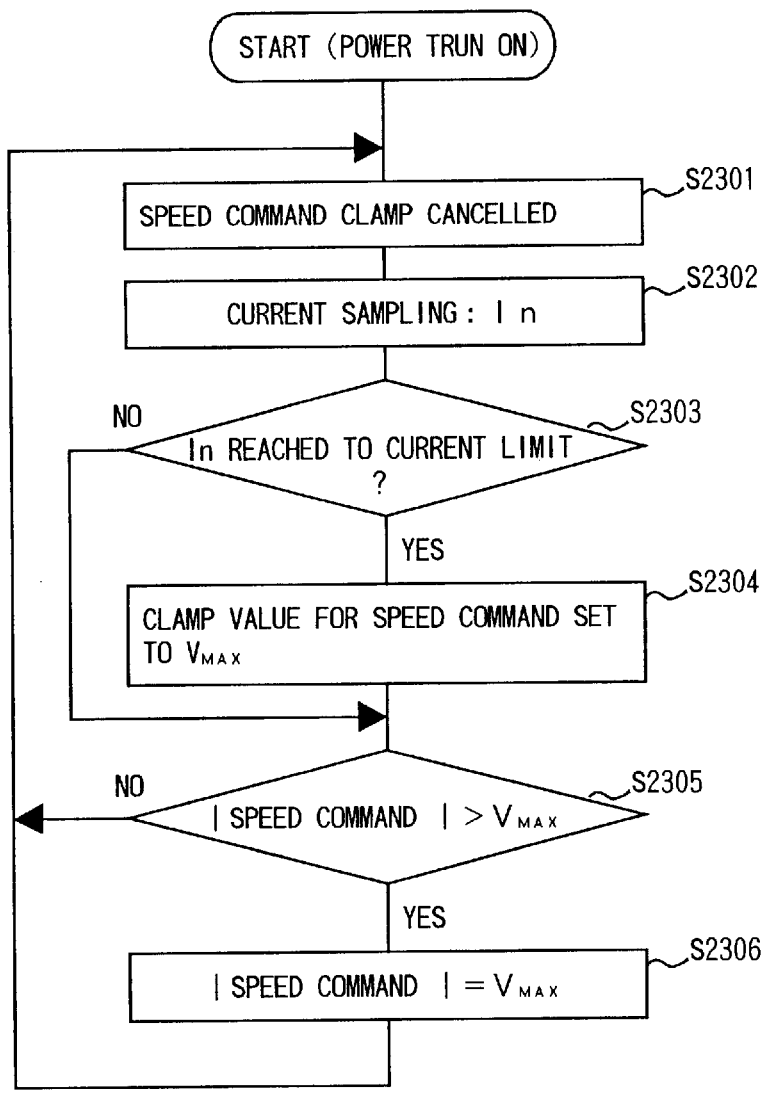
FIG. 32 is a flow chart showing another embodiment of a routine for clamping a command concerning speed in the method of automatically correcting abnormalities in a servo control system according to the present invention.

FIG. 32 shows a speed command clamping routine in this embodiment.

In step S2301, clamping of a speed command is canceled, and then in step S2302, a current command value In is sampled.

Then in step S2303, determination is made as to whether a current command value In has reached a current limit value or not. If it is determined that the current command value In has reached a current limit value, system operation goes to step S2304, and if it is determined that the current command value In has not reached a current limit value, system operation goes to step S2305.

In step S2304, V MAX is a maximum clamp value for a speed command.

In step S2305, determination is made as to whether a speed command computed for positional control has reached V MAX or not. If it is determined that a speed command has reached V MAX, system operation goes to step S2306, where an absolute value of a speed command is outputted as V MAX, and system operation returns to step S2301.

With this configuration, it becomes possible to provide a high reliability servo control system in which overshoot hardly occurs even when an output torque from a servo amplifier has reached its maximum value because a time constant set for acceleration or deceleration during fast feed is too small, or due to influence by an abnormal load.

[Embodiment 18]

In this embodiment, the function for clamping a speed when a current command value has reached its limit value in acceleration during fast feed is further enhanced, a positional droop rate for overshooting as a speed command is thinned and distributed and added to a time constant for deceleration from a point of time when deceleration is started.

Figure 33:
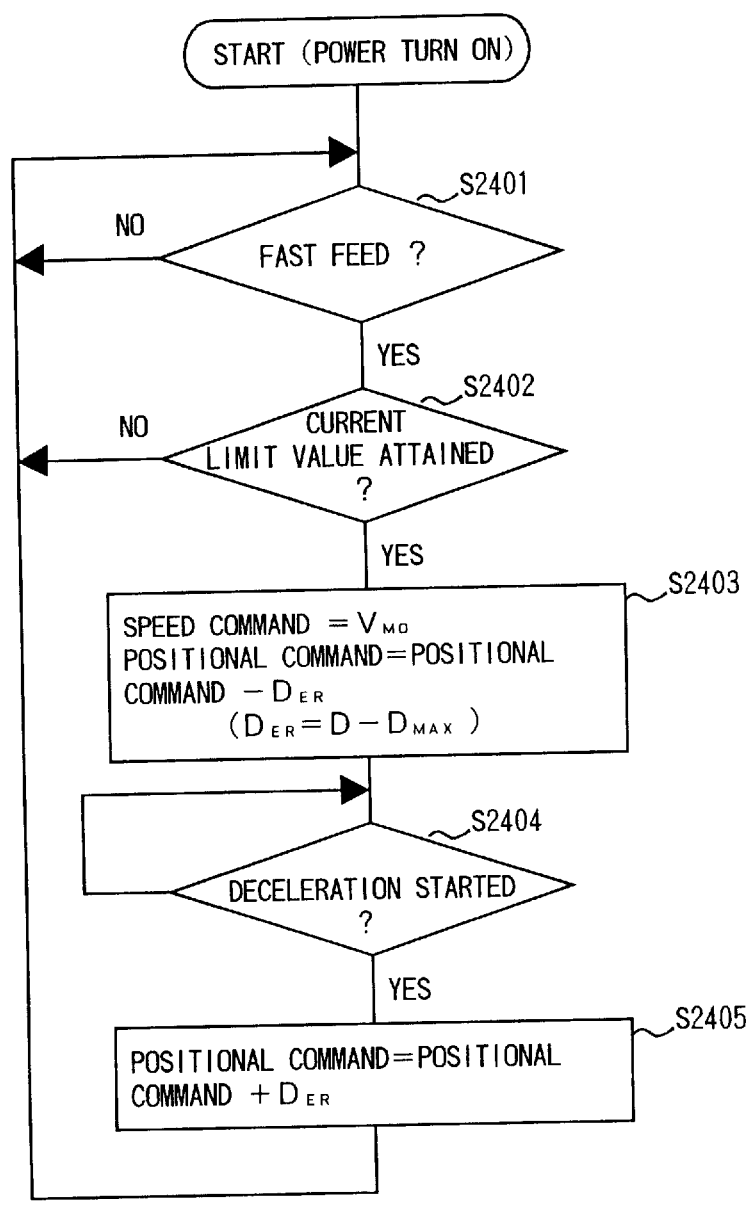
FIG. 33 is a flow chart showing an embodiment of a routine for controlling speed as well as a position in the method of automatically correcting abnormalities in a servo control system according to the present invention.

FIG. 33 shows an operation flow in this embodiment.

In step S2401, determination is made as to whether fast feed is being executed or not. If it is determined that fast feed is being executed, system operation goes to step S2402, and otherwise returns to step S2401.

In step S2402, determination is made as to whether a current command value has reached a current limit value thereof or not. If it is determined that the current command value has reached the limit value, system operation goes to step S2403, and otherwise returns to step S2401.

In step S2403, a speed command is clamped at the maximum rotational speed $V_{MO}$ of the motor. And, a maximum positional droop rate $D_{max}$ obtained by computing a positional loop gain from $V_{MO}$ is compared to a real droop rate D, and a positional droop section $D_{ER}$ for a surpassing section is thinned out from the positional command during acceleration, and deceleration is waited.

In step S2404, determination is made as to whether deceleration is being executed or not, and if it is determined that deceleration is started, system operation goes to step S2405.

In step S2405, the positional command data $D_{ER}$ thinned out from a point of time when deceleration is started is added in deceleration.

Figure 34:
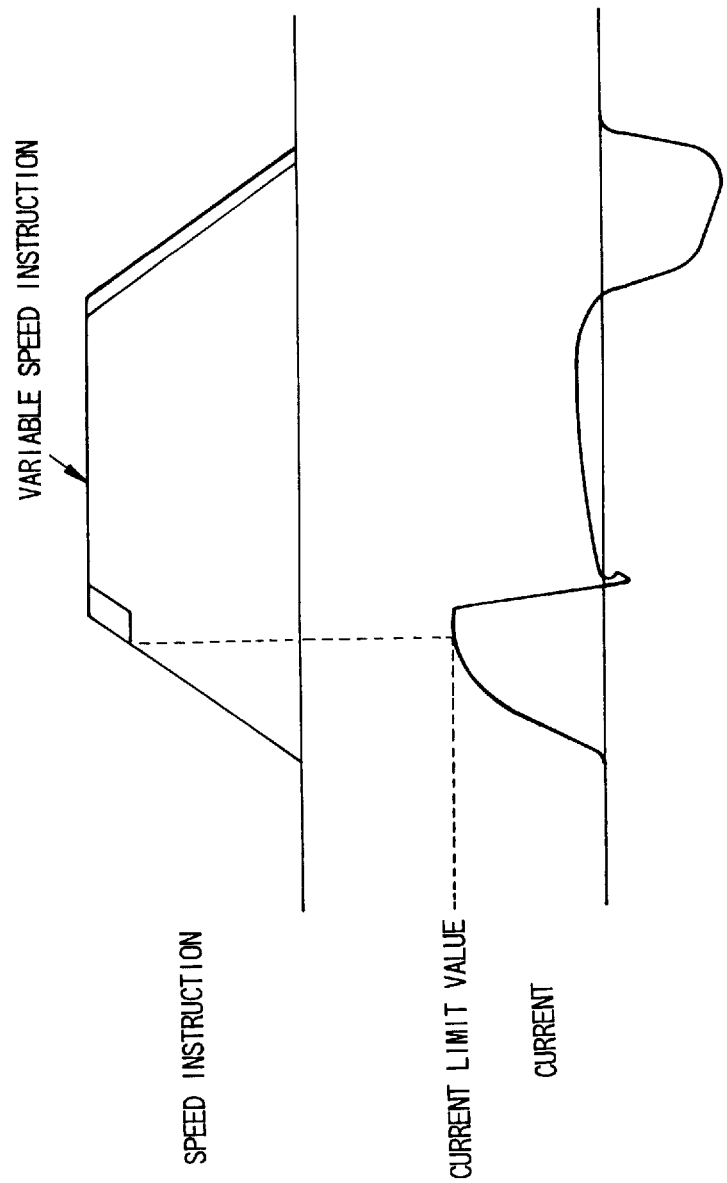
FIG. 34 is a graph showing a relation between a command concerning speed and a command concerning a current in a case of using the method of automatically correcting abnormalities in a servo control system according to the present invention.

A relation between the speed command controlled as described above and a current command is shown in FIG. 34.

With this configuration, it becomes possible to obtain a stable and high reliable servo control system in which overshoot hardly occurs even when a time constant set for acceleration or deceleration during fast feed is too small or when a torque output from a servo amplifier has reached the maximum value due to influence by an abnormal load.

In this embodiment, when a current command value has reached a current limit value in acceleration during fast feed, by shifting a positional command per unit time (command speed) to a lower level, it becomes hard for overshoot to be generated and for an excessive error alarm to be issued. It should be noted that, in a case of operation interpolating between a plurality of axes, this operation is executed for movement not to be off from each of the axes.

Figure 35:
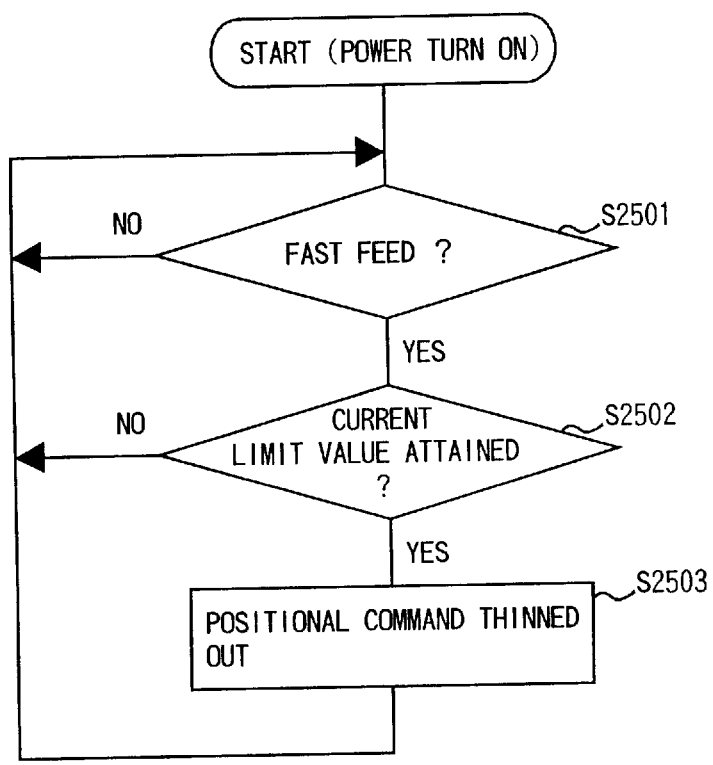
FIG. 35 is a flow chart showing another embodiment of a routine for controlling speed as well as a position in the method of automatically correcting abnormalities in a servo control system according to the present invention.

FIG. 35 shows an operation flow in this embodiment.

In step S2501, determination is made as to whether fast feed is being executed or not. If it is determined that fast feed is being executed, system operation goes to step S2502, and otherwise returns to step S2501.

In step S2502, determination is made as to whether a current command value has reached a current limit value or not. If it is determined that a current command value has reached a current limit value, system operation goes to step S2503.

In step S2503, a change rate of positional command per unit time is limited so that a current command of a servo model set in an NC unit will not be above a level of the current limit value. Namely a positional command is thinned. If control over a current is canceled, shortage in a positional command due to thinning at the point of time is supplemented by a time constant or by means of time distribution to obtain a correct absolute position.

With this configuration, it becomes harder for overshoot to be generated and for an excessive error alarm to be issued.

In this embodiment, when an output torque from a servo amplifier is at the maximum value thereof during fast feed due to influence by an abnormal load, positional loop gains for all axes are lowered only during the period so that such a fault as an excessive error will not occur.

Figure 36:
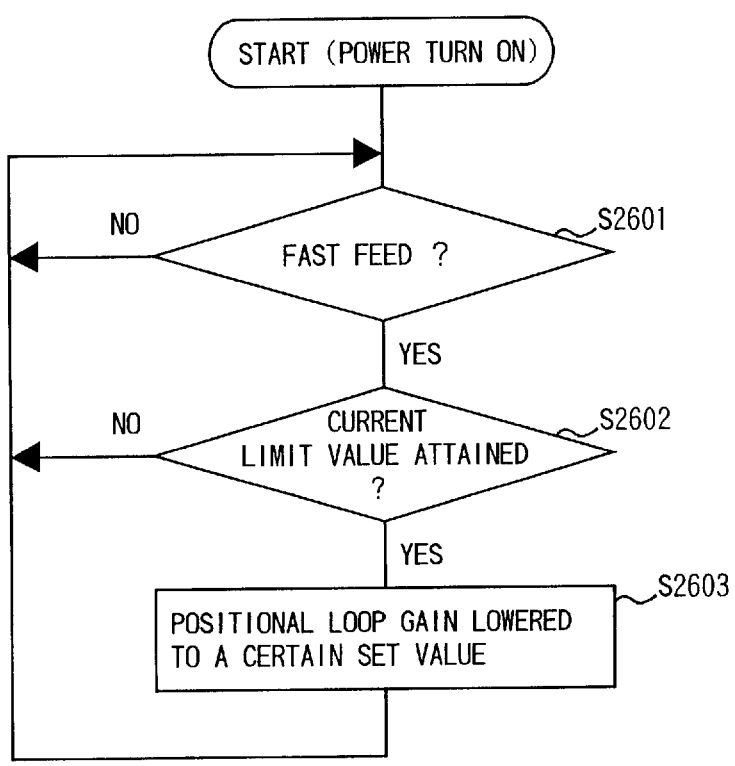
FIG. 36 is a flow chart showing another embodiment of a routine for controlling speed as well as a position in the method of automatically correcting abnormalities in a servo control system according to the present invention.

FIG. 36 shows an operation flow in this embodiment. It should be noted that generally a torque required for acceleration is larger than that required for deceleration, and for this reason the following description is focused on acceleration.

In step S2601, determination is made as to whether fast feed is being executed or not. If it is determined that fast feed is being executed, system operation goes to step S2602.

In step S2602, determination is made as to whether a current command value has reached a current limit value or not. If it is determined that a current command has reached a current limit value, system operation goes to step S2603.

In step S2603, in a state where a droop rate becomes larger than an ideal value, at a point of time when a positional loop gain for an axis where an NC unit has reached a current limit for a servo amplifier control section is gradually lowered and restriction of a current is released, if system operation is stabilized at a fixed level or at a certain speed during fast feed, the positional loop gain is gradually returned to the original value.

With this configuration, in a case where an output torque from a servo amplifier has reached the maximum value due to influence by an abnormal load, positional loop gains for all axes are lowered only during the period, so that movement of the servo system becomes slower and system operation can be continued without such a fault as excessive error being generated.

In this embodiment, in a case where an output torque from a servo amplifier has reached the maximum value due to influence by an abnormal load during fast feed, positional loop gains for all axes are lowered by a time constant, this operation for changing the positional loop gains is stopped at a point of time when restriction over a current is canceled, and control is provided with the same gain until movement is finished. In the next operation, as a time constant for fast feed is changed according to the method of correcting a time constant for acceleration or deceleration as described above, movement is started with the positional loop gain originally set.

Figure 37:
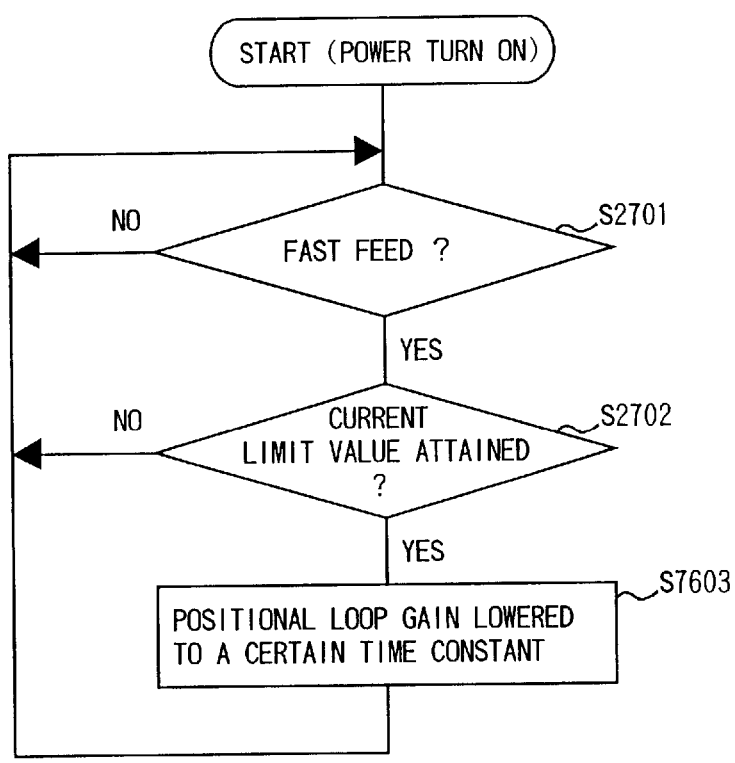
FIG. 37 is a flow chart showing another embodiment of a routine for controlling speed as well as a position in the method of automatically correcting abnormalities in a servo control system according to the present invention.

FIG. 37 shows an operation flow in this embodiment. Generally a torque required for acceleration is larger than that required for deceleration, so that the following description is focused on acceleration.

In step S2701, determination is made as to whether fast feed is being executed or not. If it is determined that fast feed is being executed, system operation goes to step S2702.

In step S2702, determination is made as to whether a current command value has reached a current limit value or not. If it is determined that a current command has reached a current limit value, system operation goes to step S2703.

In step S2703, in a state where a droop rate becomes larger than an ideal value, at a point of time when a positional loop gain for an axis where an NC unit has reached a current limit for a servo amplifier control section is gradually lowered with a certain time constant and restriction of a current is released, if system operation is stabilized at a fixed level or at a certain speed, the positional loop gain is gradually returned to the original value.

With this configuration, system operation can be continued without generating an excessive error alarm.

In this embodiment, in a case where an output torque from a servo amplifier has reached the maximum value due to influence by an abnormal load during fast feed, a positional loop gain when a speed command has reached a value V (V = a value corresponding to a rated rotational speed of motor + α: α is around 2% of the rated rotational speed (rpm) of the motor) is computed from the current droop rate, so that a speed command will not be more than the value V.

Figure 38:
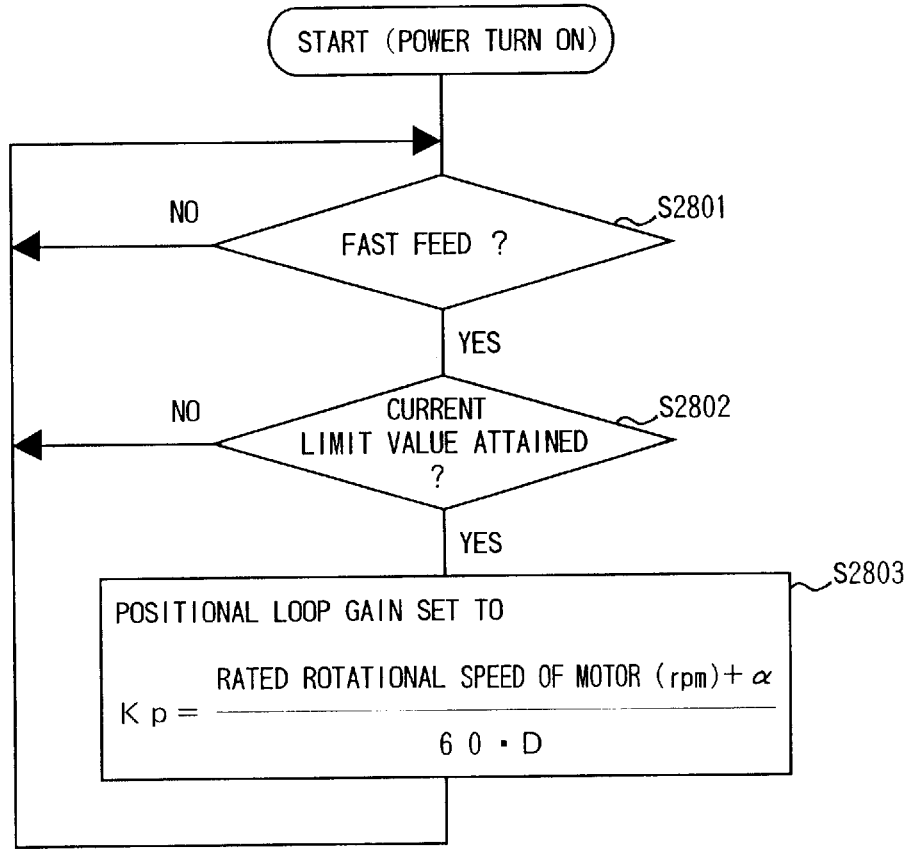
FIG. 38 is a flow chart showing another embodiment of a routine for controlling speed as well as a position in the method of automatically correcting abnormalities in a servo control system according to the present invention.

In FIG. 38 shows an operation flow in this embodiment. Generally a torque required for acceleration is larger than that required for deceleration, so that the following description is focused on acceleration.

In step S2801, determination is made as to whether fast feed is being executed or not. If it is determined that fast feed is being executed, system operation goes to step S2802.

In step S2802, determination is made as to whether a current command value has reached a current limit value or not. If it is determined that a current command has reached a current limit value, system operation goes to step S2803.

In step S2803, in a state where a droop rate becomes larger than an ideal value, at a point of time when a positional loop gain Kp for an axis where an NC unit has reached a current limit for a servo amplifier control section is lowered to a value computed through the following expression and restriction of a current is released, if system operation is stabilized at a fixed level or at a certain speed, the positional loop gain Kp is gradually returned to the original value.

$$Kp = (\text{Rated rpm of a motor} + \alpha)/60 \cdot D$$

Herein D indicates a droop rate.

With this configuration, system operation can be continued without generating an excessive error alarm also in this embodiment.

In association with introduction of a detector based on absolute positions used for positional feedback and development of technology for higher resolution, there have become available many and various types of I/F method, and it is necessary to use as many receiving lines as possible to respond to every type of detector.

In this embodiment, there are receiving lines corresponding to three different types of detector I/F, type of connected detectors are automatically determined upon power turn ON and not depending on servo parameters set in the detectors, and a parameter abnormal alarm is generated when a detector type specified by a parameter is different from that actually connected.

FIG. 39A shows an example of feedback detection circuit. Shared in this feedback detection circuit are I/O circuits of three different types of detector: an incremental detector having A-, B-, and Z- phases required for control of pulse output position and speed control + U-, V-, and W- phases for initial magnetic poles of a synchronizing motor, an absolute position detector initially sending and receiving (RQ and DT) an absolute position through serial communications and then executing communications through the A-, B-, and Z- phases, and a detector always sending and receiving data concerning absolute positions by means of serial communications (only RQ and DT).

FIG. 39A shows differential inputs to A-phase, B-phase, Z-phase, U-phase, V-phase, and W-phase from the left top. In this example, the U-phase and RQ (serial data request), and V-phase and DT (serial data line) are shared respectively.

Figure 40:
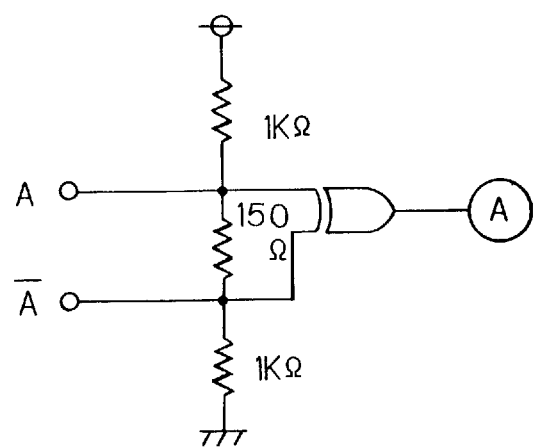
FIG. 40 is a circuit diagram showing an example of an exclusive circuit according to the present invention.

This feedback detection circuit comprises differential receivers 171a to 171f, exclusive circuits 172a to 172f for detecting a fact that a differential input is connected, an incremental counter (a counter for preparing a feedback rate) 173 for counting pulses for each of the A-, B-, and Z-phases, a serial request I/F circuit 174 for supporting a request portion in the serial communications, a receiving buffer (serial data receiving I/F circuit) 175 for storing data from the detectors, a U-, V, and W- phases read port 176 for monitoring a state of each of the U-, V-, and W-phases for initial magnetic pole, and a read port 177 for reading a null signal state for each phase to monitor a null signal state in each phase. It should be noted that, as a terminator resistance is connected, as shown in FIG. 40, to the exclusive circuit, output from the exclusive circuit is always 1 in the open state.

FIG. 39B shows a state of the read port 177 in a case where the three types of detectors are connected thereto. A driver enable line in the serial detector request line is disabled when power is turned ON, and if each detector determines that 6 input states are all normal, data as shown in FIG. 39B is obtained. This data is compared for verification to parameters of each detector type name sent from the NC unit, and if different, a parameter abnormal alarm is generated.

Figure 41:
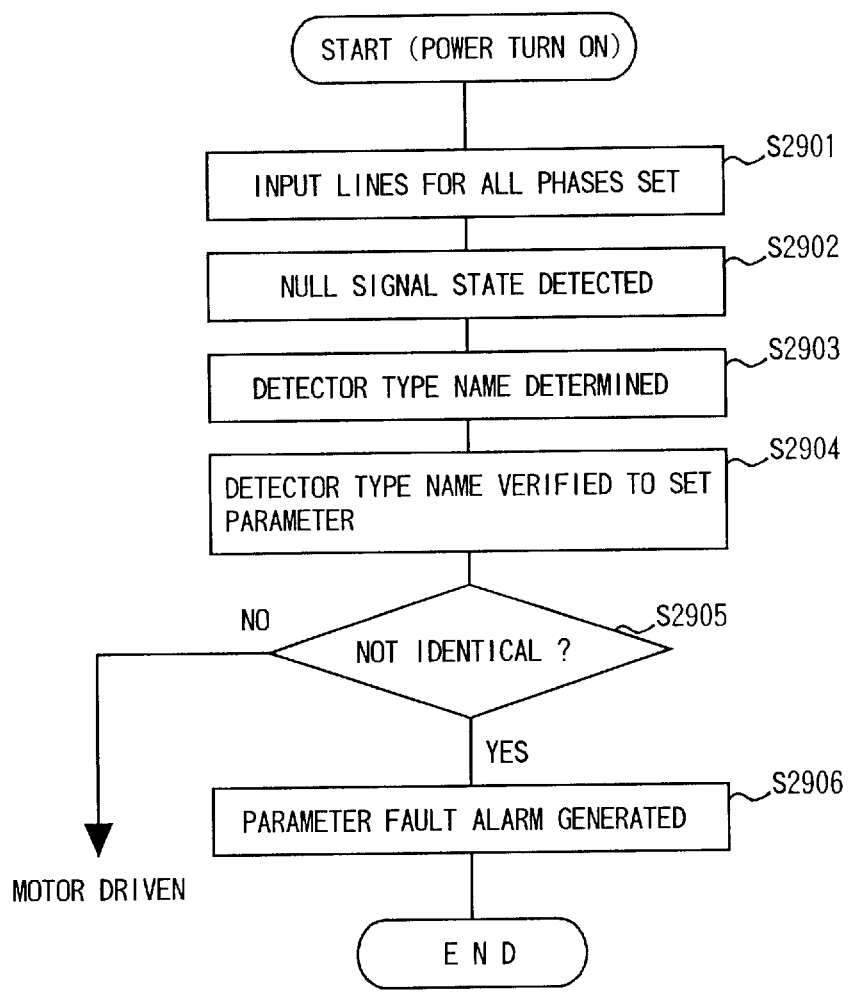
FIG. 41 is a flow chart showing a routine for diagnosing parameter abnormalities in the method of detecting and diagnosing abnormalities in the servo control system according to the present invention.

FIG. 41 shows the parameter abnormal diagnosis routine.

At first, in step S2901, all phases are specified as input lines, and then in the next step S2902, a null signal state is checked.

Then in step S2903, a connected detector is determined according to a result of null-signal state.

In step S2904, a parameter indicating a detector type name is compared for verification to a connected detector.

In step S2905, determination is made as to whether a parameter indicating a detector type name is identical to the connected detector or not. If not identical, system operation goes to step S2906, and a parameter abnormal alarm is generated to stop the system operation.

With this configuration, if a detector type indicated by a parameter is different from a detector actually connected, an parameter abnormal alarm is generated, which makes easier to search for a cause of fault, if generated.

In this embodiment, if it is turned out through the sequence for automatic determination described above that a detector specified by a parameter is different from an actually connected detector, I/F is switched to one for the actually connected parameter to automatically correct abnormality in detector connection state.

Figure 42:
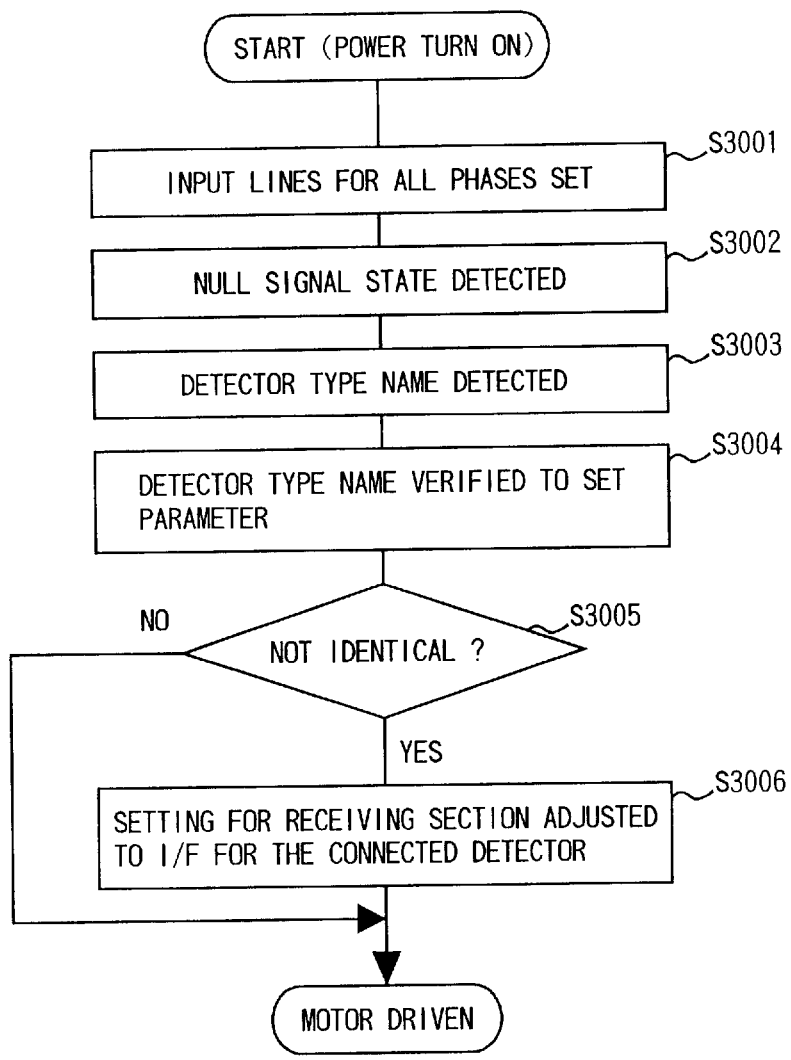
FIG. 42 is a flow chart showing a routine for automatically correcting a connection state of the detector in the method of automatically correcting abnormalities in a servo control system according to the present invention.

FIG. 42 shows an operation flow in this embodiment.

At first, in step S3001, all phases are specified as input lines, and then in the next step S3002, a null-signal state is checked.

Then in step S3003, a connected detector is determined according to a result of null-signal state.

In step S3004, a parameter indicating a detector type name is compared for verification to a connected detector.

In step S3005, determination is made as to whether a parameter indicating a detector type name is identical to the connected detector or not. If not identical, system operation goes to step S3006, and a setting in the sending and receiving sections are adjusted to I/F for a detector determined as connected thereto.

With this configuration, a detection circuit adjusted to a detector detected thereto in which an alarm such as null-signal is not generated even when there is any mistake in parameter setting can be formed, which insures normal operation of the system.

As described above, in the method of detecting and diagnosing abnormalities in a servo control system according to the present invention, misconnection of motor output terminals is detected by detecting currents flowing through at least two of U-phase, V-phase, and W-phase of a servo output terminal in first acceleration after power is turned ON and monitoring patterns of the current wave forms, so that it is accurately found out that the motor output terminal has been misconnected.

In another method of detecting and diagnosing abnormalities in a servo control system according to the present invention, all of U-phase, V-phase, and W-phase currents each flowing in an output terminal of a servo motor and phase voltages are all detected, and it is determined that connection of the motor output terminal has not been established if there is a phase where a current does not flow even though the phase voltage is more than a prespecified value, so that it is found out that the motor output terminal has not been connected.

In another method of detecting and diagnosing abnormalities in a servo control system according to the present invention, all voltages in each phase acting on a motor output terminal in acceleration or deceleration are detected, and it is determined, when all the phase voltages are zero, that connection of a bus-bar for a converter has not been established, so that it is found out that the bus-bar for a converter has not been connected.

In another method of detecting and diagnosing abnormalities in a servo control system according to the present invention, a voltage between each phase of an output terminal of a servo motor is detected to compute a switching voltage for each phase, and the phase voltage is detected using a filter to which the computed switching voltage is inputted, so that a phase voltage of which a level can easily be evaluated can be obtained, and detecting and diagnosing abnormalities using the phase voltage can accurately be executed.

In another method of detecting and diagnosing abnormalities in a servo control system according to the present invention, a gate shutdown signal to a transistor in an inverter section providing controls over a current for a servo motor is monitored and a generated section thereof is detected, so that causes for an alarm indicating abnormalities in the control system such as an excessive error or a feedback fault can be found, which can smoothly be coped with thereafter.

In another method of detecting and diagnosing abnormalities in a servo control system according to the present invention, in positional control for a closed loop system having a machine edge position detector, polarity of signals for a positional command, positional feedback, speed feedback, a current command, and current feedback is monitored since power is turned ON, and if only the positional feedback has a reverse polarity when all the signals are larger than a prespecified value, it is determined that wiring for the feedback cable is miscorrected, so that it is accurately found out that wiring for the feedback cable is miscorrected.

In another method of detecting and diagnosing abnormalities in a servo control system according to the present invention, in positional control for a closed loop system having a machine edge position detector, a number of pulses detected by a motor edge position detector when movement is made by a prespecified distance corresponding to rotations of the motor or other factor is compared upon power turn ON to a number of detected pulses each indicating a machine edge, and parameter missetting for machine parameters such as a gear ratio in the machine, a ball screw pitch, resolution of a machine edge position detector or the like is detected according to a result of this comparison, so that it is accurately found out that the machine parameters have been misset, and the efficiency of a period of time to adjust for initiating a machine can be improved.

In another method of detecting and diagnosing abnormalities in a servo control system according to the present invention, in software for providing controls over a current for a servo motor, a servo motor model plotted with d-axis and q-axis current command as input is prepared and when an excessive error is indicated even though a difference between a positional feedback value in the model and an actual motor edge position feedback value is within a prespecified allowable range even after a current is restricted, it is determined that time constant for acceleration or deceleration is too small, so that it is accurately found out that time constant for acceleration or deceleration is too small.

In another method of detecting and diagnosing abnormalities in a servo control system according to the present invention, in software for providing controls over a current for a servo motor, a servo motor model plotted with d-axis and q-axis current commands as input is prepared, and if a rotor inertia and a load inertia are within an allowable range and such a trouble as misshutting of a gate has not been generated when a difference between a positional feedback value in the model and an actual motor edge position feedback value exceeds a prespecified allowable range, it is determined that abnormal load is present, so that it is accurately found out that abnormal load is present.

In another method of automatically correcting abnormalities in a servo control system according to the present invention, even though feedback polarity from a machine edge position detector for positional control with a semi-closed loop system is reverted in the first place, positional control with a full closed loop system is started by automatically correcting the feedback polarity, so that system operation can be continued without generating an alarm indicating an excessive difference or a feedback fault and without being stopped. With this configuration, a servo control system with high reliability without being affected from parameter setting or misconnection executed by a user can be realized.

In another method of automatically correcting abnormalities in a servo control system according to the present invention, even if feedback polarity from a machine edge detector is reverted, it is automatically corrected, so that system operation can be continued without generating an alarm indicating an excessive difference or feedback abnormalities and without being stopped. With this configuration, a servo control system with high reliability without being affected from parameter setting or misconnection executed by a user can be realized.

In another method of automatically correcting abnormalities in a servo control system according to the present invention, dual feedback control is executed to determine feedback polarity from a machine edge position detector, and even if feedback polarity from the machine edge position detector is reverted, it is automatically corrected, so that system operation can be continued without generating an alarm indicating an excessive difference or a feedback fault and without being stopped. With this configuration, a servo control system with high reliability without being affected from parameter setting or misconnection executed by a user can be realized.

In another method of automatically correcting abnormalities in a servo control system according to the present invention, if a state where feedback polarity from a machine edge position detector is reverted is detected, the data is stored in a non-volatile memory, and feedback polarity is reverted and controlled depending on the data when power is turned ON again, and for this reason, an intelligent servo control system with high reliability can be realized so that even if there is any mistakes in setting or connection, it can be automatically corrected thereby.

In another method of automatically correcting abnormalities in a servo control system according to the present invention, if misconnection of the servo motor output terminal is present, a sequence of outputting voltage commands is changed in the order of correct phase, so that the servo control system can normally be operated without any change of connection, and an intelligent servo control system automatically correcting misconnection executed by a user can be realized.

In another method of automatically correcting abnormalities in a servo control system according to the present invention, an optimal time constant allowable for an output torque from a servo amplifier required for acceleration or deceleration in fast feed is computed, and a command is prepared with the computed optimal time constant in next acceleration or deceleration, so that an optimal time constant in accordance with the change can be obtained even if a mechanical load is changed.

In another method of automatically correcting abnormalities in a servo control system according to the present invention, an optimal time constant allowable for an output torque of a servo amplifier required for acceleration or deceleration in fast feed is computed for each direction of movement (a feed direction), and a command is prepared with the computed optimal time constant for the corresponding direction of movement in next acceleration or deceleration, so that an optimal time constant for acceleration or deceleration can always be obtained according to the direction of movement even if an axis of moving up and down is a load imbalance axis.

In another method of automatically correcting abnormalities in a servo control system according to the present invention, an optimal time constant allowable for an output torque from a servo amplifier required for acceleration or deceleration in fast feed is computed for acceleration and deceleration respectively, and an command is prepared with the corresponding computed optimal time constant in the corresponding direction in next acceleration or deceleration, so that time constant for deceleration can be set to a small value because torque can be accelerated by normal friction, and required time for acceleration or for deceleration can be shortened.

In another method of automatically correcting abnormalities in a servo control system according to the present invention, an optimal time constant allowable for an output torque from a servo amplifier required for acceleration or deceleration in fast feed is always computed for acceleration or for deceleration and for each direction of movement, and a command is prepared with the corresponding optimal time constant in next acceleration or deceleration, so that an optimal time constant for acceleration or deceleration corresponding to all the changings such as load imbalance (such as gravity), friction, and time can be obtained.

In another method of automatically correcting abnormalities in a servo control system according to the present invention, assuming a case that time constant for acceleration or deceleration in fast feed is set to a small value or reaches the maximum output torque from a servo amplifier affected by abnormal load, a deviation rate of a position for determination of the necessity of excessive error alarm is set to a value larger than an ordinary one only during acceleration or deceleration in fast feed, so that an alarm indicating an excessive error hardly occurs, and a servo control system with high reliability can be realized.

In another method of automatically correcting abnormalities in a servo control system according to the present invention, assuming a case that time constant for acceleration or deceleration in fast feed is set to a small value or reaches the maximum output torque from a servo amplifier under influence by an abnormal load, a rotational speed of a motor for determination of the necessity for excessive speed alarm is set to a value larger than an ordinary one only during acceleration or deceleration in fast feed, so that excessive speed alarm hardly occurs, and a servo control system with higher reliability as compared to the conventional type thereof can be provided.

In another method of automatically correcting abnormalities in a servo control system according to the present invention, assuming a case that time constant for acceleration or deceleration in fast feed is set to a small value or reaches the maximum output torque from a servo amplifier under influence by an abnormal load, a maximum speed for a command concerning speed is previously clamped at a specified value, so that overshoot can be suppressed, and an excessive error or excessive speed alarm hardly occurs, and a reliable and stable servo control system can be obtained.

In another method of automatically correcting abnormalities in a servo control system according to the present invention, a maximum speed for a command concerning speed is clamped at a specified value only during acceleration or deceleration, so that overshoot hardly occurs even if time constant for acceleration or deceleration in fast feed is set to a small value, or an output torque reaches a maximum output torque from a servo amplifier under influence by an abnormal load, and a reliable and stable servo control system can be obtained.

In another method of automatically correcting abnormalities in a servo control system according to the present: invention, a maximum speed for a command concerning speed is clamped at a specified value only while a maximum current for a servo amplifier is being restricted, so that overshoot hardly occurs even if time constant for acceleration or deceleration in fast feed is set to a small value, or an output torque reaches a maximum output torque from a servo amplifier under influence by an abnormal load, and a reliable and stable servo control system can be obtained.

In another method of automatically correcting abnormalities in a servo control system according to the present invention, if time constant for acceleration or deceleration in fast feed is set to a small value, or an output torque reaches a maximum output torque from a servo amplifier under influence by an abnormal load, an command concerning speed is clamped at a rated rotational speed of a motor, a command concerning position for overshooting is thinned out, and the rate thinned out from start of deceleration is distributed and added to each time constant, so that overshoot hardly occurs, and a reliable and stable servo control system can be obtained.

In another method of automatically correcting abnormalities in a servo control system according to the present invention, a change rate (command concerning speed) of a command concerning position per unit time is suppressed when a current command value has reached a current limit value during acceleration in fast feed, so that an excessive error alarm hardly occurs and also overshoot hardly occurs, and a reliable and stable servo control system can be obtained.

In another method of automatically correcting abnormalities in a servo control system according to the present invention, when a current command value has reached a maximum output torque from a servo amplifier during fast feed under influence by an abnormal load, a positional loop gain is reduced only during the period to smoothly operate movement of the servo system, and for this reason a reliable servo control system can be obtained so that system operation can be continued without generating an excessive error.

In another method of automatically correcting abnormalities in a servo control system according to the present invention, when an output torque has reached a maximum output torque from a servo amplifier under influence by an abnormal load during fast feed, a positional loop gain is reduced by a specified time constant, and for this reason a reliable servo control system can be obtained so that system operation can be continued without generating an excessive error alarm.

In another method of automatically correcting abnormalities in a servo control system according to the present invention, when a current command value has reached a maximum output torque from a servo amplifier affected by abnormal load during fast feed, a positional loop gain when a command concerning speed indicates a rated rotational speed of a motor is computed from a current droop rate, and control is always provided so that the command concerning speed will not exceed the rated rotational speed of the motor, and for this reason a servo control system where system operation can be continued without generating an excessive error alarm can be obtained.

In another method of automatically correcting abnormalities in a servo control system according to the present invention, a connection state of a plurality of receiving circuits each for a detector in the transmitting side thereof is checked when power is turned ON to automatically detect a type name of a detector actually connected thereto, and if the type of a detector indicated by the detected parameter is different from a detector actually connected thereto, a parameter abnormality alarm is generated, and for this reason a reliable servo control system can be obtained so that causes when some fault has been generated can easily be analyzed.

In another method of automatically correcting abnormalities in a servo control system according to the present invention, a connection state of a plurality of receiving circuits each for a detector in the transmitting side thereof is checked when power is turned ON to automatically detect a type name of a detector actually connected thereto, and if the type of a detector indicated by the detected parameter is different from a detector actually connected thereto, a receiving circuit is switched to the one corresponding to the connected detector, and for this reason an intelligent and reliable servo control system can be obtained so that system can normally start up its operation even if any mistake is found in parameter setting.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of automatically correcting abnormalities in a servo control system for a servo motor comprising the steps of:

determining whether or not a maximum current for a servo amplifier is being restricted; and clamping a maximum value of a speed command at a specified value only while said maximum current for said servo amplifier is being restricted.

2. A method of automatically correcting abnormalities in a servo control system for a servo motor comprising the steps of:

determining whether or not a fast feed mode is being executed;

determining whether or not a current instruction value has reached a current limit value; and suppressing a rate of change of a position instruction per unit time when said current instruction value reaches said current limit value during acceleration in said fast feed mode.

* * * * *